United States Patent
Hayes

(10) Patent No.: US 7,144,972 B2
(45) Date of Patent: Dec. 5, 2006

(54) COPOLYETHERESTER COMPOSITIONS CONTAINING HYDROXYALKANOIC ACIDS AND SHAPED ARTICLES PRODUCED THEREFROM

(75) Inventor: Richard Allen Hayes, Brentwood, TN (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/888,225

(22) Filed: Jul. 9, 2004

(65) Prior Publication Data

US 2006/0009611 A1    Jan. 12, 2006

(51) Int. Cl.
*C08G 63/00*    (2006.01)

(52) U.S. Cl. .................. 528/272; 264/176.1; 521/92; 521/125; 525/418; 525/437; 528/300; 528/301

(58) Field of Classification Search ............. 264/176.1; 521/92, 125; 525/418, 437; 528/300, 301, 528/272

See application file for complete search history.

(56) References Cited

U.S. PATENT DOCUMENTS

| | | | |
|---|---|---|---|
| 2,828,290 A | | 3/1958 | Caldwell |
| 3,784,585 A | | 1/1974 | Schmitt |
| 4,328,333 A | * | 5/1982 | Barbee et al. ............. 528/301 |
| 4,351,745 A | * | 9/1982 | Stinger .................... 252/511 |
| 5,097,004 A | | 3/1992 | Gallagher et al. |
| 5,097,005 A | | 3/1992 | Tietz |
| 5,171,308 A | | 12/1992 | Gallagher et al. |
| 5,219,646 A | | 6/1993 | Gallagher et al. |
| 5,252,642 A | | 10/1993 | Sinclair et al. |
| 5,295,985 A | | 3/1994 | Romesser et al. |
| 5,475,080 A | | 12/1995 | Gruber et al. |
| 5,561,213 A | * | 10/1996 | Poessnecker ............. 528/300 |
| 5,593,778 A | * | 1/1997 | Kondo et al. ............. 428/373 |
| 5,605,981 A | | 2/1997 | Imamura et al. |
| 5,616,657 A | | 4/1997 | Imamura et al. |
| 5,817,721 A | | 10/1998 | Warzelhan et al. |
| 6,018,004 A | | 1/2000 | Warzelhan et al. |
| 6,303,677 B1 | | 10/2001 | Warzelhan et al. |
| 6,342,304 B1 | | 1/2002 | Buchanan et al. |
| 6,414,108 B1 | | 7/2002 | Warzelhan et al. |
| 6,878,758 B1 | * | 4/2005 | Martin et al. ............. 523/124 |

FOREIGN PATENT DOCUMENTS

| | | |
|---|---|---|
| EP | 0618250 A1 | 10/1994 |
| JP | 09100345 A | 4/1997 |
| WO | WO 91/02015 | 2/1991 |
| WO | WO 95/16562 | 6/1995 |
| WO | WO 96/38282 | 12/1996 |
| WO | WO 97/00284 | 1/1997 |

OTHER PUBLICATIONS

Kirk-Othmer, Encyclopedia of Chemical Technology, Third Edition, 1980, pp. 82-145, vol. 11, John Wiley & Sons, New York, NY.
Encyclopedia of Polymer Science and Engineering, Second Edition, 1985, pp. 434-446, vol. 2, John Wiley & sons, New York, NY.
PCT International Search Report, International Application No. PCT/US2005/024385, Filed Jul. 8, 2005.

* cited by examiner

*Primary Examiner*—Terressa Boykin
(74) *Attorney, Agent, or Firm*—Gail A. Dalickas; Barry Dale Cash

(57) ABSTRACT

The present invention provides certain aromatic copolyetheresters that include hydroxyalkanoic acid residues, and processes for making the copolyetheresters, and articles containing the copolyetheresters. The copolyetheresters have desirable thermal properties, and can be used in forming shaped articles, such as films, coatings and laminates. The copolyetheresters are produced from a mixture of aromatic dicarboxylic acids, hydroxyalkanoic acids, a poly (alkylene ether) glycol, a glycol component, optional other glycol, optional branching agents, and optional color reducing agent components. Some of the copolyetheresters are biocompostable.

101 Claims, No Drawings

COPOLYETHERESTER COMPOSITIONS CONTAINING HYDROXYALKANOIC ACIDS AND SHAPED ARTICLES PRODUCED THEREFROM

FIELD OF THE INVENTION

The present invention relates to aromatic copolyetheresters that contain hydroxyalkanoic acid groups. The copolyetheresters can be used to form a variety of shaped articles, which use is also within the scope of the present invention.

BACKGROUND OF THE INVENTION

Copolyesters of poly(hydroxyalkanoates) with aromatic dicarboxylic acids are known within the art. For example, Gordon, et al., in WO 91/02015, disclose hydrodegradable aliphatic-aromatic copolyesters that can include hydroxy acids. Imamura, et al., in U.S. Pat. No. 5,605,981 and U.S. Pat. No. 5,616,657, disclose a process for the preparation of certain lactic acid copolyesters comprising 98–50 weight percent lactide. Warzelhan, et al., in U.S. Pat. No. 5,817,721 U.S. Pat. No. 6,018,004 and U.S. Pat. No. 6,303,677 and U.S. Pat. No. 5,889,135, disclose certain aliphatic-aromatic copolyesters containing hydroxy acid components. Buchanan, et al., in U.S. Pat. No. 6,342,304, disclose oriented films derived from linear aliphatic-aromatic copolyesters prepared from polyester forming combinations of hydroxy acids, dicarboxylic acids or derivatives thereof, and diols.

Copolyesters of poly(hydroxyalkanoates) with aromatic dicarboxylic acids and also containing a sulfonate functionality are also known. For example, Gallagher, et al., in U.S. Pat. No. 5,097,004, U.S. Pat. No. 5,171,308, and U.S. Pat. No. 5,219,646, Tietz, in U.S. Pat. No. 5,097,005, and Romesser, et al., in U.S. Pat. No. 5,295,985 disclose certain sulfonated aromatic copolyesters that contain 2 to 40 weight percent of a hydroxy acid component. Warzelhan, et al., in U.S. Pat. No. 6,018,004 and U.S. Pat. No. 6,303,677, disclose sulfonated aliphatic-aromatic copolyesters that contain hydroxy acids.

Known aromatic copolyetheresters having hydroxyalkanoic acid components can have inadequate thermal properties for some applications, as evidenced by the low observed crystalline melting temperatures and glass transition temperatures. The present invention provides aromatic copolyetheresters made from hydroxyalkanoic acids, having improved thermal properties, such as crystalline melting points, glass transition temperatures, and heat deflection temperatures, in comparison with known aromatic copolyetheresters made from hydroxyalkanoic acids.

BRIEF SUMMARY OF THE INVENTION

One aspect of the present invention includes aromatic copolyetheresters that contain from 1.0 to 99.0 mole percent of a hydroxyalkanoic acid component and 0.1 to 30.0 mole percent of a poly(alkylene ether) glycol. The aromatic copolyetheresters consist essentially of 99.0 to 1.0 mole percent of an aromatic dicarboxylic acid component, 1.0 to 99.0 mole percent of a hydroxyalkanoic acid component selected from lactic acid, glycolic acid and mixtures thereof, 98.9 to 1.0 mole percent of a single first glycol selected from ethylene glycol, 1,3-propanediol and 1,4-butanediol, 0.1 to 30.0 mole percent of a poly(alkylene ether) glycol, 0 to 5.0 mole percent of an other glycol, 0 to 5.0 mole percent of a polyfunctional branching agent, and optionally an effective amount of a color reducing agent. The aromatic copolyetherester compositions can contain fillers. In some embodiments the aromatic copolyetheresters are biodegradable.

Another aspect of the present invention includes processes for producing an aromatic copolyetherester containing from 1.0 to 99.0 mole percent of a hydroxyalkanoic acid component and 0.1 to 30.0 mole percent of a poly(alkylene ether) glycol. In one embodiment, the process includes providing a reaction mixture comprising an aromatic dicarboxylic acid component, a hydroxyalkanoic acid component, a single first glycol, a poly(alkylene ether) glycol, optionally an other glycol, optionally an effective amount of a color reducing agent, and optionally a polyfunctional branching agent; and allowing the dicarboxylic acid component, the hydroxyalkanoic acid component, the single first glycol, the poly(alkylene ether) glycol, the optional other glycol, and the polyfunctional branching agent to polymerize to form the aromatic copolyetherester comprising an acid component and a glycol component. The acid component consists essentially of 99.0 to 1.0 mole percent of an aromatic dicarboxylic acid component based on 100 mole percent total acid component, and 1.0 to 99.0 mole percent of a hydroxyalkanoic acid component selected from lactic acid, glycolic acid and mixtures thereof, based on 100 mole percent total acid component. The glycol component comprises from about 98.9 to about 1.0 mole percent of a single first glycol selected from ethylene glycol, 1,3-propanediol and 1,4-butanediol, 0.1 to 30.0 mole percent of a poly (alkylene ether) glycol, 0 to about 5.0 mole percent of one or more of an other glycol based on 100 mole percent total glycol component, and 0 to about 5.0 mole percent of a polyfunctional branching agent.

A further aspect of the present invention includes shaped articles produced from aromatic copolyetheresters that contain from 1.0 to 99.0 mole percent of a hydroxyalkanoic acid component and 0.1 to 30.0 mole percent of a poly(alkylene ether) glycol. The aromatic copolyetheresters consist essentially of 99.0 to 1.0 mole percent of an aromatic dicarboxylic acid component, 1.0 to 99.0 mole percent of a hydroxyalkanoic acid component selected from lactic acid, glycolic acid, and mixtures thereof, 98.9 to 1.0 mole percent of a single first glycol selected from ethylene glycol, 1,3-propanediol, and 1,4-butanediol, 0.1 to 30.0 mole percent of a poly(alkylene ether) glycol, 0 to 5.0 mole percent of an other glycol, 0 to 5.0 mole percent of a polyfunctional branching agent, and optionally an effective amount of a color reducing agent. The aromatic copolyetherester compositions can contain fillers. In some embodiments the aromatic copolyetheresters are biodegradable. The shaped articles produced from the aromatic copolyetheresters have enhanced thermal properties in comparison to shaped articles produced from known aromatic copolyetheresters. Shaped articles include film, sheets, fiber, melt blown containers, molded parts, such as cutlery, foamed parts, coatings, polymeric melt extrusion coatings onto substrates, polymeric solution coatings onto substrates, and laminates.

In some embodiments, the aromatic copolyetheresters contain fillers. Preferably the amount of filler, if present, is from about 0.01 to about 80 weight percent fillers. The filled aromatic copolyetheresters have enhanced thermal properties compared to some known filled copolyetheresters. In some embodiments, shaped articles made from the aromatic copolyetheresters, including film, sheets, fiber, melt blown containers, molded parts, such as cutlery, foamed parts, coatings, polymeric melt extrusion coatings onto substrates, polymeric solution coatings onto substrates, and laminates, contain fillers, e.g., from about 0.01 to about 80 weight percent fillers.

A further aspect of the present invention includes films comprising aromatic copolyetheresters that contain from 1.0 to 99.0 mole percent of a hydroxyalkanoic acid component and 0.1 to 30.0 mole percent of a poly(alkylene ether) glycol and processes to produce same. The aromatic copolyetheresters consist essentially of 99.0 to 1.0 mole percent of an aromatic dicarboxylic acid component, 1.0 to 99.0 mole percent of a hydroxyalkanoic acid component selected from lactic acid, glycolic acid and mixtures thereof, 98.9 to 1.0 mole percent of a single first glycol selected from ethylene glycol, 1,3-propanediol, and 1,4-butanediol, 0.1 to 30.0 mole percent of a poly(alkylene ether) glycol, 0 to 5.0 mole percent of an other glycol, 0 to 5.0 mole percent of a polyfunctional branching agent, and optionally an effective amount of a color reducing agent. The aromatic copolyetheresters can contain fillers.

A further preferred aspect of the present invention includes oriented film, such as uniaxially or biaxially oriented film, comprising aromatic copolyetheresters that contain from 1.0 to 99.0 mole percent of a hydroxyalkanoic acid component and 0.1 to 30.0 mole percent of a poly(alkylene ether) glycol. The aromatic copolyetheresters consist essentially of 99.0 to 1.0 mole percent of an aromatic dicarboxylic acid component, 1.0 to 99.0 mole percent of a hydroxyalkanoic acid component selected from lactic acid, glycolic acid, and mixtures thereof, 98.9 to 1.0 mole percent of a single first glycol selected from ethylene glycol, 1,3-propanediol, and 1,4-butanediol, 0.1 to 30.0 mole percent of a poly(alkylene ether) glycol, 0 to 5.0 mole percent of an other glycol, 0 to 5.0 mole percent of a polyfunctional branching agent, and optionally an effective amount of a color reducing agent. In some embodiments, the aromatic copolyetheresters contain fillers.

A further preferred aspect of the present invention includes films laminated onto substrates comprising aromatic copolyetheresters that contain from 1.0 to 99.0 mole percent of a hydroxyalkanoic acid component and 0.1 to 30.0 mole percent of a poly(alkylene ether) glycol and processes to produce same. Substrates that can be laminated include, for example, paper, paperboard, inorganic foams, organic foams, and inorganic-organic foams. The aromatic copolyetheresters consist essentially of 99.0 to 1.0 mole percent of an aromatic dicarboxylic acid component, 1.0 to 99.0 mole percent of a hydroxyalkanoic acid component selected from lactic acid, glycolic acid and mixtures thereof, 98.9 to 1.0 mole percent of a single first glycol selected from the group of ethylene glycol, 1,3-propanediol, and 1,4-butanediol, 0.1 to 30.0 mole percent of a poly(alkylene ether) glycol, 0 to 5.0 mole percent of an other glycol, 0 to 5.0 mole percent of a polyfunctional branching agent, and optionally an effective amount of a color reducing agent. The aromatic copolyetheresters can contain fillers.

A further preferred aspect of the present invention includes films coated onto substrates comprising aromatic copolyetheresters that contain from 1.0 to 99.0 mole percent of a hydroxyalkanoic acid component and 0.1 to 30.0 mole percent of a poly(alkylene ether) glycol and processes to produce same. The substrates may include, for example, paper, paperboard, inorganic foams, organic foams, inorganic-organic foams. The aromatic copolyetheresters consist essentially of 99.0 to 1.0 mole percent of an aromatic dicarboxylic acid component, 1.0 to 99.0 mole percent of a hydroxyalkanoic acid component selected from lactic acid, glycolic acid, and mixtures thereof, 98.9 to 1.0 mole percent of a single first glycol selected from ethylene glycol, 1,3-propanediol, and 1,4-butanediol, 0.1 to 30.0 mole percent of a poly(alkylene ether) glycol, 0 to 5.0 mole percent of an other glycol, 0 to 5.0 mole percent of a polyfunctional branching agent, and optionally an effective amount of a color reducing agent. The aromatic copolyetheresters can contain fillers.

A further preferred aspect of the present invention includes food packages made from films comprising aromatic copolyetheresters that contain from 1.0 to 99.0 mole percent of a hydroxyalkanoic acid component and 0.1 to 30.0 mole percent of a poly(alkylene ether) glycol for food packaging end uses, especially for disposable food packaging end uses such as food wraps. The aromatic copolyetheresters consist essentially of 99.0 to 1.0 mole percent of an aromatic dicarboxylic acid component, 1.0 to 99.0 mole percent of a hydroxyalkanoic acid component selected from lactic acid, glycolic acid and mixtures thereof, 98.9 to 1.0 mole percent of a single first glycol selected from ethylene glycol, 1,3-propanediol, and 1,4-butanediol, 0.1 to 30.0 mole percent of a poly(alkylene ether) glycol, 0 to 5.0 mole percent of an other glycol, 0 to 5.0 mole percent of a polyfunctional branching agent, and optionally an effective amount of a color reducing agent. The aromatic copolyetheresters can contain fillers.

In some preferred embodiments, particularly for food packaging, the films are oriented, e.g., uniaxially or biaxially oriented.

A further preferred aspect of the present invention includes laminates on substrates. The laminates are made from aromatic copolyetheresters that contain from 1.0 to 99.0 mole percent of a hydroxyalkanoic acid component and 0.1 to 30.0 mole percent of a poly(alkylene ether) glycol for food packaging or food service end uses. Useful substrates include, for example, paper, paperboard, inorganic foams, organic foams, and inorganic-organic foams. The aromatic copolyetheresters consist essentially of 99.0 to 1.0 mole percent of an aromatic dicarboxylic acid component, 1.0 to 99.0 mole percent of a hydroxyalkanoic acid component selected from lactic acid, glycolic acid and mixtures thereof, 98.9 to 1.0 mole percent of a single first glycol selected from ethylene glycol, 1,3-propanediol, and 1,4-butanediol, 0.1 to 30.0 mole percent of a poly(alkylene ether) glycol, 0 to 5.0 mole percent of an other glycol, 0 to 5.0 mole percent of a polyfunctional branching agent, and optionally an effective amount of a color reducing agent. The aromatic copolyetheresters can contain fillers.

A further preferred aspect of the present invention includes coatings, comprising aromatic copolyetheresters that contain from 1.0 to 99.0 mole percent of a hydroxyalkanoic acid component and 0.1 to 30.0 mole percent of a poly(alkylene ether) glycol, on substrates. The coated substrates can be used for food packaging or in food service application. Substrates suitable for coating include, for example, paper, paperboard, inorganic foams, organic foams, and inorganic-organic foams. The aromatic copolyetheresters consist essentially of 99.0 to 1.0 mole percent of an aromatic dicarboxylic acid component, 1.0 to 99.0 mole percent of a hydroxyalkanoic acid component selected from lactic acid, glycolic acid and mixtures thereof, 98.9 to 1.0 mole percent of a single first glycol selected from the group of ethylene glycol, 1,3-propanediol, and 1,4-butanediol, 0.1 to 30.0 mole percent of a poly(alkylene ether) glycol, 0 to 5.0 mole percent of an other glycol, 0 to 5.0 mole percent of a polyfunctional branching agent, and optionally an effective amount of a color reducing agent. The aromatic copolyetheresters can contain fillers.

DETAILED DESCRIPTION OF THE INVENTION

The present invention includes composition and shaped articles, such as films, coatings, and laminates, of certain aromatic copolyetheresters containing a hydroxyalkanoic acid component, and processes to produce the aromatic copolyetheresters. The aromatic copolyetheresters, and films and shaped articles containing the aromatic copolyetheresters, have enhanced thermal properties in comparison to some known aromatic copolyetheresters. Moreover, films, laminates, and coated articles containing the aromatic copolyetheresters have an optimized balance of physical properties, such as toughness, thermal dimensional stability and moisture barrier, compared to such articles made of known aromatic copolyetheresters.

The present invention further includes coated substrates, and laminated substrates such as, for example, paper, paperboard, inorganic foams, organic foams, inorganic-organic foams, wherein the coatings or laminates comprise aromatic copolyetheresters containing a hydroxyalkanoic acid component. Substrates having coatings or laminates of the aromatic copolyetheresters are useful, for example, in food packaging, especially for disposable food packaging such as wraps, cups, bowls, and plates.

The aromatic copolyetheresters consist essentially of 1) an acid component: 99.0 to 1.0 mole percent of an aromatic dicarboxylic acid component; 1.0 to 99.0 mole percent of a hydroxyalkanoic acid selected from lactic acid, glycolic acid and mixtures thereof; and 2) a glycol component: 98.9 to 1.0 mole percent of a single first glycol selected from ethylene glycol, 1,3-propanediol, and 1,4-butanediol; 0.1 to 30.0 mole percent of a poly(alkylene ether) glycol; 0 to 5.0 mole percent of an other glycol; 0 to 5.0 mole percent of a polyfunctional branching agent; and optionally an effective amount of a color reducing agent component. As used herein, mole percents of acid components in the copolyetheresters are based on the total acid components in the copolyetherester, wherein the total of the mole percent of the aromatic dicarboxylic acid component and the hydroxyalkanoic acid component is 100 mole percent; and the total of the mole percents of the single first glycol, the poly(alkylene ether) glycol, and other glycol, and the optional polyfunctional branching agent is approximately equal to the mole percent of the aromatic dicarboxylic acid component incorporated into the acid component.

The aromatic dicarboxylic acid component is selected from unsubstituted and substituted aromatic dicarboxylic acids, the lower alkyl esters of aromatic dicarboxylic acids having from 8 carbons to 20 carbons, and bisglycolate esters of aromatic dicarboxylic acids. Examples of desirable diacid moieties include those derived from terephthalates, isophthalates, naphthalates and bibenzoates. Specific examples of the desirable aromatic dicarboxylic acid component include terephthalic acid, dimethyl terephthalate, isophthalic acid, dimethyl isophthalate, 2,6-naphthalene dicarboxylic acid, dimethyl-2,6-naphthalate, 2,7-naphthalene dicarboxylic acid, dimethyl-2,7-naphthalate, 3,4'-diphenyl ether dicarboxylic acid, dimethyl-3,4'-diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), bis(2-hydroxyethyl) terephthalate, bis(2-hydroxyethyl)isophthalate, bis(3-hydroxypropyl)terephthalate, bis(4-hydroxybutyl) terephthalate, bis(4-hydroxybutyl)isophthalate, and bis(3-hydroxypropyl)isophthalate, and mixtures derived therefrom. Preferably, the aromatic dicarboxylic acid component is derived from terephthalic acid, dimethyl terephthalate, isophthalic acid, dimethyl isophthalate, 2,6-naphthalene dicarboxylic acid, dimethyl-2,6-naphthalate, and mixtures derived therefrom. Essentially any aromatic dicarboxylic acid known can be used. Preferably, the aromatic dicarboxylic acid component is selected from terephthalic acid and isophthalic acid and lower alkyl esters thereof, such as dimethyl terephthalate and dimethyl isophthalate, and glycolate esters, such as bis(2-hydroxyethyl)terephthalate, bis(2-hydroxyethyl)isophthalate, bis(3-hydroxypropyl) terephthalate, bis(4-hydroxybutyl)terephthalate, bis(4-hydroxybutyl)isophthalate, and bis(3-hydroxypropyl)isophthalate, and mixtures thereof. Preferably, the aromatic copolyetheresters containing hydroxyalkanoic acid residues include between 99 and 30 mole percent of the aromatic dicarboxylic acid component. More preferably, the aromatic copolyetheresters containing hydroxyalkanoic acid residues include between 99 and 50 mole percent of the aromatic dicarboxylic acid component. Even more preferably, the aromatic copolyetheresters containing hydroxyalkanoic acid residues include between 95 and 50 mole percent of the aromatic dicarboxylic acid component.

The hydroxyalkanoic acid component is selected from lactic acid and glycolic acid, the lower alkyl esters thereof having 2 to 10 carbon atoms, glycolate esters of lactic acid and glycolic acid, cyclic dimers of lactic acid and glycolic acid, and oligomers and polymers of lactic acid and glycolic acid. Specific examples of the desirable hydroxyalkanoic acid component include; lactic acid, DL-lactic acid, L-lactic acid, glycolic acid, methyl lactate, methyl (R)-(+)-lactate, methyl (S)-(−)-lactate, methyl glycolate, ethyl lactate, ethyl (R)-(+)-lactate, ethyl (S)-(−)-lactate, ethyl glycolate, (2-hydroxyethyl)lactate, (2-hydroxyethyl) (R)-(+)-lactate, (2-hydroxyethyl) (S)-(−)-lactate, (3-hydroxypropyl)lactate, (3-hydroxypropyl) (R)-(+)-lactate, (3-hydroxypropyl) (S)-(−)-lactate, (4-hydroxybutyl)lactate, (2-hydroxyethyl)glycolate, (3-hydroxypropyl)glycolate, (4-hydroxybutyl)glycolate, lactide, 3,6-dimethyl-1,4-dioxane-2,5-dione, L-lactide, (3 S-cis)-3,6-dimethyl-1,4-dioxane-2,5-dione, glycolide, poly(lactide), poly(DL-lactide), poly(glycolide) and mixtures derived therefrom. Essentially any derivative of lactic acid and glycolic acid known within the art can be used. Preferably, the hydroxyalkanoic acid component is bio-derived. Preferably, the aromatic copolyetheresters contain between 1 and 70 mole percent of the hydroxyalkanoic acid component. More preferably, the aromatic copolyetheresters contain between 1 and 50 mole percent of the hydroxyalkanoic acid component. Even more preferably, the aromatic copolyetheresters contain between 5 and 50 mole percent of the hydroxyalkanoic acid component.

The poly (alkylene ether) glycols preferably have a molecular weight in the range of about 500 to about 4000. Specific examples of poly(alkylene ether)glycols usefti include poly (ethylene glycol), poly(1,3-propylene glycol), poly(1,4-butylene glycol), (polytetrahydrofuran), poly(pentmethylene glycol), poly(hexamethylene glycol), poly(hepthamethylene glycol), poly(ethylene glycol)-block-poly (propylene glycol)-block-poly(ethylene glycol), 4,4'-isopropylidenediphenol ethoxylate (Bisphenol A ethoxylate), 4,4'-(1-phenylethylidene)bisphenol ethoxylate (Bisphenol AP ethoxylate), 4,4'-ethylidenebisphenol ethoxylate (Bisphenol E ethoxylate), bis(4-hydroxyphenyl)methane ethoxylate (Bisphenol F ethoxylate), 4,4'-(1,3-phenylenediisopropylidene)bisphenol ethoxylate (Bisphenol M ethoxylate), 4,4'-(1,4-phenylenediisopropylidene)bisphenol etboxylate (Bisphenol P ethoxylate), 4,4' sulfonyldiphenol ethoxylate (Bisphenol S ethoxylate), 4,4'-cyclohexylidenebisphenol ethoxylate (Bisphenol Z ethoxylate), and mixtures thereof. Essentially any poly (alkylene ether) glycol known can be used. Preferably, the aromatic copolyetheresters contain between 0.1 and 20 mole percent of the poly (alkylene ether) glycol. More preferably, the aromatic copolyetheresters contain between 0.1 and 15 mole percent of the poly (alkylene ether) glycol.

The optional other, i.e., second, glycol component can be selected from unsubstituted, substituted, straight chain, branched, cyclic aliphatic, aliphatic-aromatic and aromatic diols having from 2 carbon atoms to 36 carbon atoms. Specific examples of the desirable other glycol include ethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, isosorbide, di(ethylene glycol), tri(ethylene glycol) and mixtures derived therefrom. Essentially any glycol known can be used as the optional other glycol.

The optional polyfunctional branching agent can be any material with three or more carboxylic acid functions, ester functions, hydroxy functions or a mixture thereof; i.e., a polyfunctional acid or alcohol. Specific examples of desirable polyfunctional branching agents include 1,2,4-benzenetricarboxylic acid, (trimellitic acid), trimethyl-1,2,4-benzenetricarboxylate, tris(2-hydroxyethyl)-1,2,4-benzenetricarboxylate, 1,2,4-benzenetricarboxylic anhydride, (trimellitic anhydride), 1,3,5-benzenetricarboxylic acid, 1,2,4,5-benzenetetracarboxylic acid, (pyromellitic acid), 1,2,4,5-benzenetetracarboxylic dianhydride, (pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, glycerol, 2-(hydroxymethyl)-1,3-propanediol, 2,2-bis(hydroxymethyl)propionic acid, and mixtures therefrom. Essentially any polyfunctional material which includes three or more carboxylic acid or hydroxyl functions (polyfunctional acid, alcohol and mixtures thereof) can be used. It may be preferred to include the polyfunctional branching agent when higher resin melt viscosity is desired for specific end uses. Examples of such end uses for which higher resin melt viscosities may be desired include melt extrusion coatings, melt blown films or containers, and foams. Preferably, the aromatic copolyetheresters contain 0 to 1.0 mole percent of the polyfunctional branching agent.

The optional color reducing agent can be any material that effectively reduces the color of the formed polymer. Examples of general classes of color reducing agents include phosphorus-containing materials, hindered phenolic materials, such as antioxidants, nitrogen-containing materials, especially secondary and tertiary amines, hindered amine light stabilizers, (HALS), and mixtures thereof. Any material that reduces the color of the aromatic copolyetheresters can be used.

Specific examples of phosphorus-containing materials include phosphoric acid, phosphorous acid, hypophosphorous acid, sodium hypophosphite, potassium tripolyphosphate, polyphosphoric acid, 6H-dibenzo[c,e]oxaphosphorin-6-oxide, phenylphosphinic acid, phenylphosphinic acid, sodium salt hydrate, diphenyl phosphite, potassium pyrophosphate, sodium pyrophosphate decahydrate, triethyl phosphate, 2,2'-ethylidenebis(4,6-di-tert-butylphenyl)fluorophosphite, 3,9-bis(2,4-dicumylphenoxy)-2,4,8,10-tetraoxa-3,9-diphosphaspiro[5.5]undecane, 3,9-bis(octadecyloxy)-2,4,8,10-tetraoxa-3,9-diphosphaspiro[5.5]undecane, diisodecyl phenyl phosphite, 4,4'-isopropylidenebis(diisodecyl phenyl phosphite), tetrakis(2,4-di-tert-butylphenyl)-4,4'-biphenyldiphosphonite, triisodecyl phosphite, tris(2,4-di-tert-butylphenyl) phosphite, tris(nonylphenyl) phosphite, tris(tridecyl) phosphite, calcium bis[monoethyl(3,5-di-tert-butyl-4-hydroxybenzyl)phosphonate], 2,2',2"-nitrilo triethyl-tris[3,3',5',5'-tetra-tert-butyl-1,1'-biphenyl-2,2'-diyl] phosphite, bis[2,4-bis(1,1-dimethylethyl)-6-methylphenyl] ethyl ester of phosphorous acid, bis(2,4-di-tert-butylphenyl)-pentaerythritol diphosphite, and mixtures thereof.

Specific examples of hindered phenolic materials include 1,3,5-trimethyl-2,4,6-tris(3,5-di-tert-butyl-4-hydroxybenzyl)benzene, 2-(2H-benzotriazol-2-yl)-4-(1,1,3,3-tetramethylbutyl)phenol, 3-tert-butyl-4-hydroxy-5-methylphenyl sulfide, 5-tert-butyl-4-hydroxy-2-methylphenyl sulfide, 2,4-di-tert-butyl-6-(5-chloro-2H-benzotriazol-2-yl)phenol, 2,2'-ethylidenebis(4,6-di-tert-butylphenol), 4,4'-isopropylidenebis(2,6-dimethylphenol), 2,2'-methylenebis[6-(2H-benzotriazol-2-yl)-4-(1,1,3,3-tetramethylbutyl) phenol], 2-(2H-benzotriazol-2-yl)-4,6-bis-(1-methyl-1-phenylethyl)phenol, 2-(2'-hydroxy-3',5'-di-tert-amylphenyl) benzotriazole, 2-(2H-benzotriazol-2-yl)-4-(1,1,3,3-tetramethylbutyl)phenol, 2-(2'-hydroxy-5'-methylphenyl) benzotriazole, 2,2'-methylenebis(6-tert-butyl-4-ethylphenol), 2,2'-methylenebis(6-tert-butyl-4-methylphenol), 4,4'-methylenebis(2,6-di-tert-butylphenol), octadecyl 3-(3,5-di-tert-butyl-4-hydroxyphenyl)propionate, pentaerythritol tetrakis(3,5-di-tert-butyl-4-hydroxyhydrocinnamate), tetrakis[methylene(3,5-di-tert-butyl-4-hydroxyhydrocinnamate)]methane, tris(4-tert-butyl-3-hydroxy-2,6-dimethylbenzyl) isocyanurate, tris(3,5-di-tert-butyl-4-hydroxybenzyl)isocyanurate, 1,3,5-tris-(3,5-di-tert-butyl-4-hydroxybenzyl)-s-triazine-2,4,6(1H,3H,5H)trione, 1,1,3-tris (2-methyl-4-hydroxy-5-tert-butylphenyl)butane, Vitamin E, 2,5,7,8-tetramethyl-2-(4',8',12'-trimethyltridecyl)-6-chromanol, alpha-tocopherol, ethylene bis(oxyethylene) bis(3-tert-butyl-4-hydroxy-5-methylhydrocinnamate), hexamethylene bis(3,5-di-tert-butyl-4-hydroxyhydrocinnamate), 4-[[4,6-bis(octylthio)-s-triazin-2-yl]amino]-2,6-di-tert-butylphenol, N,N'-1,3-propanediylbis(3,5-di-tert-butyl-4-hydroxyhydrocinnamide), N. N'-hexamethylene bis(3,5-di-tert-butyl-4-hydroxyhydrocinnamide), thiodiethylene bis (3,5-di-tert-butyl-4-hydroxyhydrocinnamate), 2-methyl-4,6-bis[(octylthio)methyl]phenol, 3,5-di-tert-butyl-4-hydroxyhydrocinnamic acid triester with 1,3,5-tris(2-hydroxyethyl)-s-triazine-2,4,6(1H,3H,5H)-trione, 1,2-bis(3, 5-di-tert-butyl-4-hydroxyhydrocinnamoyl)hydrazine, mono-methylhydroquinone, mono-tert-butylhydroquinone, 2,5-di-tert-butylhydroquinone, and mixtures thereof.

Specific examples of nitrogen-containing materials include trioctyl amine, tridodecylamine, triisodecylamine, triisooctylamine, trioctylamine, bis(hydrogenated tallow alkyl)amines, bis(hydrogenated tallow alkyl)amines, oxidized, 4-acetamido-2,2,6,6-tetramethylpiperidine, N-(1-acetyl-2,2,6,6-tetramethyl-4-piperidinyl)-2-dodecylsuccinimide, bis[2-[2-(1-methylethyl)-3-oxazolidinyl]ethyl] 1,6- hexanediylbiscarbamate, N,N'-bis(2,2,6,6-tetramethyl-4-piperidinyl)-1,6-hexanediamine, 1,4-diazabicyclo[2.2.2]octane, 4-(dimethylamino)-1,2,2,6,6-pentamethylpiperidine, 4-dimethylamino-2,2,6,6-tetramethylpiperidine, 2-dodecyl-N-(1,2,2,6,6-pentamethyl-4-piperidinyl)succinimide, 2-dodecyl-N-(2,2,6,6-tetramethyl-4-piperidinyl)succinimide, hexahydro-2,6-bis(2,2,6,6-tetramethyl-4-piperidinyl)-1H,4H,5H,8H-2,3a,4a,6,7a,8a-hexaazacyclopenta[def]fluorene-4,8-dione, 4-hydroxy-2,2,6,6-tetramethyl-4-piperidinecarboxylic acid, phenothiazine, poly[N,N'-bis(2,2,6,6-tetramethyl-4-piperidinyl)1,6-hexanediamine-co-2,4-dichloro-6-morpholino-1,3,5-triazine], poly(1,2-dihydro-2,2,4-trimethylquinoline), 7,7,9,9-tetramethyl-1,4-dioxa-8-azaspiro[4.5]decane-2-methanol, 2,2,6,6-tetramethylpiperidine, 2,2,6,6-tetramethyl-4-piperidinol, poly[[6-[-(1,1,3,3-tetramethylbutyl)amino]-s-triazine-2,4-diyl][2,2,6,6-tetramethyl-4-piperidyl)imino]hexamethylene [(2,2,6,6-tetramethyl-4-piperidyl)imino]], reaction products of N-phenylbenzenamine with 2,4,4-trimethylpentenes, dimethyl succinate polymer with 4-hydroxy-2,2,6,6-tetramethyl-1-piperidineethanol, 2,2'-(2,5-thiophenediyl)bis[5-tert-butylbenzoxazole], bis(2,2,6,6-tetramethyl-4-piperidinyl)sebacate, 1,3,5-triazine-2,4,6-triamine, N,N'-[1,2-ethanediylbis[N-[3-[4,6-bis-[butyl(1,2,2,6,6-penyamethyl-4-piperidinyl)amino]-1,3,5-triazin-2-yl]amino]propyl]-[N',N"-dibutyl-N',N"-bis(1,2,2,6,6-pentamethyl-4-piperidinyl), bis(1-octyloxy-2,2,6,6-tetramethyl-4-piperidinyl)sebacate, and mixtures thereof.

As will be understood by one skilled in the art, "an effective amount" of color reducing agent can be within a wide range due to the great diversity of the chemical structures and molecular weights of compounds that function as color reducing agents. Preferably, an effective amount is from about 0.001 to 5 weight percent of color reducing agent based on the weight of the polymer. More preferably, an effective amount includes 0.001 to 1 weight percent of color reducing agent based on the weight of the polymer. Even more preferably, an effective amount includes 0.001 to 0.5 weight percent of the color reducing agent based on the weight of the polymer.

The color reducing agent can be added at any stage of the polymerization. For example, the color reducing agent can be added with the monomers, after the esterification or transesterification process, or at any stage of the finishing operation. Preferably the color reducing agent is added prior to the polymer reaching an inherent viscosity of about 0.50 dL/g. More preferably, the color reducing agent is added prior to the polymer reaching an inherent viscosity of about 0.25 dL/g. If desired, additional color reducing agent can be added after the polymerization to reduce color formation in subsequent processes, such as fabrication into shaped articles or other finished products.

While the color reducing agent can reduce color at any polymerization temperature, the use thereof may be advantageous for some applications in that it enables the use of higher polymerization temperatures without undue increases in the discoloration of the polymer. As one skilled within the art will appreciate, the polymerization rate is generally enhanced as the polymerization temperature is increased, allowing for a more rapid, economical polymerization process.

The molecular weight of a polymer is normally not measured directly. Instead, the inherent viscosity of the polymer in solution or the melt viscosity is used as an indicator of molecular weight. The inherent viscosities are an indicator of molecular weight for comparisons of samples within a polymer family, such as poly(ethylene terephthalate), poly(butylene terephthalate), etc., and are used as the indicator of molecular weight herein. To provide desirable physical properties, the aromatic copolyetheresters preferably have an inherent viscosity (IV) of at least 0.15, as measured on a 0.5 percent (weight/volume) solution of the copolyetherester in a 50:50 (weight) solution of trifluoroacetic acid:dichloromethane solvent system at room temperature. More desirably, the (IV) of the aromatic copolyetheresters is at least 0.35 dL/g. However, higher inherent viscosities are desirable for many other applications, such as films, bottles, sheet, and molding resin. The polymerization conditions can be adjusted to obtain the desired inherent viscosities up to at least about 0.5 and desirably higher than 0.65 dL/g. Further processing of the copolyetherester, using methods known to those skilled in the art, can produce inherent viscosities of 0.7, 0.8, 0.9, 1.0, 1.5, or 2.0 dL/g and even higher.

The aromatic copolyetheresters can be prepared by any conventional polycondensation technique. The product compositions may vary somewhat based on the method of preparation used, particularly in the resulting amount of diol and hydroxyalkanoic acid component in the polymer. Preferably, the aromatic copolyetheresters are made using a melt polymerization process. In melt polymerization processes, the aromatic dicarboxylic acid component (as acid, ester, glycolate ester, polymer, or mixtures thereof, the hydroxyalkanoic acid component (as acid, ester, glycolate ester, cyclic dimer, polymer, or mixtures thereof, the poly(alkylene ether) glycol, the first glycol, the other glycol, optionally the polyfunctional branching agent, and optionally the color reducing agent, are combined in the presence of a catalyst at a high enough temperature that the monomers combine to form esters and diesters, then oligomers, and finally polymers. The polymeric product at the end of the polymerization process is a molten product. Generally, the first glycol and the other glycol are volatile and excesses thereof distill from the reactor as the polymerization proceeds. When polymeric components are utilized, they can be heated to a temperature high enough to melt the polymeric components. Additional catalysts can be used, or the polymerization can be conducted with catalyst residues incorporated within the polymeric component(s). When all of the components used in synthesizing the copolyetheresters are polymeric, the polymerization process is commonly referred to as transesterification. Such procedures are known to those skilled in the art.

The melt process conditions, particularly the amounts of monomers used, depend on the polymer composition desired. The amount of the first glycol, other glycol, aromatic dicarboxylic acid component, hydroxyalkanoic acid component, poly(alkylene ether) glycol, and branching agent are desirably chosen so that the polymeric product contains the desired amounts of the various monomer units, desirably with equimolar amounts of monomer units derived from the respective diol and diacid components. Because of the volatility of some of the monomers, especially that of some of the hydroxyalkanoic acid components, of the other glycols, and of the glycol component, and depending on such variables as whether the reactor is sealed, (i.e. is under pressure), the polymerization temperature ramp rate, and the efficiency of the distillation columns used in synthesizing the polymer, some of the monomers may or can be used in excess at the beginning of the polymerization reaction and removed by distillation as the reaction proceeds. This is particularly true of the hydroxyalkanoic acid component, the first glycol, and the other glycol.

The amount of monomers to be charged to the reactor can be determined by a skilled practitioner, but often will be in the following ranges. Excesses of the diacid, hydroxyalkanoic acid, the first glycol and the other glycol are often desirably charged, and the excess diacid, hydroxyalkanoic acid, glycol and other glycol can be removed by distillation or other means of evaporation as the polymerization reaction proceeds. Ethylene glycol, 1,3-propanediol, 1,4-butanediol are desirably charged at 10 to 100 percent greater than the content desired in the polymer. More preferably, the glycol component is charged at 20 to 70 percent greater than the content desired in the polymer. The other glycol is desirably charged at 0 to 100 percent greater than the content desired in the polymer; the preferred amount depends on the volatility of the other glycol.

The width of the ranges given for the monomers is due to variation in the monomer loss during polymerization, which depends on the efficiency of distillation columns and other kinds of recovery and recycle systems, and thus the ranges are only an approximation.

In the polymerization process, the monomers are combined, and heated gradually with mixing with a catalyst or catalyst mixture to a temperature in the range of 150 C to about 300 C, desirably 180 C to 275 C. The conditions and the nature and quantity of the catalysts depend on whether the acids are polymerized as true acids, as esters, or as polymers. The catalyst can be included initially with the reactants, and/or can be added one or more times to the mixture as it is heated. The catalyst used can be adjusted as the reaction proceeds. The heating and stirring are continued for a sufficient time and to a sufficient temperature, generally with removal by distillation of excess reactants, to yield a molten polymer having a high enough molecular weight to be suitable for making fabricated products.

Catalysts that can be used include salts of Li, Ca, Mg, Mn, Zn, Pb, Sb, Sn, Ge, and Ti, such as acetate salts and oxides, including glycol adducts, and Ti alkoxides. An appropriate catalyst, or combination or sequence of catalysts, can be selected by a skilled practitioner. The preferred catalyst and preferred conditions differ depending on, for example, whether the diacid monomer is polymerized as the free diacid, as a dimethyl ester, or as the polymer, the hydroxyalkanoic acid monomer is polymerized as the free acid, as the ester, as the cyclic dimer, or as the polymer, and on the composition of the diol components. Essentially any catalyst system known can be used.

Alternatively, the aromatic dicarboxylic acid and the hydroxyalkanoic acid components can be replaced with oligomers or polymers derived therefrom. For example, poly(lactide) can be substituted for lactic acid.

As a further alternative, polymers containing hydroxyalkanoic acid residues can be combined to form the aromatic copolyetheresters containing hydroxyalkanoic acid components. While it is not intended that the present invention be bound by any particular mechanism or theory, typically when two polymers are melt mixed together, they transesterify to initially form copolymers with long blocks of each of the initial polymers added. The resulting blocky copolymers then further transesterify to form block copolymers with shorter blocks of the constituent polymers. The block copolymers can then transesterify to form random copolymers. Melt mixing can be stopped at any time to form block aromatic copolyetheresters with hydroxyalkanoic acid residues with long blocks of the constituent polymers used as the starting materials, block aromatic copolyetheresters with hydroxyalkanoic acid residues with short blocks of the constituent polymers used as the starting materials, random aromatic copolyetheresters with hydroxyalkanoic acid residues with no blocks of the constituent polymers used as the starting materials, or any aromatic copolyetherester with hydroxyalkanoic acid residues desired. When polymers are utilized to produce the aromatic copolyetheresters containing hydroxyalkanoic acid residues, catalysts can be added if desired.

The monomer composition of the polymer can be selected for specific uses and for specific sets of properties. As one skilled in the art will appreciate, the thermal properties of the property are a function of the composition and quantity of each component used in making the polymer. Polymers made by the melt condensation process generally have adequate inherent viscosity for many applications. Solid-state polymerization can be used to achieve even higher inherent viscosities (molecular weights).

The product made by melt polymerization, after extruding, cooling and pelletizing, may be essentially noncrystalline. Noncrystalline material can be made semicrystalline by heating it to a temperature above the glass transition temperature for an extended period of time. This induces crystallization so that the product can then be heated to a higher temperature to raise the molecular weight.

The polymer can be crystallized prior to solid-state polymerization by treatment with a relatively poor solvent for polyesters, which induces crystallization. Such solvents reduce the glass transition temperature (Tg) allowing for crystallization. Solvent induced crystallization of polyesters is known, and is disclosed in U.S. Pat. No. 5,164,478 and U.S. Pat. No. 3,684,766. The semicrystalline polymer can be subjected to solid-state polymerization by placing the pelletized or pulverized polymer into a stream of an inert gas, usually nitrogen, or under a vacuum of 1 Torr, at an elevated temperature, but below the melting temperature of the polymer, for an extended period of time.

The aromatic copolyetheresters containing hydroxyalkanoic acid residues can also contain additives conventional in the art. It is preferred that the additives are nontoxic, biodegradable and biobenign. Such additives may include thermal stabilizers, for example, phenolic antioxidants, secondary thermal stabilizers, for example, thioethers and phosphites, UV absorbers, for example benzophenone- and benzotriazole-derivatives, UV stabilizers, for example, hindered amine light stabilizers (HALS). Other additives that can be used include plasticizers, processing aids, flow enhancing additives, lubricants, pigments, flame retardants, impact modifiers, nucleating agents to increase crystallinity, anti-blocking agents such as silica, base buffers, such as sodium acetate, potassium acetate, and tetramethyl ammonium hydroxide, (for example; as disclosed in U.S. Pat. No. 3,779,993, U.S. Pat. No. 4,340,519, U.S. Pat. No. 5,171,308, U.S. Pat. No. 5,171,309, and U.S. Pat. No. 5,219,646 and references cited therein). Specific examples of plasticizers, which can be added to improve processing, mechanical properties, or to reduce rattle or rustle of the films, coatings and laminates of the present invention, include soybean oil, epoxidized soybean oil, corn oil, caster oil, linseed oil, epoxidized linseed oil, mineral oil, alkyl phosphate esters, Tween® 20, Tween® 40, Tween® 60, Tween® 80, Tween® 85, sorbitan monolaurate, sorbitan monooleate, sorbitan monopalmitate, sorbitan trioleate, sorbitan monostearate, citrate esters, such as trimethyl citrate, triethyl citrate, (Citroflex® 2, produced by Morflex, Inc. Greensboro, N.C.), tributyl citrate, (Citroflex® 4, produced by Morflex, Inc., Greensboro, N.C.), trioctyl citrate, acetyltri-n-butyl citrate, (Citroflex® A-4, produced by Morflex, Inc., Greensboro, N.C.), acetyltriethyl citrate, (Citroflex® A-2, produced by Morflex, Inc., Greensboro, N.C.), acetyltri-n-hexyl citrate, (Citroflex® A-6, produced by Morflex, Inc., Greensboro, N.C.), and butyryltri-n-hexyl citrate, (Citroflex® B-6, produced by Morflex, Inc., Greensboro, N.C.), tartarate esters, such as dimethyl tartarate, diethyl tartarate, dibutyl tartarate, and dioctyl tartarate, poly(ethylene glycol), derivatives of poly(ethylene glycol), paraffin, monoacyl carbohydrates, such as 6-O-sterylglucopyranoside, glyceryl monostearate, Myvaplex® 600, (concentrated glycerol monostearates), Nyvaplex®, (concentrated glycerol monostearate which is a 90% minimum distilled monoglyceride produced from hydrogenated soybean oil and which is composed primarily of stearic acid esters), Myvacet, (distilled acetylated monoglycerides of modified fats), Myvacet® 507, (48.5 to 51.5 percent acetylation), Myvacet® 707, (66.5 to 69.5 percent acetylation), Myvacet® 908, (minimum of 96 percent acetylation), Myverol®, (concentrated glyceryl monostearates), Acrawax®, N,N-ethylene bis-stearamide, N,N-ethylene bis-oleamide, dioctyl adipate, diisobutyl adipate, diethylene glycol dibenzoate, dipropylene glycol dibenzoate, polymeric plasticizers, such as poly(1,6-hexamethylene adipate), poly(ethylene adipate), Rucoflex®, and other compatible low molecular weight polymers and mixtures thereof. Preferably, the plasticizers are nontoxic and biodegradable and/or bioderived. Essentially any additive known can be used.

In some embodiments, the copolyetheresters can filled with inorganic, organic and clay fillers, for example, wood flour, gypsum, talc, mica, carbon black, wollastonite, montmorillonite minerals, chalk, diatomaceous earth, sand, gravel, crushed rock, bauxite, limestone, sandstone, aerogels, xerogels, microspheres, porous ceramic spheres, gypsum dihydrate, calcium aluminate, magnesium carbonate, ceramic materials, pozzolamic materials, zirconium compounds, xonotlite, (a crystalline calcium silicate gel), perlite, vermiculite, hydrated or unhydrated hydraulic cement particles, pumice, perlite, zeolites, kaolin, clay fillers, including both natural and synthetic clays and treated and untreated clays, such as organoclays and clays which have been surface treated with silanes and stearic acid to enhance adhesion with the copolyester matrix, smectite clays, magnesium aluminum silicate, bentonite clays, hectorite clays, silicon oxide, calcium terephthalate, aluminum oxide, titanium dioxide, iron oxides, calcium phosphate, barium sulfate, sodium carbonate, magnesium sulfate, aluminum sulfate, magnesium carbonate, barium carbonate, calcium oxide, magnesium oxide, aluminum hydroxide, calcium sulfate, barium sulfate, lithium fluoride, polymer particles, powdered metals, pulp powder, cellulose, starch, chemically modified starch, thermoplastic starch, lignin powder, wheat, chitin, chitosan, keratin, gluten, nut shell flour, wood flour, corn cob flour, calcium carbonate, calcium hydroxide, glass beads, hollow glass beads, seagel, cork, seeds, gelatins, wood flour, saw dust, agar-based materials, reinforcing agents, such as glass fiber, natural fibers, such as sisal, hemp, cotton, wool, wood, flax, abaca, sisal, ramie, bagasse, and cellulose fibers, carbon fibers, graphite fibers, silica fibers, ceramic fibers, metal fibers, stainless steel fibers, and recycled paper fibers, for example, from repulping operations. Fillers can increase the Young's modulus, improve the dead-fold properties, improve the rigidity of the film, coating or laminate, decrease the cost, and reduce the tendency of the film, coating, or laminate to block or self-adhere during processing or use. The use of fillers can also aid in the production of plastic articles having some qualities of paper, such as texture and feel, as disclosed by, for example, Miyazaki, et al., in U.S. Pat. No. 4,578,296. Additives, fillers or blend materials can be added before the polymerization process, at any stage during the polymerization process or as a post polymerization process. Essentially any filler known can be used.

Clay fillers include natural and synthetic clays, and untreated and treated clays, such as organoclays and clays that have been surface treated with silanes or stearic acid to enhance the adhesion with the copolyester matrix. Some clays are treated with organic materials, such as surfactants, to make them organophilic. Specific usable clay materials include, for example, kaolin, smectite clays, magnesium aluminum silicate, bentonite clays, montmorillonite clays, hectorite clays, and mixtures thereof. Specific commercial examples of usable clay fillers include Gelwhite MAS 100, a commercial product of the Southern Clay Company, which is defined as a white smectite clay, (magnesium aluminum silicate); Claytone 2000, a commercial product of the Southern Clay Company, which is defined as a an organophilic smectite clay; Gelwhite L, a commercial product of the Southern Clay Company, which is defined as a montmorillonite clay from a white bentonite clay; Cloisite 30 B, a commercial product of the Southern Clay Company, which is defined as an organophilic natural montmorillonite clay with bis(2-hydroxyethyl)methyl tallow quarternary ammonium chloride salt; Cloisite Na, a commercial product of the Southern Clay Company, which is defined as a natural montmorillonite clay; Garamite 1958, a commercial product of the Southern Clay Company, which is defined as a mixture of minerals; Laponite RDS, a commercial product of the Southern Clay Company, which is defined as a synthetic layered silicate with an inorganic polyphosphate peptiser; Laponite RD, a commercial product of the Southern Clay Company, which is defined as a synthetic colloidal clay; Nanomers, which are commercial products of the Nanocor Company, which are defined as montmorillonite minerals which have been treated with compatibilizing agents; Nanomer 1.24TL, a commercial product of the Nanocor Company, which is defined as a montmorillonite mineral surface treated with amino acids; "P Series" Nanomers, which are commercial products of the Nanocor Company, which are defined as surface modified montmorillonite minerals; Polymer Grade (PG) Montmorillonite PGW, a commercial product of the Nanocor Company, which is defined as a high purity aluminosilicate mineral, sometimes referred to as a phyllosilicate; Polymer Grade (PG) Montmorillonite PGA, a commercial product of the Nanocor Company, which is defined as a high purity aluminosilicate mineral, sometimes referred to as a phyllosilicate; Polymer Grade (PG) Montmorillonite PGV, a commercial product of the Nanocor Company, which is defined as a high purity aluminosilicate mineral, sometimes referred to as a phyllosilicate; Polymer Grade (PG) Montmorillonite PGN, a commercial product of the Nanocor Company, which is defined as a high purity aluminosilicate mineral, sometimes referred to as a phyllosilicate, and mixtures thereof. Essentially any clay filler known can be used.

Some clay fillers of the present invention can exfoliate and form nanocomposites. This is especially true for the layered silicate clays, such as smectite clays, magnesium aluminum silicate, bentonite clays, montmorillonite clays, and hectorite clays. As discussed above, such clays may be natural or synthetic, treated or not. The clay particle size in the filled copolyester may be within a wide range.

The particle size of the filler can be within a wide range for use in the copolyetheresters. As one skilled within the art would appreciate, the filler particle size may be tailored based on the desired use of the filled copolyester composition. It is generally preferable that the average diameter of the filler be less than about 40 microns. It is more preferable that the average diameter of the filler be less than about 20 microns. The filler may include particle sizes ranging up to 40 mesh, (US Standard), or larger. Mixtures of filler particle sizes may also be advantageously utilized. For example, mixtures of calcium carbonate fillers with average particle sizes of about 5 microns and of about 0.7 microns may provide better space filling of the filler within the copolyester matrix. Use of two or more filler particle sizes allows for improved particle packing. Particle packing is the process of selecting two or more ranges of filler particle sizes in order that the spaces between a group of large particles are substantially occupied by a selected group of smaller filler particles. In general, the particle packing will be increased whenever any given set of particles is mixed with another set of particles having a particle size that is at least about 2 times larger or smaller than the first group of particles. The particle packing density for a two-particle system will be maximized whenever the size ratio of a given set of particles is from about 3 to 10 times the size of another set of particles. Similarly, three or more different sets of particles may be used to further increase the particle packing density. The optimal particle packing density depends on a number of factors, such as, for example, the types and concentrations of the various components within both the thermoplastic phase and the solid filler phase, the film, coating or lamination process used, and the desired mechanical, thermal and other performance properties of the products to be manufactured. Andersen, et al., in U.S. Pat. No. 5,527,387, disclose particle packing techniques. Filler concentrates containing a mixture of filler particle sizes are commercially available by the Shulman Company under the tradename Papermatch®.

The filler can be added to the polymer at any stage during the polymerization of the polymer or after the polymerization is completed. For example, the fillers can be added with the copolyester monomers at the start of the polymerization process. This is preferable for, for example, the silica and titanium dioxide fillers, to provide adequate dispersion of the fillers within the polyester matrix. Alternatively, the filler can be added at an intermediate stage of the polymerization, for example, as the precondensate passes into the polymerization vessel. As yet a further alternative, the filler can be added after the copolyetherester exits the polymerizer. For example, the aromatic copolyetherester can be melt fed to any intensive mixing operation, such as a static mixer or a single- or twin-screw extruder, and compounded with the filler.

As yet a further method to produce the filled aromatic copolyetheresters, the aromatic copolyetherester can be combined with the filler in a subsequent post polymerization process. Typically, such processes include intensive mixing of the molten copolyester with the filler. The intensive mixing can be done, for example, using static mixers, Brabender mixers, single screw extruders, twin screw extruders. Typically the copolyetheresters is dried and the dried copolyetherester can then be mixed with the filler. Alternatively, the copolyetherester and the filler can be cofed through two different feeders. In an extrusion process, the copolyetherester and the filler can be fed into the back feed section of the extruder. The copolyester and the filler can be advantageously fed into two different locations of the extruder. For example, the copolyester can be added in the back, feed section of the extruder while the filler is fed, ("side-stuffed"), in the front of the extruder near the die plate. The extruder temperature profile is set up to allow the copolyester to melt under the processing conditions. The screw design can provide stress and, in turn, heat, to the resin as it mixes the molten aromatic copolyetherester with the filler. Such processes to melt mix in fillers are disclosed, for example, by Dohrer, et al., in U.S. Pat. No. 6,359,050. Alternatively, the filler can be blended with the copolyetherester during the formation of a film or coating, as described below.

The aromatic copolyetheresters can be blended with other polymeric materials, which can be biodegradable or not biodegradable, naturally derived, modified naturally derived and/or synthetic.

Examples of blendable biodegradable materials include poly(hydroxy alkanoates), polycarbonates, poly(caprolactone), aliphatic polyesters, aliphatic-aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, copolymers thereof, and mixtures thereof. Specific examples thereof include the Biomax® sulfonated aliphatic-aromatic copolyesters of the DuPont Company, the Eastar Bio® aliphatic-aromatic copolyesters of the Eastman Chemical Company, the Ecoflex® aliphatic-aromatic copolyesters of the BASF Corporation, poly(1,4-butylene terephthalate-co-adipate, (50:50, molar), the EnPol® polyesters of the Ire Chemical Company, poly(1,4-butylene succinate), the Bionolle® polyesters of the Showa High Polymer Company, poly (ethylene succinate), poly(1,4-butylene adipate-co-succinate), poly(1,4-butylene adipate), poly(amide esters), the Bak® poly(amide esters) of the Bayer Company, poly (ethylene carbonate), poly(hydroxybutyrate), poly(hydroxyvalerate), poly(hydroxybutyrate-co-hydroxyvalerate), the Biopol® poly(hydroxy alkanoates) of the Monsanto Company, poly(lactide-co-glycolide-co-caprolactone), the Tone® poly(caprolactone) of the Union Carbide Company, the EcoPLA® poly(lactide) of the Cargill Dow Company and copolymers and mixtures thereof. Essentially any biodegradable material can be blended with the aromatic copolyetheresters.

Examples of blendable nonbiodegradable polymeric materials include polyethylene, high density polyethylene, low density polyethylene, linear low density polyethylene, ultralow density polyethylene, polyolefins, poly(ethylene-co-glycidylmethacrylate), poly(ethylene-co-methyl (meth) acrylate-co-glycidyl acrylate), poly(ethylene-co-n-butyl acrylate-co-glycidyl acrylate), poly(ethylene-co-methyl acrylate), poly(ethylene-co-ethyl acrylate), poly(ethylene-co-butyl acrylate), poly(ethylene-co-(meth)acrylic acid), metal salts of poly(ethylene-co-(meth)acrylic acid), poly ((meth)acrylates), such as poly(methyl methacrylate), poly (ethyl methacrylate), poly(ethylene-co-carbon monoxide), poly(vinyl acetate), poly(ethylene-co-vinyl acetate), poly (vinyl alcohol), poly(ethylene-co-vinyl alcohol), polypropylene, polybutylene, polyesters, poly(ethylene terephthalate), poly(1,3-propylene terephthalate), poly(1,4-butylene terephthalate), PETG, poly(ethylene-co-1,4-cyclohexanedimethanol terephthalate), poly(vinyl chloride), PVDC, poly(vinylidene chloride), polystyrene, syndiotactic polystyrene, poly(4-hydroxystyrene), novalacs, poly(cresols), polyamides, nylon, nylon 6, nylon 46, nylon 66, nylon 612, polycarbonates, poly(bisphenol A carbonate), polysulfides, poly(phenylene sulfide), polyethers, poly(2,6-dimethylphenylene oxide), polysulfones, and copolymers thereof and mixtures thereof.

Examples of blendable natural polymeric materials include starch, starch derivatives, modified starch, thermoplastic starch, cationic starch, anionic starch, starch esters, such as starch acetate, starch hydroxyethyl ether, alkyl starches, dextrins, amine starches, phosphate starches, dialdehyde starches, cellulose, cellulose derivatives, modified cellulose, cellulose esters, such as cellulose acetate, cellulose diacetate, cellulose priopionate, cellulose butyrate, cellulose valerate, cellulose triacetate, cellulose tripropionate, cellulose tributyrate, and cellulose mixed esters, such as cellulose acetate propionate and cellulose acetate butyrate, cellulose ethers, such as methylhydroxyethylcellulose, hydroxymethylethylcellulose, carboxymethylcellulose, methyl cellulose, ethylcellulose, hydroxyethylcellulose, and hydroxyethylpropylcellulose, polysaccharides, alginic acid, alginates, phycocolloids, agar, gum arabic, guar gum, acaia gum, carrageenan gum, furcellaran gum, ghatti gum, psyllium gum, quince gum, tamarind gum, locust bean gum, gum karaya, xantahn gum, gum tragacanth, proteins, Zein®, (a prolamine derived from corn), collagen, (extracted from animal connective tissue and bones), and derivatives thereof such as gelatin and glue, casein, (the principle protein in cow milk), sunflower protein, egg protein, soybean protein, vegetable gelatins, gluten, and mixtures thereof. Thermoplastic starch can be produced, for example, as disclosed in U.S. Pat. No. 5,362,777. Essentially any polymeric material known can be blended with the aromatic copolyetheresters.

The polymeric material to be blended with the copolyetherester can be added to the copolyetherester at any stage during the polymerization of the polymer or after the polymerization is completed. For example, the polymeric materials can be added with the copolyetherester monomers at the start of the polymerization process. Alternatively, the polymeric material can be added at an intermediate stage of the polymerization, for example, as the precondensate passes into the polymerization vessel. As yet a further alternative, the polymeric material can be added after the copolyester exits the polymerizer. For example, the copolyetherester and the polymeric material can be melt fed to any intensive mixing operation, such as a static mixer or a single- or twin-screw extruder and compounded together.

As yet a further method to produce blends, the copolyetherester can be combined with the polymeric material in a subsequent post polymerization process. Typically, such a process includes intensive mixing of the molten copolyetherester with the polymeric material. The intensive mixing can be accomplished as described hereinabove with respect to the addition of fillers.

The aromatic copolyetheresters are useful in making a wide variety of shaped articles. The shaped articles produced from the aromatic copolyetheresters containing hydroxyalkanoic acid components have greater thermal properties in comparison to shaped articles produced from some known copolyetheresters. Shaped articles include film, sheets, fiber, melt blown containers, molded parts, such as cutlery, foamed parts, coatings, polymeric melt extrusion coatings onto substrates, polymeric solution coatings onto substrates, and laminates. The aromatic copolyetheresters disclosed herein can be used in essentially any process known for making shaped articles.

In some embodiments, the present invention provides film comprising the aromatic copolyetheresters, process for producing the films, and articles derived therefrom. Polymeric films have a variety of uses, such as in packaging, especially of foodstuffs, adhesives tapes, insulators, capacitors, photographic development, x-ray development and as laminates, for example. For some uses, the heat resistance of the film is important. Therefore, a higher melting point, glass transition temperature, and crystallinity amount are desirable to provide better heat resistance and more stable electrical characteristics, along with a rapid biodegradation rate. Further, for some applications it is desirable that the films have good barrier properties, including, for example, providing a moisture barrier, oxygen barrier, and/or carbon dioxide barrier. It may also be desirable for some applications that the films provide grease resistance, tensile strength and/or a high elongation at break.

Examples of applications in which films comprising the aromatic copolyetheresters can be used include food packaging, labels, dielectric insulation, and water vapor barriers. For some applications, the monomer composition of the copolyetherester is preferably chosen to result in a partially crystalline polymer desirable for the formation of film, wherein the crystallinity provides strength and elasticity. As first produced, the copolyetherester is generally semi-crystalline in structure. The crystallinity increases on reheating and/or stretching of the polymer, as occurs in the production of film.

Films containing the copolyetheresters can be made from the polymer by any process known to those skilled in the art. For example, thin films can be formed by dipcoating as disclosed in U.S. Pat. No. 4,372,311; by compression molding as disclosed in U.S. Pat. No. 4,427,614; by melt extrusion as disclosed in U.S. Pat. No. 4,880,592; by melt blowing as disclosed in U.S. Pat. No. 5,525,281; or other known processes. The difference between a film and a sheet is the thickness, but there is no set industry standard as to when a film becomes a sheet. As used herein, a film is 0.25 mm (10 mils) thick or less, preferably between about 0.025 mm and 0.15 mm (1 mil and 6 mils). However, thicker films can be formed up to a thickness of about 0.50 mm (20 mils).

Films containing the copolyetheresters are preferably formed by either solution casting or extrusion. Extrusion is particularly preferred for formation of "endless" products, such as films and sheets, which emerge as a continuous length. In extrusion, the polymeric material, whether provided as a molten polymer or as plastic pellets or granules, is fluidized and homogenized. Additives, as described above, such as thermal or UV stabilizers, plasticizers, fillers and/or blendable polymeric materials, can be added, if desired. The polymeric material containing any additives is then forced through a suitably shaped die to produce the desired cross-sectional film shape. The extruding force can be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders can be used. Different kinds of die are used to produce different products, such as blown film (formed by a blow head for blown extrusions), sheets and strips (slot dies) and hollow and solid sections (circular dies). Films of a variety of widths and thickness can be produced. After extrusion, the polymeric film is taken up on rollers, cooled and taken off by means of suitable devices designed to prevent subsequent deformation of the film.

In known processes, film can be produced by extruding a thin layer of polymer over chilled rolls and then further drawing down the film to size by tension rolls. In the extrusion casting process, the polymer melt is conveyed from the extruder through a slot die, (T-shaped or "coat hanger" die). The die can be as wide as 10 feet and typically has thick wall sections on the lands to minimize deflection of the lips due to internal pressure. Die openings can be within a wide range, but 0.015 inch to 0.030 inch is typical. The nascent cast film can be drawn down, and thinned significantly, depending on the speed of the rolls taking up the film. The film is then solidified by cooling below the crystalline melting point or glass transition temperature, which can be accomplished by passing the film through a water bath or over two or more chrome-plated chill rolls that have been cored for water cooling. The cast film is then conveyed though nip rolls, through a slitter to trim the edges, and then wound up. In casting film, conditions can be tailored to allow a relatively high degree of orientation in the machine direction (which is the direction of travel of the film through an apparatus) especially at high draw down conditions and wind up speeds, and a lower amount of orientation in the transverse direction. Alternatively, the conditions can be tailored to minimize the orientation, thus providing films with substantially equivalent physical properties in the machine direction and the transverse direction. Preferably, the finished film is 0.25 mm thick or less.

Blown film, which is generally stronger, tougher, and can be made more rapidly than cast film, is made by extruding a tube. In producing blown film, the melt flow of molten polymer is typically turned upward from the extruder and fed through an annular die. The melt flows around a mandrel and emerges through the opening of the annular die in the form of a tube. As the tube leaves the die, internal pressure is introduced through the die mandrel with air, which expands the tube from about 1.5 to about 2.5 times the die diameter and simultaneously draws the film, causing a reduction in thickness. The air contained in the tube cannot escape because the bubble is sealed by the die on one end and by nip (or pinch) rolls on the other. Desirably, a uniform air pressure is maintained to ensure uniform thickness of the film bubble. The tubular film can be cooled internally and/or externally by directing air onto the film. Faster quenching in the blown film method can be accomplished by passing the expanded film about a cooled mandrel which is situated within the tube. For example, one such method using a cooled mandrel is disclosed by Bunga, et al., in Canadian Patent 893,216. If the polymer being used to prepare blown film is semicrystalline, the tube can become cloudy as it cools below the softening point of the polymer. Drawdown of the extrudate is not essential, but preferably the drawdown ratio is between 2 and 40. The drawdown ratio is the ratio of the die gap to the product of the thickness of the cooled film and the blow-up ratio. Draw down can be induced by tension from pinch rolls. Blow-up ratio is the ratio of the diameter of the cooled film bubble to the diameter of the circular die. The blow up ratio can be as great as 4 to 5, but 2.5 is more typical. The draw down induces molecular orientation within the film in the machine direction, (i.e.; direction of the extrudate flow), and the blow-up ratio induces molecular orientation in the film in the transverse or hoop direction. The quenched tube moves upward through guiding devices into a set of pinch rolls, which flatten it. The resulting sleeve can subsequently be slit along one side, making a larger film width than could be conveniently made via the cast film method. The slit film can be further gusseted and surface-treated in line. Alternatively, the blown film can be made using more elaborate processes, such as the double bubble, tape bubble, or trapped bubble processes. The double-bubble process is a technique in which the polymeric tube is first quenched and then reheated and oriented by inflating the polymeric tube above the glass transition temperature, (Tg), but below the crystalline melting temperature (Tm) of the polyester (if the polyester is crystalline). The double bubble process is disclosed, for example, by Pahkle in U.S. Pat. No. 3,456,044.

The preferred and optimal conditions for producing a blown film are determined by a number of factors, such as the chemical composition of the polymer, the amount and type of additives, such as plasticizers, used, and the thermal properties of the polymer. However, the blown film process offers certain advantages, such as the relative ease of changing the film width and caliber by changing the volume of air in the bubble and the speed of the screw, the elimination of end effects, and the capability of providing biaxial orientation in the as produced film. Typical film thicknesses obtained in a blown film process are frequently within the range of about 0.004 to 0.008 inch, and the flat film width can be up to 24 feet or larger after slitting.

For manufacturing large quantities of film, a sheeting calender, a machine comprising a number of heatable parallel cylindrical rollers that rotate in opposite directions and spread out the polymer and stretch it to the desired thickness, can be employed. A rough film is fed into the gap of the calender, and the last roller smoothes the film. If the film is required to have a textured surface, the last roller is provided with an appropriate embossing pattern. Alternatively, the film can be reheated and then passed through an embossing calender. The calender is followed by one or more cooling drums. The finished film is reeled up.

Extruded films can also be used as starting material for other products. For example, the film can be cut into small segments for use as feed material for other processing methods, such as injection molding. As a further example, the film can be laminated onto a substrate as described below. As yet a further example, the films can be metallized, using known methods. The film tubes made in blown film operations can be converted to bags through, for example, heat sealing processes.

The extrusion process can be combined with a variety of post-extruding operations for expanded versatility. Such post-forming operations include altering round to oval shapes, blowing the film to different dimensions, machining and punching, and biaxial stretching.

Films can also be made by solution casting, which produces more consistently uniform gauge film than that made by melt extrusion. Solution casting comprises dissolving polymeric granules, powder or the like in a suitable solvent with any desired formulant, such as a plasticizer or colorant. The solution is filtered to remove dirt or large particles and cast from a slot die onto a moving belt, preferably of stainless steel, dried, whereon the film cools. The extrudate thickness is typically five to ten times that of the finished film. The film cab then can be finished in a like manner to the extruded film. Appropriate parameters for processing can be determined by one skilled in the art, based on the polymer composition and the process used for film formation. Solution cast film can be using the same processes as described hereinabove for the extrusion cast film.

Multilayer films, such as bilayer, trilayer, and multilayer film structures, can be made from the copolyetheresters. One advantage to multilayer films is that specific properties can be tailored into the film to solve critical use needs, with the more costly ingredients being used in the outer layers to address such needs. Multilayer films can be formed by coextrusion, blown film, dipcoating, solution coating, blade, puddle, air-knife, printing, Dahlgren, gravure, powder coating, spraying, or other known processes. Generally, multilayer films are produced by extrusion casting processes. In an exemplary process, the resin materials are heated in a uniform manner to melt, and the molten materials are conveyed to a coextrusion adapter that combines the molten materials to form a multilayer coextruded structure. The multilayer structure is transferred through an extrusion die opened to a predetermined gap, commonly in the range of between about 0.05 inch (0.13 cm) and 0.012 inch (0.03 cm). The material is then drawn down to the intended gauge thickness by a primary chill or casting roll maintained at a temperature typically in the range of about 15 to 55° C., (60–130° F.). Typical draw down ratios range from about 5:1 to about 40:1. The layers can function as barrier layers, adhesive layers, antiblocking layers, or for other purposes. Further, in some exemplary embodiments, the inner layers can be filled and the outer layers unfilled, as disclosed in U.S. Pat. No. 4,842,741 and U.S. Pat. No. 6,309,736. Production processes are known and are disclosed, for example, in U.S. Pat. No. 3,748,962, U.S. Pat. No. 4,522, 203, U.S. Pat. No. 4,734,324, U.S. Pat. No. 5,261,899 and U.S. Pat. No. 6,309,736. El-Afandi, et al., in U.S. Pat. No. 5,849,374, U.S. Pat. No. 5,849,401, and U.S. Pat. No. 6,312,823, disclose compostable multilayer films with a core poly(lactide) layer with inner and outer layers of blocking reducing layers composed of, for example, aliphatic polyesters.

One or more layers in multilayer films can contain the aromatic copolyetheresters and/or of other polymeric materials that can be biodegradable or not biodegradable, naturally derived, modified naturally derived and/or synthetic.

Examples of biodegradable materials, nonbiodegradable materials, and natural polymeric materials suitable as additional layers include those such materials disclosed hereinabove for use in making blends with the aromatic copolyetheresters. Essentially any known polymeric material can be used in making multilayer films with the aromatic copolyetheresters.

Regardless of how the film is formed, biaxial orientation can be induced in the film by stretching in both the machine and transverse direction after formation. The machine direction stretch is initiated in forming the film by rolling out and taking up the film, which stretches the film in the direction of takeup, orienting some of the fibers. Although machine direction orientation strengthens the film in the machine direction, it is possible that the film can tear easily in a direction perpendicular to the machine direction, because all of the fibers are oriented in one direction. If desired, the biaxially oriented film can be subjected to additional drawing of the film in the machine direction, in a process known as tensilizing.

Biaxial stretching of the film provides superior tensile strength, flexibility, toughness and shrinkability, for example, in comparison to non-oriented films. It is desirable to stretch the film along two axes at right angles to each other. This increases tensile strength and elastic modulus in the directions of stretch. It is most desirable for the amount of stretch in each direction to be roughly equivalent, thereby providing similar properties or behavior within the film when tested from any direction. However, certain applications, such as those desiring a certain amount of shrinkage or greater strength in one direction over another, as in labels or adhesive and magnetic tapes, will require uneven, or uniaxial, orientation of the fibers of the film.

Although any known process for biaxial orientation can be used, tentering is preferred, wherein the material is stretched while heating in the transverse direction simultaneously with, or subsequent to, stretching in the machine direction. The orientation can be performed on available commercial equipment. For example, suitable equipment is available from Bruckner Maschenenbau of West Germany. One type of equipment operates by clamping on the edges of the sheet to be drawn and, at the appropriate temperature, separating the edges of the sheet at a controlled rate. In an exemplary process, a film is fed into a temperature-controlled box, heated above its glass transition temperature and grasped on either side by tenterhooks that simultaneously exert a drawing tension (longitudinal stretching) and a widening tension (lateral stretching). Typically, stretch ratios of 3:1 to 4:1 may be employed. Alternatively, and preferably for some commercial applications, the biaxial drawing process is conducted continuously at high production rates in multistage roll drawing equipment, as available from Bruckner, wherein the drawing of the extruded film stock is carried out in a series of steps between heated rolls rotating at different and increasing rates. When the appropriate combinations of draw temperatures and draw rates are employed, the monoaxial stretching is preferably from about 4 to about 20, more preferably from about 4 to about 10. Draw ratio is defined as the ratio of a dimension, e.g., length or width, of a stretched film to that of a non-stretched film.

Uniaxial orientation can be obtained by stretching the film in only one direction using processes as described hereinabove for biaxial orientation, or by directing the film through a machine direction orienter, ("MDO"), such as is commercially available from vendors such as the Marshall and Williams Company of Providence, R.I. The MDO apparatus has a plurality of stretching rollers, which progressively stretch and thin the film in the machine direction of the film.

Preferably, the stretching process takes place at a temperature at least 10° C. above the glass transition temperature of the polymer and preferably below the Vicat softening temperature of the polymeric film, more preferably at least 10° C. below the Vicat softening point, with the optimal temperature depending in part on the rate of stretching.

Orientation can be enhanced in blown film operations by adjusting the blow-up ratio, (BUR) which is the ratio of the diameter of the film tube to the die diameter. For example, it is generally preferred to have a BUR of 1 to 5 for the production of bags or wraps. However, the preferred BUR can vary, determined in part by the balance of properties desired in the machine direction and the transverse direction. For a balanced film, a BUR of about 3:1 is generally appropriate. If it is desired to have a "splitty" film, i.e. a film that easily tears in one direction, then a BUR of 1:1 to about 1.5:1 is generally preferred.

Shrinkage can be controlled by holding the film in a stretched position and heating for a few seconds before quenching. This is typically referred to as "heat setting". The heat stabilizes the oriented film, which then can be forced to shrink only at temperatures above the heat stabilization temperature. Further, the film can also be subjected to rolling, calendering, coating, embossing, printing, and/or any other finishing operations known to those skilled in the art.

Appropriate process conditions and parameters for film making by any method can be determined by a skilled artisan for any given polymeric composition and desired application.

The properties exhibited by a film depend on several factors, including the polymeric composition, the method of forming the polymer, the method of forming the film, and whether the film was treated for stretch or biaxially oriented. These factors affect many properties of the film, such as shrinkage, tensile strength, elongation at break, impact strength, dielectric strength and constant, tensile modulus, chemical resistance, melting point, and heat deflection temperature. The film properties can be further adjusted by adding certain additives and fillers to the copolyetherester, and/or by blending the copolyetherester with one or more other polymeric materials, as disclosed above.

As disclosed by Moss, in U.S. Pat. No. 4,698,372, Haffner, et al., in U.S. Pat. No. 6,045,900, and McCormack, in WO 95/16562, films, especially filled films, can be made to be microporous, if desired, as disclosed, for example, in U.S. Pat. No. 4,626,252, U.S. Pat. No. 5,073,316, and U.S. Pat. No. 6,359,050. As is known to those skilled in the art, the stretching of a filled film can create fine pores. Mircoporosity allows the film to serve as a barrier to liquids and particulate matter, yet allow air and water vapor to pass through.

To enhance the printability (ink receptivity), adhesion or other desirable surface characteristics, the films of the present invention can be treated by known, conventional post forming operations, such as corona discharge, chemical treatments, and flame treatment.

The films comprising the aromatic copolyetheresters are useful in a wide variety of applications. For example, the films can be used as a component of personal sanitary items, such as disposable diapers, incontinence briefs, feminine pads, sanitary napkins, tampons, tampon applicators, motion sickness bags, baby pants, and personal absorbent products. The films made of the aromatic copolyetheresters provide water barrier properties, to avoid leak through, with toughness, and are preferably able to conform to the body and stretch with the body movements during use. After their use, the soiled articles biocompost when discarded appropriately.

As further examples, the films can be used as protective films for agriculture, such as mulch films, seed coverings, agriculture mats containing seeds, ("seed tapes"), garbage and lawn waste bags. Further uses include softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, and wipes.

A preferred use of the films comprising the aromatic copolyetheresters is in food packaging, particularly fast food packaging. Specific examples of food packaging uses include fast food wrappers, stretch wrap films, hermetic seals, food bags, snack bags, grocery bags, cups, trays, cartons, boxes, bottles, crates, food packaging films, blister pack wrappers, and skin packaging of foods such as meats, as disclosed for example, in U.S. Pat. No. 3,835,618, U.S. Pat. No. 3,950,919, U.S. Re 30,009, and U.S. Pat. No. 5,011,735.

A particularly preferred packaging use for the films is in wraps. Wraps are used to enclose meats, other perishable items, and especially fast food items, such as sandwiches, burgers, and dessert items. Desirably, the films provide a balance of physical properties, including paper-like stiffness combined with sufficient toughness so as not to tear when used to wrap, for example, a sandwich, deadfold characteristics such that once folded, wrapped or otherwise manipulated into the desired shape, the wraps maintain their shape and not tend to spontaneously unfold or unwrap, grease resistance, where desired, and a balance of providing a moisture barrier while not allowing for moisture to condense onto items contained therein. The wraps can have a smooth surface or a textured surface as formed by embossing, crimping, or quilting. The wraps can contain fillers, such as inorganic particles, organic particles such as starch, and combinations of fillers.

The films can be further processed to produce additional desirable articles, such as containers. For example, the films can be thermoformed as disclosed, for example, in U.S. Pat. No. 3,303,628, U.S. Pat. No. 3,674,626, and U.S. Pat. No. 5,011,735. The films can be laminated onto substrates, as described below.

A further preferred aspect of the present invention relates to coatings of the aromatic copolyetheresters onto substrates and the production processes thereof and articles derived therefrom. Substrates can be coated with polymer solutions, dispersions, latexes, and emulsions of the aromatic copolyetheresters by rolling, spreading, spraying, brushing, or pouring processes, followed by drying; by coextruding the copolyetheresters with other materials, powder coating onto a preformed substrate, or by melt/extrusion coating a preformed substrate with the copolyetheresters. The substrate can be coated on one side or on both sides. The polymeric coated substrates have a variety of uses, such as in packaging, especially of foodstuffs, and as disposable cups, plates, bowls and cutlery. For some uses, the heat resistance of the coating is important and a higher melting point, glass transition temperature, and crystallinity amount are desirable to provide better heat resistance, along with a rapid biodegradation rate. Further, it is desired that the coatings provide good barrier properties for moisture, grease, oxygen, and/or carbon dioxide, and have good tensile strength and a high elongation at break.

Coatings can be made from the copolyetheresters by any process known in the art. For example, thin coatings can be formed by dipcoating as disclosed in U.S. Pat. No. 4,372,311 and U.S. Pat. No. 4,503,098, extrusion onto substrates, as disclosed, for example, in U.S. Pat. No. 5,294,483, U.S. Pat. No. 5,475,080, U.S. Pat. No. 5,611,859, U.S. Pat. No. 5,795,320, U.S. Pat. No. 6,183,814, and U.S. Pat. No. 6,197,380, blade, puddle, air-knife, printing, Dahlgren, gravure, powder coating, spraying, or other known processes. The coatings can be of any thickness. Preferably, the polymeric coating will be less than or equal to 0.25 mm (10 mils) thick, more preferably between about 0.025 mm and 0.15 mm (1 mil and 6 mils). However, thicker coatings can be formed up to a thickness of about 0.50 mm (20 mils) or greater.

A coating can be made by solution casting onto a substrate, which produces more consistently uniform gauge coating than melt extrusion. Solution casting comprises dissolving polymeric granules, powder or the like in a suitable solvent with any desired formulants, such as plasticizers, fillers, blendable polymeric materials, or colorants. The solution is filtered to remove dirt or large particles and cast from a slot die onto a moving preformed substrate, dried, whereon the coating cools. The extrudate thickness is five to ten times that of the finished coating. The coating can be finished using methods as described for extruded coatings. Polymeric dispersions and emulsions can be coated onto substrates using such processes. Coatings can be applied to textiles, nonwovens, foil, paper, paperboard, and other sheet materials by continuously operating spreadcoating machines. A coating knife, such as a "doctor knife", provides uniform spreading of the coating materials (in the form of solution, emulsions, or dispersions in water or an organic medium) on the supporting material, which is moved along by rollers. The coating is then dried. Alternatively, the polymeric solution, emulsion, or dispersion can be sprayed, brushed, rolled or poured onto the substrate. For example, Potts, in U.S. Pat. No. 4,372,311 and U.S. Pat. No. 4,503,098, discloses coating water-soluble substrates with solutions of water-insoluble materials. U.S. Pat. No. 3,378,424 discloses processes for coating a fibrous substrate with an aqueous polymeric emulsion.

In a powder coating process, the copolyetheresters are coated onto the substrates in the form of a powder with a fine particle size. The substrate to be coated is preferably heated to above the fusion temperature of the polymer, and the substrate is then dipped into a bed of the powdered polymer fluidized by the passage of air through a porous plate. The fluidized bed is typically not heated. A layer of the polymer adheres to the hot substrate surface and melts to provide the coating. Coating thicknesses may be in the range of about 0.005 inch to 0.080 inch, (0.13 to 2.00 mm). Other powder coating processes include spray coating, whereby the substrate is not heated until after it is coated, and electrostatic coating. For example, paperboard containers may be electrostatically spray-coated with a thermoplastic polymer powder, as disclosed in U.S. Pat. No. 4,117,971, U.S. Pat. No. 4,168,676, U.S. Pat. No. 4,180,844, U.S. Pat. No. 4,211,339, and U.S. Pat. No. 4,283,189. The containers are then heated, causing the polymeric powder to melt to form the laminated polymeric coating.

Metal articles of complex shapes can also be coated with the polymeric film by means of the whirl sintering process. The articles, heated to above the melting point of the polymer, are introduced into a fluidized bed of powdered polymer wherein the polymer particles are held in suspension by a rising stream of air, thus depositing a coating on the metal by sintering. Coatings of the copolyetheresters may also be applied by spraying the molten, atomized copolyetheresters onto substrates, such as paperboard. Such processes are disclosed for wax coatings in, for example, U.S. Pat. No. 5,078,313, U.S. Pat. No. 5,281,446, and U.S. Pat. No. 5,456,754.

The coatings of the copolyetheresters are preferably formed by melt or extrusion coating processes, as described hereinabove with regard to forming films. Extrusion coating of polyesters onto paperboard is disclosed, for example, in U.S. Pat. No. 3,924,013, U.S. Pat. No. 4,147,836, U.S. Pat. No. 4,391,833, U.S. Pat. No. 4,595,611, U.S. Pat. No. 4,957,578, and U.S. Pat. No. 5,942,295. Kane, in U.S. Pat. No. 3,924,013, discloses the formation of ovenable trays mechanically formed from paperboard previously laminated with polyester. Chaffey, et al., in U.S. Pat. No. 4,836,400, disclose the production of cups formed from paper stock which has been coated with a polymer on both sides. Beavers, et al., in U.S. Pat. No. 5,294,483, discloses the extrusion coating of certain polyesters onto paper substrates. As a further example of extrusion coating, wires and cable can be sheathed directly with polymeric films extruded from oblique heads.

Calendering processes can also be used to produce polymeric laminates onto substrates, using methods as described hereinabove with regard to forming films.

Multiple polymer layers coated onto a substrate may also be produced, such as bilayer, trilayer, and multilayer film structures, using processes as disclosed hereinabove for the formation of multilayer films. One or more layers in multilayer coatings can contain the aromatic copolyetheresters and/or of other polymeric materials that can be biodegradable or not biodegradable, naturally derived, modified naturally derived and/or synthetic.

Examples of biodegradable materials, nonbiodegradable materials, and natural polymeric materials suitable as additional layers include those such materials disclosed hereinabove for use in making blends with the aromatic copolyetheresters. Essentially any known polymeric material can be used in making multilayer coatings with the aromatic copolyetheresters.

Organic foams, such as derived from expanded starches and grains, can be used as substrates. Such materials are disclosed, for example, in U.S. Pat. No. 3,137,592, U.S. Pat. No. 4,673,438, U.S. Pat. No. 4,863,655, U.S. Pat. No. 5,035,930, U.S. Pat. No. 5,043,196, U.S. Pat. No. 5,095,054, U.S. Pat. No. 5,300,333, U.S. Pat. No. 5,413,855, U.S. Pat. No. 5,512,090, and U.S. Pat. No. 6,106,753. Specific examples of suitable foams materials include; EcoFoam®, a product of the National Starch Company of Bridgewater, N.J., which is a hydroxypropylated starch product, and EnviroFil® foam, a product of the EnPac Company, a DuPont-Con Agra Company.

Particularly preferred organic-inorganic foams are the cellular highly inorganically filled with, for example; calcium carbonate, clays, cement, or limestone, having a starch-based binder, for example, potato starch, cornstarch, waxy cornstarch, rice starch, wheat starch, or tapioca, and a small amount of fiber, as disclosed, for example, by Andersen, et. al, in U.S. Pat. No. 6,030,673. The foams can be produced by mixing the ingredients together, such as limestone, potato starch, fiber and water, to form a batter. The substrate is formed by pressing the batter between two heated molds. The water contained within the batter is turned to steam, raising the pressure within the mold, forming the foamed product. Products produced using such processes are commercially available by the EarthShell Packaging Company, including, for example 9-inch plates, 12-ounce bowls and hinged-lid sandwich and salad containers ("clam shells").

Further disclosures of organic, inorganic and organic-inorganic foam substrates include, for example; U.S. Pat. No. 5,095,054, U.S. Pat. No. 5,108,677, U.S. Pat. No. 5,234,977, U.S. Pat. No. 5,258,430, U.S. Pat. No. 5,262,458, U.S. Pat. No. 5,292,782, U.S. Pat. No. 5,376,320, U.S. Pat. No. 5,382,611, U.S. Pat. No. 5,405,564, U.S. Pat. No. 5,412,005, U.S. Pat. No. 5,462,980, U.S. Pat. No. 5,462,982, U.S. Pat. No. 5,512,378, U.S. Pat. No. 5,514,430, U.S. Pat. No. 5,549,859, U.S. Pat. No. 5,569,514, U.S. Pat. No. 5,569,692, U.S. Pat. No. 5,576,049, U.S. Pat. No. 5,580,409, U.S. Pat. No. 5,580,624, U.S. Pat. No. 5,582,670, U.S. Pat. No. 5,614,307, U.S. Pat. No. 5,618,341, U.S. Pat. No. 5,626,954, U.S. Pat. No. 5,631,053, U.S. Pat. No. 5,658,603, U.S. Pat. No. 5,658,624, U.S. Pat. No. 5,660,900, U.S. Pat. No. 5,660,903, U.S. Pat. No. 5,660,904, U.S. Pat. No. 5,665,442, U.S. Pat. No. 5,679,145, U.S. Pat. No. 5,683,772, U.S. Pat. No. 5,705,238, U.S. Pat. No. 5,705,239, U.S. Pat. No. 5,709,827, U.S. Pat. No. 5,709,913, U.S. Pat. No. 5,753,308, U.S. Pat. No. 5,766,525, U.S. Pat. No. 5,770,137, U.S. Pat. No. 5,776,388, U.S. Pat. No. 5,783,126, U.S. Pat. No. 5,800,647, U.S. Pat. No. 5,810,961, U.S. Pat. No. 5,830,305, U.S. Pat. No. 5,830,548, U.S. Pat. No. 5,843,544, U.S. Pat. No. 5,849,155, U.S. Pat. No. 5,868,824, U.S. Pat. No. 5,879,722, U.S. Pat. No. 5,897,944, U.S. Pat. No. 5,910,350, U.S. Pat. No. 5,928,741, U.S. Pat. No. 5,976,235, U.S. Pat. No. 6,083,586, U.S. Pat. No. 6,090,195, U.S. Pat. No. 6,146,573, U.S. Pat. No. 6,168,857, U.S. Pat. No. 6,180,037, U.S. Pat. No. 6,200,404, U.S. Pat. No. 6,214,907, U.S. Pat. No. 6,231,970, U.S. Pat. No. 6,242,102, U.S. Pat. No. 6,347,934, U.S. Pat. No. 6,348,524, and U.S. Pat. No. 6,379,446. Essentially any known foam substrate material can be used.

To enhance the coating process, the substrates can be treated by known, conventional post forming operations, such as corona discharge, chemical treatments, such as primers, flame treatments, adhesives, The substrate layer may be primed with, for example, an aqueous solution of polyethyleneimine, (Adcote® 313), or a styrene-acrylic latex, or may be flame treated, as disclosed in U.S. Pat. No. 4,957,578 and U.S. Pat. No. 5,868,309.

The substrate can be coated with an adhesive, using conventional coating methods or extrusion.

Specific examples of adhesives that can be used in coating substrates with the copolyetheresters include: glue, gelatine, caesin, starch, cellulose esters, aliphatic polyesters, poly (alkanoates), aliphatic-aromatic polyesters, sulfonated aliphatic-aromatic polyesters, polyamide esters, rosin/polycaprolactone triblock copolymers, rosin/poly(ethylene adipate) triblock copolymers, rosin/poly(ethylene succinate) triblock copolymers, poly(vinyl acetates), poly(ethylene-co-vinyl acetate), poly(ethylene-co-ethyl acrylate), poly(ethylene-co-methyl acrylate), poly(ethylene-co-propylene), poly (ethylene-co-1-butene), poly(ethylene-co-1-pentene), poly (styrene), acrylics, Rhoplex® N-1031, (an acrylic latex from the Rohm & Haas Company), polyurethanes, AS 390, (an aqueous polyurethane adhesive base for Adhesion Systems, Inc.) with AS 316, (an adhesion catalyst from Adhesion Systems, Inc.), Airflex® 421, (a water-based vinyl acetate adhesive formulated with a crosslinking agent), sulfonated polyester urethane dispersions, (such as sold as Dispercoll® U-54, Dispercoll® U-53, and Dispercoll® KA-8756 by the Bayer Corporation), nonsulfonated urethane dispersions, (such as Aquathane® 97949 and Aquathane® 97959 by the Reichold Company; Flexthane® 620 and Flexthane® 630 by the Air Products Company; Luphen® D DS 3418 and Luphen® D 200A by the BASF Corporation; Neorez® 9617 and Neorez® 9437 by the Zeneca Resins Company; Quilastic® DEP 170 and Quilastic® 172 by the Merquinsa Company; Sancure® 1601 and Sancure® 815 by the B.F. Goodrich Company), urethane-styrene polymer dispersions, (such as Flexthane® 790 and Flexthane® 791 of the Air Products & Chemicals Company), Non-ionic polyester urethane dispersions, (such as Neorez® 9249 of the Zeneca Resins Company), acrylic dispersions, (such as Jagotex® KEA-5050 and Jagotex® KEA 5040 by the Jager Company; Hycar® 26084, Hycar® 26091, Hycar® 26315, Hycar® 26447, Hycar® 26450, and Hycar® 26373 by the B.F. Goodrich Company; Rhoplex® AC-264, Rhoplex® HA-16, Rhoplex® B-60A, Rhoplex® AC-234, Rhoplex® E-358, and Rhoplex® N-619 by the Rohm & Haas Company), silanated anionic acrylate-styrene polymer dispersions, (such as Acronal® S-710 by the BASF Corporation and Texigel® 13-057 by Scott Bader Inc.), anionic acrylate-styrene dispersions, (such as Acronal®296D, Acronal® NX 4786, Acronal® S-305D, Acronal® S-400, Acronal® S-610, Acronal® S-702, Acronal® S-714, Acronal® S-728, and Acronal® S-760 by the BASF Corporation; Carboset®D CR-760 by the B.F. Goodrich Company; Rhoplex® P-376, Rhoplex® P-308, and Rhoplex® NW-1715K by the Rohm & Haas Company; Synthemul® 40402 and Synthemul® 40403 by the Reichold Chemicals Company; Texigel® 13-57 Texigel® 13-034, and Texigel® 13-031 by Scott Bader Inc.; and Vancryl® 954, Vancryl® 937 and Vancryl® 989 by the Air Products & Chemicals Company), anionic acrylate-styrene-acrylonitrile dispersions, (such as Acronal® S 886S, Acronal® S 504, and Acronal® DS 2285 X by the BASF Corporation), acrylate-acrylonitrile dispersions, (such as Acronal® 35D, Acronal® 81D, Acronal® B 37D, Acronal® DS 3390, and Acronal® V275 by the BASF Corporation), vinyl chloride-ethylene emulsions, (such as Vancryl® 600, Vancryl® 605, Vancryl® 610, and Vancryl® 635 by Air Products and Chemicals Inc.), vinylpyrolidone/styrene copolymer emulsions, (such as Polectron® 430 by ISP Chemicals), carboxylated and noncarboxylated vinyl acetate ethylene dispersions, (such as Airflex® 420, Airflex® 421, Airflex® 426, Airflex® 7200, and Airflex® A-7216 by Air Products and Chemicals Inc. and Dur-o-set® E150 and Dur-o-set® E-230 by ICI), vinyl acetate homopolymer dispersions, (such as Resyn® 68-5799 and Resyn® 25-2828 by ICI), polyvinyl chloride emulsions, (such as Vycar® 460×24, Vycar® 460×6 and Vycar® 460× 58 by the B.F. Goodrich Company), polyvinylidene fluoride dispersions, (such as Kynar® 32 by Elf Atochem), ethylene acrylic acid dispersions, (such as Adcote® 50T4990 and Adcote® 50T4983 by Morton International), polyamide dispersions, (such as Micromid® 121RC, Micromid® 141L, Micromid® 142LTL, Micromid® 143LTL, Micromid® 144LTL, Micromid® 321 RC, and Micromid® 632HPL by the Union Camp Corporation), anionic carboxylated or noncarboxylated acrylonitrile-butadiene-styrene emulsions and acrylonitrile emulsions, (such as Hycar® 1552, Hycar® 1562x107, Hycar® 1562x117 and Hycar® 1572x64 by B.F. Goodrich), resin dispersions derived from styrene, (such as Tacolyn® 5001 and Piccotex® LC-55WK by Hercules), resin dispersions derived from aliphatic and/or aromatic hydrocarbons, (such as Escorez® 9191, Escorez® 9241, and Escorez® 9271 by Exxon), styrene-maleic anhydrides, (such as SMA® 1440H and SMA® 1000 by AtoChem), and mixtures thereof. Essentially any adhesive known the art can be used.

In some preferred embodiments the substrate is coated with a biodegradable adhesive layer containing, for example, glue, gelatine, casein, or starch. The adhesive layer can be applied using melt processes, solution, emulsion, dispersion, or coating processes.

The use of adhesives in coating substrates is disclosed, for example, in U.S. Pat. No. 4,343,858, which discloses a coated paperboard formed by the coextrusion of a polyester top film and an intermediate layer of an ester of acrylic acid, methacrylic acid, or ethacrylic acid, on paperboard. U.S. Pat. No. 4,455,184, disclose a process to coextrude a polyester layer and a polymeric adhesive layer onto a paperboard substrate. Fujita, et al., in U.S. Pat. No. 4,543,280, disclose the use of adhesives in the extrusion coating of polyester onto ovenable paperboard. Huffman, et al., in U.S. Pat. No. 4,957,578, disclose the extrusion of a polyester layer on top of a polyethylene coated paperboard. The polyethylene layer may be corona discharge or flame treated to promote adhesion. They further disclose the direct formation of the structure through coextrusion of the polyethylene layer on top of the paperboard with the polyester on top of the polyethylene with a coextruded adhesive tie layer of Bynel® between the polyethylene layer and the polyester layer.

One of ordinary skill in the art will be able to identify appropriate process parameters based on the polymeric composition and process used for the coating formation, depending upon polymeric composition and desired application.

The properties exhibited by a coating are determined by a variety of factors, including the polymeric composition, the method of forming the polymer, the method of forming the coating, and whether the coating was oriented during manufacture. Properties so affected include shrinkage, tensile strength, elongation at break, impact strength, dielectric strength and constant, tensile modulus, chemical resistance, melting point, and heat deflection temperature. The coating properties can also be adjusted by adding certain additives and fillers to the copolyetheresters, such as colorants, dyes, UV and thermal stabilizers, antioxidants, plasticizers, lubricants antiblock agents, slip agents, as recited above. Alternatively, the aromatic copolyetheresters can be blended with one or more other polymeric materials to improve certain characteristics, as described above.

The substrates can be formed into certain articles prior to coating or may be formed into certain articles after they are coated. For example, containers may be produced from flat, coated paperboard by pressforming them, by vacuum forming, or by folding and adhering them into the desired shape. Coated, flat paperboard stock can be formed into trays by the application of heat and pressure, as disclosed in, for example, U.S. Pat. No. 4,900,594, or vacuum formed into containers for foods and beverages, as disclosed in U.S. Pat. No. 5,294,483. Articles suitable for coating include, for example, cutlery, flower pots, mailing tubes, light fixtures, ash trays, gameboards, food containers, fast food containers, cartons, boxes, milk cartons, fruit juice containers, carriers for beverage containers, ice cream cartons, cups, disposable drinking cups, two-piece cups, one-piece pleated cups, cone cups, coffee cups, lidding, lids, straws, cup tops, french fry containers, fast food carry out boxes, packaging, support boxes, confectionery boxes, boxes for cosmetics, plates, bowls, vending plates, pie plates, trays, baking trays, breakfast plates, microwavable dinner trays, "TV" dinner trays, egg cartons, meat packaging platters, disposable single use liners which can be utilized with containers such as cups or food containers, substantially spherical objects, bottles, jars, crates, dishes, medicine vials, interior packaging, such as partitions, liners, anchor pads, corner braces, corner protectors, clearance pads, hinged sheets, trays, funnels, cushioning materials, and other objects used in packaging, storing, shipping, portioning, serving, or dispensing an object within a container.

Water-resistant polymer coated paper and paperboard are commonly used in packaging material for foodstuffs and as disposable containers. Coating polymers and multilamellar coating structures including the same have been developed that provide oxygen, water vapor, and aroma tightness for preservation of products contained therein.

Coatings comprising the aromatic copolyetheresters can be used in a wide variety of areas. For example, the coatings can be used as a component of personal sanitary items, and for agricultural applications, as disclosed hereinabove in connection to uses for films.

A particularly preferred use of the coatings comprising the aromatic copolyetheresters is food packaging, especially for fast food packaging. Specific examples of food packaging uses include fast food wrappers, stretch wrap films, hermetic seals, food bags, snack bags, grocery bags, cups, trays, cartons, boxes, bottles, crates, food packaging films, blister pack wrappers, skin packaging, and hinged lid sandwich and salad containers ("clam shells").

A specifically preferred use for the coatings of the present invention includes wraps, for example, in the form of a polymeric coated paper. Wraps may be used to enclose meats, other perishable items, and especially fast food items, as disclosed hereinabove for the use of films containing the copolyetheresters. Desirably, the coatings provide a balance of physical properties, including paper-like stiffness, acceptable deadfold characteristics, good grease resistance, where desired, and moisture barriers as disclosed hereinabove, and can have a smooth surface or a textured surface, as disclosed hereinabove with regard to films.

In some preferred embodiments, laminates are made from the aromatic copolyetheresters containing hydroxyalkanoic acid residues onto substrates and the production processes thereof and articles derived therefrom. The films comprising the aromatic copolyetheresters containing hydroxyalkanoic acid residues, prepared as described above, can be laminated onto a wide variety of substrates using known processes such as, for example; thermoforming, vacuum thermoforming, vacuum lamination, pressure lamination, mechanical lamination, skin packaging, and adhesion lamination. A laminate is differentiated from a coating in that in lamination, a preformed film is attached to a substrate. The substrate can be formed into a desired shape, such as in the form of a plate, cup, bowl, tray, or may be in an intermediate shape still to be formed, such as a sheet or film, when the film is attached. The film can be attached to the substrate by the application of heat and/or pressure, as with, for example heated bonding rolls. Generally speaking, the laminate bond strength or peel strength can be enhanced by higher temperatures and/or pressures. Optionally, adhesives can be used, including hot melt adhesives and solvent based adhesives. To enhance lamination, the films and/or the substrates can be treated by known, conventional post forming operations, such as corona discharge, chemical treatments, such as primers, flame treatments, as previously described. For example, U.S. Pat. No. 4,147,836 discloses subjecting a paperboard to a corona discharge to enhance the lamination process with a poly(ethylene terephthalate) film, et al., in U.S. Pat. No. 4,900,594, disclose the corona treatment of a polyester film to aid in the lamination to paperstock with adhesives. Schirmer, in U.S. Pat. No. 5,011,735, discloses the use of corona treatments to aid the adhesion between various blown films. U.S. Pat. No. 5,679,201 and U.S. Pat. No. 6,071,577, disclose the use of flame treatments to aid in adhesion of polymeric laminates. Sandstrom, et al., in U.S. Pat. No. 5,868,309, disclose the use of paperboard substrate primer consisting of certain styrene-acrylic materials to improve the adhesion with polymeric laminates.

Processes for producing polymeric coated or laminated paper and paperboard substrates for use as containers and cartons are well known and are disclosed, for example, in U.S. Pat. No. 3,863,832, U.S. Pat. No. 3,866,816, U.S. Pat. No. 4,337,116, U.S. Pat. No. 4,456,164, U.S. Pat. No. 4,698,246, U.S. Pat. No. 4,701,360, U.S. Pat. No. 4,789,575, U.S. Pat. No. 4,806,399, U.S. Pat. No. 4,888,222, and U.S. Pat. No. 5,002,833. Kane, in U.S. Pat. No. 3,924,013, discloses the formation of ovenable trays mechanically formed from paperboard previously laminated with polyester. Schmidt, in U.S. Pat. No. 4,130,234, discloses the polymeric film lamination of paper cups. For example, the lamination of films onto nonwoven fabrics is disclosed in U.S. Pat. No. 6,045,900 and U.S. Pat. No. 6,309,736. Depending on the intended use of the polyester laminated substrate, the substrate can be laminated on one side or on both sides.

The films can be passed through heating and pressure/nip rolls to be laminated onto flat substrates. More commonly, the films are laminated onto substrates using processes derived from thermoforming. For example, the films can be laminated onto substrates using vacuum lamination, pressure lamination, blow lamination, or mechanical lamination. When the films are heated, they soften and can be stretched onto a substrate of any given shape. Processes for adhering a polymeric film to a preformed substrate are disclosed, for example, in U.S. Pat. No. 2,590,221.

In vacuum lamination, the film can be clamped or held against the substrate and then heated until it becomes soft. A vacuum is then applied, typically through porous substrates or designed-in holes, causing the softened film to mold into the contours of the substrate and laminate onto the substrates. The laminate is then cooled. The vacuum can be maintained or not during the cooling process.

For substrate shapes that require a deep draw, such as cups, deep bowls, boxes, and cartons, a plug assist may be utilized. In such substrate shapes, the softened film can thin out significantly before it reaches the base or bottom of the substrate shape, leaving only a thin and weak laminate on the bottom of the substrate shape. A plug assist is any type of mechanical helper that carries more film stock toward an area of the substrate shape where the lamination would otherwise be too thin. Plug assist techniques can be adapted to vacuum and pressure lamination processes.

Vacuum lamination processes for applying films to substrates are known, and are disclosed, for example, in U.S. Pat. No. 4,611,456 and U.S. Pat. No. 4,862,671. For example, Knoell, in U.S. Pat. No. 3,932,105, discloses processes for the vacuum lamination of a film onto a folded paperboard carton. Lee, et al., in U.S. Pat. No. 3,957,558, disclose the vacuum lamination of thermoplastic films onto a molded pulp product, such as a plate. Foster, et al., in U.S. Pat. No. 4,337,116, disclose the lamination of poly(ethylene terephthalate) films onto preformed molded pulp containers. Wommelsdorf, et al., in U.S. Pat. No. 4,124,434, disclose processes using plug assist techniques for deep drawn laminates, such as coated cups. Faller, in U.S. Pat. No. 4,200,481 and U.S. Pat. No. 4,257,530, discloses the production of lined trays by such processes.

Pressure lamination is an alternative process. The film of the present invention can be clamped, heated until it softens, and then forced into the contours of the substrate to be laminated by the application of air pressure to the side of the film opposite to the substrate. Exhaust holes can be provided to allow the trapped air to escape, but more commonly, the substrate is porous to air and the air escapes through the substrate. The air pressure can be released once the laminated substrate cools and the film solidifies. Pressure lamination may allow a faster production cycle, improved part definition and/or greater dimensional control as compared to vacuum lamination. Pressure lamination of films onto preformed substrates is known and is disclosed, for example, in U.S. Pat. No. 3,657,044 and U.S. Pat. No. 4,862,671. Wommelsdorf, in U.S. Pat. No. 4,092,201, discloses a process for lining an air-permeable container, such as a paper cup, with a thermoplastic foil through use of a warm pressurized stream of gas.

A further alternative process is mechanical lamination, which includes any lamination process that does not use vacuum or air pressure. The film is heated and then mechanically applied to the substrate, for example, using molds or pressure rolls.

Suitable substrates for laminating with the copolyetheresters include articles made of paper, paperboard, cardboard, fiberboard, cellulose, such as Cellophane® cellulose, starch, plastic, polystyrene foam, glass, metal, for example; aluminum or tin cans, metal foils, polymeric foams, organic foams, inorganic foams, organic-inorganic foams, and polymeric films. Preferred are biodegradable substrates, such as paper, paperboard, cardboard, cellulose, starch and biobenign substrates such as inorganic and inorganic-organic foams.

Polymeric films suitable as substrates can contain the copolyetheresters and/or other materials, which may be biodegradable or not biodegradable, naturally derived, modified naturally derived or synthetic.

Examples of biodegradable materials suitable as substrates include poly(hydroxy alkanoates), polycarbonates, poly(caprolactone), aliphatic polyesters, aliphatic-aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, and copolymers mixtures thereof.

Specific examples of the biodegradable, nonbiodegradable and natural materials suitable as substrates are disclosed hereinabove for use in making blends containing the copolyetheresters.

Organic foams, such as derived from expanded starches and grains, can be used as substrates. Specific examples of suitable foams are disclosed hereinabove. Preferred organic-inorganic foam are the cellular highly inorganically filled foams, as disclosed hereinabove and can be preformed into substrates prior to lamination as disclosed herein. Any conventional process to form the substrates may be used. For example, for molded pulp substrates, a "precision molding", "die-drying", and "close-drying" process may be used. The processes include molding fibrous pulp from an aqueous slurry against a screen-covered open-face suction mold to the substantially finished contoured shape, followed by drying the damp pre-form under a strong pressure applied by a mated pair of heated dies. Such processes are disclosed, for example, in U.S. Pat. No. 2,183,869, U.S. Pat. No. 4,337,116, and U.S. Pat. No. 4,456,164. Precision molded pulp articles tend to be dense, hard and boardy, with an extremely smooth, hot-ironed surface finish. Disposable paper plates produced by such processes have been sold under the "Chinet" tradename by the Huhtamaki Company.

Molded pulp substrates can also be produced through the commonly known "free-dried" or "open-dried" processes, as disclosed hereinabove. The laminated substrates may be shaped using known processes, such a press forming or folding up. Such processes are disclosed, for example in U.S. Pat. No. 3,924,013, U.S. Pat. No. 4,026,458, and U.S. Pat. No. 4,456,164. For example, Quick, et al., in U.S. Pat. No. 4,900,594, disclose the production of trays from flat, polyester laminated paperstock through the use of pressure and heat.

As disclosed above, adhesives can be applied to the substrate and/or to the film and the substrate to enhance the bond strength of the laminate. Adhesive lamination of films onto preformed substrates is known and is disclosed, for example in U.S. Pat. No. 2,434,106, U.S. Pat. No. 2,510,908, U.S. Pat. No. 2,628,180, U.S. Pat. No. 2,917,217, U.S. Pat. No. 2,975,093, U.S. Pat. No. 3,112,235, U.S. Pat. No. 3,135,648, U.S. Pat. No. 3,616,197, U.S. Pat. No. 3,697,369, U.S. Pat. No. 4,257,530, U.S. Pat. No. 4,016,327, U.S. Pat. No. 4,352,925, U.S. Pat. No. 5,037,700, U.S. Pat. No. 5,132,391, and U.S. Pat. No. 5,942,295. For example, Schmidt, in U.S. Pat. No. 4,130,234, discloses the use of hot melt adhesives in the lamination of polymeric films to paper cups. Dropsy, in U.S. Pat. No. 4,722,474, discloses the use of adhesives for plastic laminated cardboard packaging articles. Quick, et al., in U.S. Pat. No. 4,900,594, disclose the formation of paperboard trays through pressure and heat forming of a flat polyester laminated paperboard stock adhered with a crosslinkable adhesives system. Martini, et al., in U.S. Pat. No. 5,110,390, disclose the lamination of coextruded bilayer films onto water soluble substrates through the use of adhesives. Gardiner, in U.S. Pat. No. 5,679,201 and U.S. Pat. No. 6,071,577, discloses the use of adhesives to provide improved bond strengths between polyester coated paperboard onto polyethylene coated paperboard to produce, for example, juice containers. The film and/or substrate can be coated with an adhesive using conventional coating technologies or coextrusion. Specific examples of suitable adhesives are disclosed hereinabove.

The laminates which comprise the aromatic copolyetheresters containing hydroxyalkanoic acid residues can be used in a wide variety of areas, including sanitary applications and agricultural uses, and consumer items, as disclosed hereinabove.

A particularly preferred use of the laminates comprising the aromatic copolyetheresters is in food packaging, especially for fast food packaging, examples of which are disclosed hereinabove.

The aromatic copolyetheresters can be formed into sheets. Polymeric sheets have a variety of uses, such as in signage, glazings, thermoforming articles, displays and display substrates, for example. For many of these uses, the heat resistance of the sheet is an important factor. Therefore, a higher melting point, glass transition temperature, and crystallinity are desirable to provide heat resistance and stability. Further, it is desired that the sheets have ultraviolet (UV) and scratch resistance, good tensile strength, high optical clarity, and impact strength, particularly at low temperatures.

The aromatic copolyetheresters can be formed using methods know for use with, for example, polycarbonate or PET, or by any other method known for making sheets. The copolyetheresters can be formed into sheets directly from the polymerization melt. In the alternative, the copolyester can be formed into an easily handled shape (such as pellets) from the melt, which may then be used to form a sheet. The sheets can be used for forming signs, glazings (such as in bus stop shelters, sky lights or recreational vehicles), displays, automobile lights and in thermoforming articles, for example.

In preferred embodiments, the sheets are sufficiently thick to be rigid, e.g., about 0.50 mm thick or greater. However, sheets greater than 25 mm, and thinner than 0.25 mm can be formed.

Exemplary processes for making sheets include extrusion, solution casting and injection molding. Appropriate parameters for use in the processes can be determined by one of ordinary skill in the art depending upon viscosity characteristics of the copolyester and the desired thickness of the sheet. In some preferred embodiments the sheets are formed by solution casting or extrusion. Extrusion is particularly preferred for formation of "endless" products, such as films and sheets, which emerge as a continuous length. For example, see PCT applications WO 96/38282 and WO 97/00284, which describe the formation of crystallizable sheets by melt extrusion.

In extrusion, the polymeric material, whether provided as a molten polymer or as plastic pellets or granules, is fluidized and homogenized. This mixture is then forced through a suitably shaped die to produce the desired cross-sectional sheet shape. The extruding force may be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders may be used as known in the art. Different kinds of die are used to produce different products, such as sheets and strips (slot dies) and hollow and solid sections (circular dies); thus, sheets of different widths and thickness may be produced. After extrusion, the polymeric sheet can be taken up on rollers, cooled and taken off by means of suitable devices which are designed to prevent any subsequent deformation of the sheet. Using extruders as known in the art, a sheet can be produced by extruding a thin layer of polymer over chilled rolls and then further drawing down the sheet to size (>0.25 mm) by tension rolls. Preferably, the finished sheet is greater than 0.25 mm thick.

For manufacturing large quantities of sheets, a sheeting calender is employed, as described hereinabove for making films.

Extrusion can be combined with a variety of post-extruding operations for expanded versatility. Such post-forming operations include altering round to oval shapes, stretching the sheet to different dimensions, machining and punching, and biaxial stretching, as known to those skilled in the art. Sheets can be made by solution casting, as described hereinabove, which produces more consistently uniform gauge sheet than melt extrusion. The sheets can then be finished in a like manner to extruded sheets. Further, sheets and sheet-like articles, such as discs, can be formed by injection molding by any method known in the art.

The copolyetheresters can be combined with other polymeric materials during extrusion and/or finishing to form laminates or multilayer sheets with improved characteristics, such as water vapor resistance. A multilayer or laminate sheet can be made by any method known in the art, and can have as many as five or more separate layers joined together by heat, adhesive and/or tie layer. One of ordinary skill in the art can determine appropriate process parameters based on the polymeric composition and process used for sheet formation.

Regardless of how the sheet is formed, it can be subjected to orientation, including biaxial orientation, as disclosed hereinabove in connection with films. Biaxially stretched sheets are preferred for certain uses where uniform sheeting is desired. This provides superior tensile strength, flexibility, toughness and shrinkability, for example, in comparison to non-oriented sheets. Biaxial orientation can be obtained by any process known in the art. However, tentering is preferred.

Shrinkage can be controlled by holding the sheet in a stretched position and heating for a few seconds before quenching. The heat stabilizes the oriented sheet, which then may be forced to shrink only at temperatures above the heat stabilization temperature. Parameters and conditions for making sheets can be determined by a skilled artisan for any given polymeric composition and desired application.

The properties exhibited by a sheet are determined by a variety of factors, including the polymeric composition, the method of forming the polymer, the method of forming the sheet, and whether the sheet was treated for stretch or biaxially oriented. Such factors affect many properties of the sheet, such as shrinkage, tensile strength, elongation at break, impact strength, dielectric strength and constant, tensile modulus, chemical resistance, melting point, and heat deflection temperature. The sheet properties may be further adjusted by adding certain additives and fillers to the copolyetheresters, as disclosed above.

The sheets can be thermoformed by any known method into any desirable shape, such as covers, skylights, shaped greenhouse glazings, displays, food trays. Thermoforming can be accomplished by heating the sheet to a sufficient temperature and for sufficient time to soften the copolyetherester so that the sheet can be molded into the desired shape. One skilled in the art can determine appropriate thermoforming parameters depending upon the viscosity and crystallization characteristics of the sheet.

The aromatic copolyetheresters containing hydroxyalkanoic acid residues can be used in making plastic containers, e.g., for uses in which plastic containers made of poly(ethylene terephthalate) (PET) are frequently used.

Plastic containers are widely used for foods and beverages, and also for non-food materials. The use of the present copolyetheresters can add biodegradability to such plastic containers.

The containers can be made by any method known in the art, such as extrusion, injection molding, injection blow molding, rotational molding, thermoforming of a sheet, and stretch-blow molding. A preferred method for molding a container is stretch-blow molding, which is generally used in the production of poly(ethylene terephthalate) (PET) containers, such as bottles. Also useful are cold parison methods, in which a preformed parison (generally made by injection molding) is taken out of the mold and then subjected to stretch blow molding in a separate step. A hot parison method can also be used, wherein a hot parison is immediately subjected to stretch blow molding in the same equipment without complete cooling after injection molding to make the parison. The parison temperature varies, depending upon the composition of the polymer. Generally, parison temperatures in the range from about 90° C. to about 160° C. are desirable. The preferred stretch blow molding temperature also depends upon the composition used, but a mold temperature of about 80° C. to about 150° C. is generally useful.

Containers made from the copolyetheresters can have any shape desirable, including, for example, narrow-mouth bottles and wide-mouth bottles having threaded tops and a volume of about 400 mL to about 3 liters, although smaller and larger containers may be formed. The containers can be used in standard cold fill applications. For some compositions, hot fill applications may also be used. The containers are suitable for foods and beverages, and other solids and liquids. For some uses, the containers are clear and transparent, but can be modified to have color or to be opaque, rather than transparent, if desired, by adding colorants or dyes, or by causing crystallization of the polymer, which results in opaqueness.

The aromatic copolyetheresters can be used to make fibers, particularly for applications for which polyester fibers are used. The term "fibers" as used herein includes continuous monofilaments, non-twisted or entangled multifilament yarns, staple yarns, spun yarns, and non-woven materials. Such fibers may be used to form uneven fabrics, knitted fabrics, fabric webs, or any other fiber-containing structures, such as tire cords. Polyester fibers are produced in large quantities for use in a variety of applications. In particular, such fibers are desirable for use in textiles, particularly in combination with natural fibers such as cotton and wool. Clothing, rugs, and other items can be made from the fibers. The fibers are also useful in industrial applications wherein polyester fibers are desirable due to their elasticity and strength, such as tire cords and ropes. Synthetic fibers, such as nylon, acrylic, polyesters, and others, are made by spinning and drawing the polymer into a filament, which is then formed into a yarn by winding many filaments together. The fibers can be treated mechanically and/or chemically to impart desirable characteristics such as strength, elasticity, heat resistance, hand (feel of fabric), as known in the art based on the desired end product to be fashioned from the fibers.

For providing enhanced strength and elasticity to fibers, the monomer composition of the aromatic copolyetheresters is desirably chosen to result in a partially crystalline polymer. As first produced, the copolyetherester is mostly amorphous in structure. In preferred embodiments, the copolyetherester readily crystallizes on reheating and/or extension of the polymer.

Fibers can be made from the copolyetheresters by any process known in the art. Generally, however, melt spinning is preferred. Melt spinning, which is commonly used for polyesters such as poly(ethylene terephthalate), comprises heating the polymer to form a molten liquid, or melting the polymer against a heated surface. The molten polymer is forced through a spinneret with a plurality of fine holes. Upon contact with air or a non-reactive gas stream after passing through the spinneret, the polymer solution from each spinneret solidifies into filaments. The filaments are gathered together downstream from the spinneret by a convergence guide, and can be taken up by a roller or a plurality of rollers. This process allows filaments of various sizes and cross sections to be formed, including filaments having a round, elliptical, square, rectangular, lobed or dog-boned cross section, for example. Following the extrusion and uptake of the fiber, the fiber is usually drawn, thereby increasing the crystallization and maximizing desirable properties such as orientation along the longitudinal axis, which increases elasticity and strength. The drawing may be done in combination with takeup by using a series of rollers, some of which are generally heated, or drawing can be done as a separate stage in the process of fiber formation.

The copolyetherester can be spun at speeds of from about 600 to 6000 meters per minute or higher, depending on the desired fiber size. For textile applications, a fiber with a denier per filament of from about 0.1 to about 100 is desired. Preferably, the denier is about 0.5 to 20, more preferably 0.7 to 10. However, for industrial applications the fiber can be from about 0.5 to 100 denier per filament, preferably about 1.0 to 10.0, most preferably 3.0 to 5.0 denier per filament. The required size and strength of a fiber can be determined by one of ordinary skill in the art for any given application.

The resulting filamentary material is amenable to further processing by additional processing equipment, or it may be used directly in applications requiring a continuous filament textile yarn. If desired, the filamentary material subsequently can be converted from a flat yarn to a textured yarn using false twist texturing methods or other processes known in the art. For some uses, it is desirable to increase the surface area of the fiber to provide a softer feel and to enhance the ability of the fibers to breathe, thereby providing better insulation and water retention in the case of textiles, for example. The fibers can be crimped or twisted by the false twist method, air jet, edge crimp, gear crimp, or stuffer box, for example. Alternatively, the fibers may be cut into shorter lengths, called staple, which may be processed into yarn. A skilled artisan can determine the best method of crimping or twisting based on the desired application and the composition of the fiber.

After formation, the fibers are finished by any method appropriate to the desired use. In the case of textiles, this finishing can dyeing, sizing, or addition of chemical agents such as antistatic agents, flame retardants, UV light stabilizers, antioxidants, pigments, dyes, stain resistants, and antimicrobial agents, to adjust the look and hand of the fibers. For industrial applications, the fibers can be treated to impart additional desired characteristics such as strength, elasticity or shrinkage, for example.

The fiber can be used as produced, or texturized for use in a variety of applications such as textile fabrics for apparel and home furnishings, for example. High tenacity fiber can be used in industrial applications such as high strength fabrics, tarpaulins, sailcloth, sewing threads and rubber reinforcement for tires and V-belts, for example.

Staple fibers made from the copolyetheresters can be used to form a blend with natural fibers, especially cotton and wool. The copolyetherester fibers are chemically resistant and generally resistant to mold, mildew, and other problems inherent to natural fibers. The fibers further provide strength and abrasion resistance and lower the cost of material.

The aromatic copolyetheresters can be combined with other synthetic or natural polymers to form heterogeneous fiber or bicomponent fiber, thereby providing a fiber with improved properties. Heterogeneous fibers can be formed in any suitable manner, such as side-by-side, sheath-core, and matrix designs, as is known to those skilled in the art.

The aromatic copolyetheresters can be formed into shaped foamed articles, such as films, cups, food trays, decorative ribbons, and furniture parts. As is known to those skilled in the art, foaming of polyester materials decreases the weight of molded parts, films, sheets, food trays, and thermoformed parts. Foamed articles also provide improved insulating properties than unfoamed articles.

For foaming, it is desired that the copolyetherester has a relatively high melt viscosity; often an inherent viscosity of 0.70 dL/or higher is desirable. Generally it is desired that the copolyetherester has sufficient melt viscosity to hold a foamed shape sufficiently long for the copolyetherester to solidify into a desired foamed article. This can be achieved, for example by raising the inherent viscosity of the copolyetherester in post-polymerization processes, such as the solid state polymerization method, as described above. Alternatively, a branching agent can be used, as disclosed in U.S. Pat. No. 4,132,707, U.S. Pat. No. 4,145,466, U.S. Pat. No. 4,999,388, U.S. Pat. No. 5,000,991, U.S. Pat. No. 5,110,844, U.S. Pat. No. 5,128,383, and U.S. Pat. No. 5,134,028. Such branched polyesters can also be subjected to the solid state polymerization, as described above, to further enhance the melt viscosity. The copolyetherester can optionally include a chain extension agent, such as a dianhydride or a polyepoxide, which is typically added during the foaming process.

The copolyetheresters can be foamed by a wide variety of methods. These include the injection of an inert gas such as nitrogen or carbon dioxide into the melt during extrusion or molding operations. Alternatively, inert hydrocarbon gases such as methane, ethane, propane, butane, and pentane, or chlorofluorocarbons, hydrochlorofluorocarbons, hydrofluorocarbons, can be used. Another method involves the dry blending of chemical blowing agents with the polyester and then extruding or molding the compositions to provide foamed articles. During the extrusion or molding operation, an inert gas such as nitrogen is released from the blowing agents and provides foaming action. Typical blowing agents include azodicaronamide, hydrazocarbonamide, dinitrosopentamethylenetetramine, p-toluenesulfonyl hydrazodicarboxylate, 5-phenyl-3,6-dihydro-1,3,4-oxa-diazin-2-one, sodium borohydride, sodium bicarbonate, 5-phenyltetrazole, p,p'-oxybis(benzenesulfonylhydrazide). Still another method includes the blending of sodium carbonate or sodium bicarbonate with a portion of pellets of the copolyetherester, blending of an organic acid, such as citric acid, with another portion of the copolyetherester, pellets and then blending of the two portions of pellets by extrusion or molding at elevated temperatures. Carbon dioxide gas is released by the interaction of the sodium carbonate and citric acid to provide the desired foaming action in the polymeric melt.

It is desirable that the foamable copolyetheresters contain nucleation agents to create sites for bubble initiation, influence the cell size of the foamed sheet or object and to hasten the solidification of the as foamed article. Examples of nucleation agents include sodium acetate, talc, titanium dioxide, and polyolefin materials such as polyethylene and polypropylene.

Polymeric foaming equipment and processes are known, and are disclosed, for example, in U.S. Pat. No. 5,116,881, U.S. Pat. No. 5,134,028, U.S. Pat. No. 4,626,183, U.S. Pat. No. 5,128,383, U.S. Pat. No. 4,746,478, U.S. Pat. No. 5,110,844, U.S. Pat. No. 5,000,844, and U.S. Pat. No. 4,761,256. Reviews of foaming technology are in *Kirk-Othmer Encyclopedia of Chemical Technology*, Third Edition, Volume 11, pp. 82–145 (1980), John Wiley and Sons, Inc., New York, N.Y. and the *Encyclopedia of Polymer Science and Engineering*, Second Edition, Volume 2, pp. 434–446 (1985), John Wiley and Sons, Inc., New York, N.Y.

As described above, the foamable copolyetheresters can include a wide variety of additives, fillers, or be blended with other materials. For biodegradable foams, the addition of cellulose, cellulose derivatives, such as chemically modified cellulose, starch, and starch derivatives, such as chemically modified starch and thermoplastic starch, is especially preferred.

EXAMPLES

Test Methods

Differential Scanning Calorimetry, (DSC), is performed on a TA Instruments Model Number 2920 machine. Samples are heated under a nitrogen atmosphere at a rate of 20 degrees C./minute to 300 degrees C., programmed cooled back to room temperature at a rate of 20 degrees C./minute and then reheated to 300 degrees C. at a rate of 20 degrees C./minute. The observed sample glass transition temperature ($T_g$) and crystalline melting temperature ($T_m$) reported hereinbelow were from the second heat.

Inherent Viscosity (IV) is defined in "Preparative Methods of Polymer Chemistry", W. R. Sorenson and T. W. Campbell, 1961, p. 35. It is determined at a concentration of 0.5 g./100 mL of a 50:50 weight percent trifluoroacetic acid:dichloromethane acid solvent system at room temperature by a Goodyear R-103B method.

Laboratory Relative Viscosity (LRV) is the ratio of the viscosity of a solution of 0.6 gram of the polyester sample dissolved in 10 mL of hexafluoroisopropanol (HFIP) containing 80 ppm sulfuric acid to the viscosity of the sulfuric acid-containing hexafluoroisopropanol itself, both measured at 25 degrees C. in a capillary viscometer. The LRV can be numerically related to IV. Where this relationship is utilized, the term "calculated IV" is noted.

Biodegradation was determined according to the ISO 14855 method: "Determination of the ultimate aerobic biodegradability and disintegration of plastic materials under controlled composting conditions—Method by analysis of evolved carbon". This test involved injecting an inoculum consisting of a stabilized and mature compost derived from the organic fraction of municipal solid waste with ground powder of the polymer to be tested on a vermiculite matrix, composting under standard conditions at an incubation temperature controlled at 58 C+/−2 C. The test was conducted with one polymer sample. The carbon dioxide evolved is used to determine the extent of biodegradation.

Prior to testing film properties, the film samples were conditioned for 40 hours at 72 F and 50 percent humidity. Elmendorf Tear is determined as per ASTM 1922. Graves Tear is determined as per ASTM D1004. Tensile Strength at break, tensile modulus and percent elongation at break is determined as per ASTM D882.

Comparative Example CE 1

To a 1.0 liter glass flask was added bis(2-hydroxyethyl) terephthalate, (443.27 grams), DBE dibasic ester, (20:60:20 mole percent dimethyl succinate:dimethyl glutarate:dimethyl adipate), (123.20 grams), tris(2-hydroxyethyl)trimellitate, (0.20 grams), poly(ethylene glycol), (average molecular weight of 1450), (41.94 grams), sodium acetate, (0.75 grams), manganese(II) acetate tetrahydrate, (0.2339 grams), and TYZOR® PC42 organic titanate, (6.3 weight percent titanium), (0.1248 grams). The reaction mixture was stirred and heated to 180 C under a slow nitrogen purge. After achieving 180 C, the reaction mixture was heated to 200 C over 0.3 hours with stirring under a slow nitrogen purge. The resulting reaction mixture was stirred at 200 C under a slight nitrogen purge for 1.1 hours. The reaction mixture was then heated to 275 C over 0.7 hours with stirring under a slight nitrogen purge. The resulting reaction mixture was stirred at 275 C for 1.0 hour while under a slight nitrogen purge. 78.0 grams of a colorless distillate was collected over this heating cycle. The reaction mixture was then staged to full vacuum with stirring at 275 C. The resulting reaction mixture was stirred for 2.8 hours under full vacuum, (pressure less than 100 mtorr). The vacuum was then released with nitrogen and the reaction mass allowed to cool to room temperature. An additional 45.5 grams of distillate was recovered and 436.7 grams of a solid product was recovered. The sample was measured for laboratory relative viscosity, (LRV), as described above, and was found to have a LRV of 25.66. This sample was calculated to have an inherent viscosity, (IV), of 0.71 dL/g. The sample underwent differential scanning calorimetry, (DSC), analysis. A broad crystalline melting temperature, (Tm), was observed at 184.7 C, (16.9 J/g).

Comparative Example CE 2

To a 250 milliliter glass flask was added bis(2-hydroxyethyl)terephthalate, (152.54 grams), lactic acid, (85 weight percent aqueous solution, 34.34 grams), ethylene glycol, (24.83 grams), tris(2-hydroxyethyl)trimellitate, (0.21 grams), manganese(II) acetate tetrahydrate, (0.0701 grams), and antimony(III) trioxide, (0.0534 grams). The reaction mixture was stirred and heated to 180 C under a slow nitrogen purge. After achieving 180 C, the reaction mixture was stirred at 180 C for 1.0 hour under a slow nitrogen purge. The reaction mixture was then heated to 240 C over 0.4 hours with stirring. After achieving 240 C, the reaction mixture was stirred at 240 C for 0.8 hours under a slow nitrogen purge. The reaction mixture was then heated to 255 C over 0.3 hours with stirring under a slight nitrogen purge. The reaction mixture was stirred at 255 C for 0.7 hours under a slight nitrogen purge. 36.3 grams of a colorless distillate was collected over this heating cycle. The reaction mixture was then staged to full vacuum with stirring at 255 C. The resulting reaction mixture was stirred for 2.8 hours under full vacuum, (pressure less than 100 mtorr). The vacuum was then released with nitrogen and the reaction mass allowed to cool to room temperature. An additional 50.1 grams of distillate was recovered and 95.9 grams of a solid product was recovered. The sample was measured for laboratory relative viscosity, (LRV), as described above and was found to have an LRV of 21.30. This sample was calculated to have an inherent viscosity of 0.63 dL/g. The sample underwent differential scanning calorimetry, (DSC), analysis. A glass transition temperature, (Tg), was observed with an onset of 72.1 C, a midpoint of 75.5 C, and an endpoint of 78.8 C. A crystalline melting temperature, (Tm), was observed at 228.6 C, (28.9 J/g).

The sample was ground into powder and tested for biodegradation, as described above. This sample was found to biodegrade 0.2 percent within 13.6 days under these test conditions.

Example 1

To a 250 milliliter glass flask was added bis(2-hydroxyethyl)terephthalate, (152.54 grams), lactic acid, (85 weight percent aqueous solution, 34.34 grams), tris(2-hydroxyethyl)trimellitate, (0.21 grams), ethylene glycol, (24.83 grams), poly(ethylene glycol), average molecular weight of 1000, (9.00 grams), manganese(II) acetate tetrahydrate, (0.0664 grams), and antimony(III) oxide, (0.0534 grams). The reaction mixture was stirred and heated to 180 C under a slow nitrogen purge. After achieving 180 C, the reaction mixture was stirred at 180 C for 1.1 hours under a slow nitrogen purge. The reaction mixture was then heated to 240 C over 0.7 hours with stirring. After achieving 240 C, the reaction mixture was stirred at 240 C for 0.5 hours under a slow nitrogen purge. The reaction mixture was then heated to 255 C over 0.3 hours with stirring under a slight nitrogen purge. The reaction mixture was stirred at 255 C for 0.7 hours under a slight nitrogen purge. 40.1 grams of a colorless distillate was collected over this heating cycle. The reaction mixture was then staged to full vacuum with stirring at 255 C. The resulting reaction mixture was stirred for 3.9 hours under full vacuum, (pressure less than 100 mtorr). The vacuum was then released with nitrogen and the reaction mass allowed to cool to room temperature. An additional 47.9 grams of distillate was recovered and 116.5 grams of a solid product was recovered. The sample was measured for laboratory relative viscosity, (LRV), as described above and was found to have an LRV of 18.57. This sample was calculated to have an inherent viscosity of 0.58 dL/g. The sample underwent differential scanning calorimetry, (DSC), analysis. A crystalline melting temperature, (Tm), was observed at 225.3 C, (29.5 J/g).

The sample was ground into powder and tested for biodegradation, as described above. This sample was found to biodegrade 0.8 percent within 13.6 days under these test conditions.

Example 2

To a 250 milliliter glass flask was added bis(2-hydroxyethyl)terephthalate, (152.54 grams), lactic acid, (85 weight percent aqueous solution, 34.34 grams), tris(2-hydroxyethyl)trimellitate, (0.20 grams), ethylene glycol, (20.11 grams), poly(ethylene glycol), average molecular weight of 1000, (8.84 grams), manganese(II) acetate tetrahydrate, (0.0658 grams), antimony(III) oxide, (0.0529 grams), tin(II) 2-ethylhexanoate, (0.1006 grams). and sodium hypophosphite hydrate, (0.0236 grams). The reaction mixture was stirred and heated to 180 C under a slow nitrogen purge. After achieving 180 C, the reaction mixture was stirred at 180 C for 1.0 hour under a slow nitrogen purge. The reaction mixture was then heated to 240 C over 0.7 hours with stirring. After achieving 240 C, the reaction mixture was stirred at 240 C for 0.5 hours under a slow nitrogen purge. The reaction mixture was then heated to 255 C over 0.2 hours with stirring under a slight nitrogen purge. The reaction mixture was stirred at 255 C for 0.6 hours under a slight nitrogen purge. 36.4 grams of a colorless distillate was collected over this heating cycle. The reaction mixture was then staged to full vacuum with stirring at 255 C. The resulting reaction mixture was stirred for 1.2 hours under full vacuum, (pressure less than 100 mtorr). The vacuum was then released with nitrogen and the reaction mass allowed to cool to room temperature. An additional 45.7 grams of distillate was recovered and 113.7 grams of a solid product was recovered. The sample was measured for laboratory relative viscosity, (LRV), as described above and was found to have an LRV of 24.65. This sample was calculated to have an inherent viscosity of 0.69 dL/g. The sample underwent differential scanning calorimetry, (DSC), analysis. A crystalline melting temperature, (Tm), was observed at 221.7 C, (29.3 J/g).

Example 3

To a 250 milliliter glass flask was added bis(2-hydroxyethyl)terephthalate, (149.49 grams), lactic acid, (85 weight percent aqueous solution, 42.39 grams), tris(2-hydroxyethyl)trimellitate, (0.62 grams), ethylene glycol, (24.83 grams), poly(ethylene glycol), (average molecular weight of 3400, 18.00 grams), and Tyzor® PEL-G, (0.0518 grams, 8.2 weight percent titanium). The reaction mixture was stirred and heated to 180 C under a slow nitrogen purge. After achieving 180 C, the reaction mixture was stirred at 180 C for 1.1 hours under a slow nitrogen purge. The reaction mixture was then heated to 225 C over 0.8 hours with stirring. After achieving 225 C, the reaction mixture was stirred at 225 C for 1.1 hours under a slow nitrogen purge. The reaction mixture was then heated to 250 C over 0.3 hours with stirring under a slight nitrogen purge. 14.1 grams of a colorless distillate was collected over this heating cycle. The reaction mixture was then staged to full vacuum with stirring at 250 C. The resulting reaction mixture was stirred for 1.8 hours under full vacuum, (pressure less than 100 mtorr). The vacuum was then released with nitrogen and the reaction mass allowed to cool to room temperature. An additional 75.1 grams of distillate was recovered and 114.56 grams of a solid product was recovered. The sample was measured for laboratory relative viscosity, (LRV), as described above and was found to have an LRV of 23.57. This sample was calculated to have an inherent viscosity of 0.67 dL/g. The sample underwent differential scanning calorimetry, (DSC), analysis. A broad crystalline melting temperature, (Tm), was observed at 213.1 C, (23.5 J/g).

Example 4

To a 250 milliliter glass flask was added bis(2-hydroxyethyl)terephthalate, (152.54 grams), methyl (S)-(–)-lactate, (41.64 grams), ethylene glycol, (37.24 grams), poly(ethylene glycol, (average molecular weight of 1000, 12.52 grams), tris(2-hydroxyethyl)trimellitate, (0.66 grams), and Tyzor® PEL-G, (0.0933 grams). The reaction mixture was stirred and heated to 180 C under a slow nitrogen purge. After achieving 180 C, the reaction mixture was stirred at 180 C for 0.6 hours under a slow nitrogen purge. The resulting reaction mixture was then heated to 200 C over 0.4 hours with stirring. After achieving 200 C, the reaction mixture was stirred at 200 C for 1.1 hours under a slow nitrogen purge. The reaction mixture was then heated to 255 C over 0.7 hours with stirring under a slight nitrogen purge. The reaction mixture was stirred at 255 C for 1.2 hours under a slight nitrogen purge. 78.1 grams of a colorless distillate was collected over this heating cycle. The reaction mixture was then staged to full vacuum with stirring at 255 C. The resulting reaction mixture was stirred for 3.4 hours under full vacuum, (pressure less than 100 mtorr). The vacuum was then released with nitrogen and the reaction mass allowed to cool to room temperature. An additional 27.9 grams of distillate was recovered and 125.2 grams of a solid product was recovered. The sample was measured for laboratory relative viscosity, (LRV), as described above and was found to have an LRV of 4.07. This sample was calculated to have an inherent viscosity of 0.32 dL/g. The sample underwent differential scanning calorimetry, (DSC), analysis. A crystalline melting temperature, (Tm), was observed at 236.2 C, (43.6 J/g).

Example 5

To a 250 milliliter glass flask was added bis(2-hydroxyethyl)terephthalate, (152.54 grams), methyl (S)-(–)-lactate, (41.64 grams), ethylene glycol, (37.24 grams), poly(ethylene glycol, (average molecular weight of 1000, 12.52 grams), tris(2-hydroxyethyl)trimellitate, (0.66 grams), and Tyzor® PEL-G, (0.0971 grams). The reaction mixture was stirred and heated to 180 C under a slow nitrogen purge. After achieving 180 C, the reaction mixture was stirred at 180 C for 0.5 hours under a slow nitrogen purge. The resulting reaction mixture was then heated to 200 C over 0.2 hours with stirring. After achieving 200 C, the reaction mixture was stirred at 200 C for 1.0 hour under a slow nitrogen purge. The reaction mixture was then heated to 255 C over 0.4 hours with stirring under a slight nitrogen purge. The reaction mixture was stirred at 255 C for 0.5 hours under a slight nitrogen purge. 47.0 grams of a colorless distillate was collected over this heating cycle. The reaction mixture was then staged to full vacuum with stirring at 255 C. The resulting reaction mixture was stirred for 1.7 hours under full vacuum, (pressure less than 100 mtorr). The vacuum was then released with nitrogen and the reaction mass allowed to cool to room temperature. An additional 55.7 grams of distillate was recovered and 117.0 grams of a solid product was recovered. The sample was measured for laboratory relative viscosity, (LRV), as described above and was found to have an LRV of 21.05. This sample was calculated to have an inherent viscosity of 0.63 dL/g. The sample underwent differential scanning calorimetry, (DSC), analysis. A crystalline melting temperature, (Tm), was observed at 221.3 C, (28.4 J/g).

Example 6

To a 250 milliliter glass flask was added bis(2-hydroxyethyl)terephthalate, (177.97 grams), lactic acid, (85 weight percent aqueous solution, 31.79 grams), tris(2-hydroxyethyl)trimellitate, (0.08 grams), poly(ethylene glycol), (average molecular weight=1500, 16.84 grams), ethylene glycol, (31.04 grams), manganese(II) acetate tetrahydrate, (0.0771 grams), and antimony(III) trioxide, (0.0621 grams). The reaction mixture was stirred and heated to 180 C under a slow nitrogen purge. After achieving 180 C, the reaction mixture was stirred at 180 C for 1.0 hour under a slight nitrogen purge. The reaction mixture was then heated to 225 C over 0.7 hours with stirring, After achieving 225 C, the reaction mixture was stirred at 225 C for 0.6 hours under a slight nitrogen purge. The reaction mixture was then heated to 255 C over 0.5 hours with stirring. After achieving 255 C, the reaction mixture was stirred at 255 C for 0.6 hours under a slow nitrogen purge. 47.6 grams of a colorless distillate was collected over this heating cycle. The reaction mixture was then staged to full vacuum with stirring at 255 C. The resulting reaction mixture was stirred for 2.1 hours under full vacuum, (pressure less than 100 mtorr). The vacuum was then released with nitrogen and the reaction mass allowed to cool to room temperature. An additional 50.1 grams of distillate was recovered and 118.3 grams of a solid product was recovered. The sample was measured for laboratory relative viscosity, (LRV), as described above and was found to have an LRV of 21.83. This sample was calculated to have an inherent viscosity of 0.64 dL/g. The sample underwent differential scanning calorimetry, (DSC), analysis. A crystalline melting temperature, (Tm), was observed at a temperature of 229.7 C, (33.4 J/g).

Example 7

To a 250 milliliter glass flask was added bis(2-hydroxyethyl)terephthalate, (152.54 grams), polylactide, (from Cargill Dow, 13.49 grams), poly(ethylene glycol), average molecular weight of 1500, (12.73 grams), manganese(II) acetate tetrahydrate, (0.0605 grams), antimony(III) oxide, (0.0487 grams), and 1,3,5-trimethyl-2,4,6-tris(3,5-di-tert-butyl-4-hydroxybenzyl)benzene, (0.068 grams). The reaction mixture was stirred and heated to 180 C under a slow nitrogen purge. After achieving 180 C, the reaction mixture was stirred at 180 C for 0.6 hours under a slow nitrogen purge. The reaction mixture was then heated to 240 C over 0.9 hours with stirring. After achieving 240 C, the reaction mixture was stirred at 240 C for 0.6 hours under a slow nitrogen purge. The reaction mixture was then heated to 255 C over 0.4 hours with stirring under a slight nitrogen purge. The reaction mixture was stirred at 255 C for 0.6 hours under a slight nitrogen purge. 3.0 grams of a colorless distillate was collected over this heating cycle. The reaction mixture was then staged to full vacuum with stirring at 255 C. The resulting reaction mixture was stirred for 3.4 hours under full vacuum, (pressure less than 100 mtorr). The vacuum was then released with nitrogen and the reaction mass allowed to cool to room temperature. An additional 41.6 grams of distillate was recovered and 100.0 grams of a solid product was recovered. The sample was measured for laboratory relative viscosity, (LRV), as described above and was found to have an LRV of 20.92. This sample was calculated to have an inherent viscosity of 0.62 dL/g. The sample underwent differential scanning calorimetry, (DSC), analysis. A crystalline melting temperature, (Tm), was observed at 231.0 C, (33.7 µg).

Comparative Example CE 3

To a 250 milliliter glass flask was added bis(2-hydroxyethyl)terephthalate, (76.05 grams), dimethyl glutarate, (47.91 grams), tris(2-hydroxyethyl)trimellitate, (0.36 grams), poly(ethylene glycol), (average molecular weight=1500, 9.9 grams), manganese(II) acetate tetrahydrate, (0.0546 grams), and antimony(III) trioxide, (0.0439 grams). The reaction mixture was stirred and heated to 180 C under a slow nitrogen purge. After achieving 180 C, the reaction mixture was heated to 200 C over 1.1 hours with stirring under a slow nitrogen purge. The resulting reaction mixture was stirred at 200 C under a slight nitrogen purge for 1.1 hours. The reaction mixture was then heated to 275 C over 1.7 hours with stirring under a slight nitrogen purge. The resulting reaction mixture was stirred at 275 C for 1.0 hour while under a slight nitrogen purge. 7.2 grams of a colorless distillate was collected over this heating cycle. The reaction mixture was then staged to full vacuum with stirring at 275 C. The resulting reaction mixture was stirred for 3.6 hours under full vacuum, (pressure less than 100 mtorr). The vacuum was then released with nitrogen and the reaction mass allowed to cool to room temperature. An additional 1.0 grams of distillate was recovered and 99.9 grams of a solid product was recovered. The sample was measured for laboratory relative viscosity, (LRV), as described above and was found to have an LRV of 6.70. This sample was calculated to have an inherent viscosity of 0.37 dL/g. The sample underwent differential scanning calorimetry, (DSC), analysis. A broad crystalline melting temperature, (Tm), was observed at 122.6 C, (12.2 J/g).

Example 8

To a 250 milliliter glass flask was added bis(2-hydroxyethyl)terephthalate, (127.12 grams), lactic acid, (85 weight percent aqueous solution, 45.04 grams), tris(2-hydroxyethyl)trimellitate, (0.60 grams), poly(ethylene glycol), (average molecular weight=1500, 16.50 grams), ethylene glycol, (31.04 grams), manganese(II) acetate tetrahydrate, (0.0663 grams), and antimony(III) trioxide, (0.0533 grams). The reaction mixture was stirred and heated to 180 C under a slow nitrogen purge. After achieving 180 C, the reaction mixture was stirred at 180 C for 1.0 hour under a slight nitrogen purge. The reaction mixture was then heated to 225 C over 0.7 hours with stirring. After achieving 225 C, the reaction mixture was stirred at 225 C for 0.5 hours under a slight nitrogen purge. The reaction mixture was then heated to 255 C over 0.7 hours with stirring. After achieving 255 C, the reaction mixture was stirred at 255 C for 0.5 hours under a slow nitrogen purge. 41.9 grams of a colorless distillate was collected over this heating cycle. The reaction mixture was then staged to full vacuum with stirring at 255 C. The resulting reaction mixture was stirred for 2.2 hours under full vacuum, (pressure less than 100 mtorr). The vacuum was then released with nitrogen and the reaction mass allowed to cool to room temperature. An additional 53.2 grams of distillate was recovered and 100.9 grams of a solid product was recovered. The sample was measured for laboratory relative viscosity, (LRV), as described above and was found to have an LRV of 18.85. This sample was calculated to have an inherent viscosity of 0.59 dL/g. The sample underwent differential scanning calorimetry, (DSC), analysis. A crystalline melting temperature, (Tm), was observed at a temperature of 205.5 C, (23.5 J/g).

Preparative Example PE 1

To a 1 liter glass flask was added lactic acid, (85 weight percent aqueous solution, 423.91 grams), and ethylene glycol, (248.28 grams). The reaction mixture was heated to 180 C with stirring while under a slight nitrogen purge. After achieving 180 C, the resulting reaction mixture was allowed to stir at 180 C under the slight nitrogen purge for 1.0 hour. The reaction mixture was then heated to 200 C over 0.8 hours with stirring with a slight nitrogen purge. After achieving 200 C, the resulting reaction mixture was allowed to stir at 200 C for 2.0 hours with a slight nitrogen purge. Heating was then discontinued and the reaction mixture allowed to cool to room temperature. A total of 130.1 grams distillate was collected and 514.7 grams of a colorless, clear product was provided.

Example 9

To a 250 milliliter glass flask was added bis(2-hydroxyethyl)terephthalate, (144.92 grams), product from Preparative Example PE 1, (4.02 grams), poly(ethylene glycol), (average molecular weight of 1000, 5.00 grams), manganese (II) acetate tetrahydrate, (0.0504 grams), antimony(III) oxide, (0.0415 grams), and a 50 weight percent calcium carbonate slurry in ethylene glycol, (100.21 grams slurry). The reaction mixture was stirred and heated to 180 C under a slow nitrogen purge. After achieving 180 C, the reaction mixture was stirred at 180 C for 0.3 hours under a slow nitrogen purge. The reaction mixture was then heated to 260 C over 0.8 hours with stirring. After achieving 260 C, the reaction mixture was stirred at 260 C for 0.8 hours under a slow nitrogen purge. 82.2 grams of a colorless distillate was collected over this heating cycle. The reaction mixture was then staged to full vacuum with stirring at 260 C. The resulting reaction mixture was stirred for 1.5 hours under full vacuum, (pressure less than 100 mtorr). The vacuum was then released with nitrogen and the reaction mass allowed to cool to room temperature. An additional 30.2 grams of distillate was recovered and 140.7 grams of a solid product was recovered. The sample was measured for laboratory relative viscosity, (LRV), as described above and was found to have an LRV of 19.90. This sample was calculated to have an inherent viscosity of 0.61 dL/g. The sample underwent differential scanning calorimetry, (DSC), analysis. A crystalline melting temperature, (Tm), was observed at 244.4 C, (27.1 J/g).

Example 10

To a 250 milliliter glass flask was added bis(2-hydroxyethyl)terephthalate, (129.66 grams), isophthalic acid, (9.97 grams), glycolic acid, (2.28 grams), poly(ethylene glycol), (average molecular weight=1500, 5.85 grams), manganese (II) acetate tetrahydrate, (0.0532 grams), antimony(III) trioxide, (0.0450 grams), and a 50 weight percent calcium carbonate slurry in ethylene glycol, (58.52 grams). The reaction mixture was stirred and heated to 180 C under a slow nitrogen purge. After achieving 180 C, the reaction mixture was stirred at 180 C for 0.7 hours under a slight nitrogen purge. The reaction mixture was then heated to 260 C over 0.7 hours with stirring. After achieving 260 C, the reaction mixture was stirred at 260 C for 1.7 hours under a slow nitrogen purge. 54.7 grams of a colorless distillate was collected over this heating cycle. The reaction mixture was then staged to full vacuum with stirring at 260 C. The resulting reaction mixture was stirred for 2.1 hours under full vacuum, (pressure less than 100 mtorr). The vacuum was then released with nitrogen and the reaction mass allowed to cool to room temperature. An additional 25.2 grams of distillate was recovered and 110.3 grams of a solid product was recovered. The sample was measured for laboratory relative viscosity, (LRV), as described above and was found to have an LRV of 23.42. This sample was calculated to have an inherent viscosity of 0.67 dL/g. The sample underwent differential scanning calorimetry, (DSC), analysis. A crystalline melting temperature, (Tm), was observed at a temperature of 235.4 C, (25.9 J/g).

Example 11

To a 250 milliliter glass flask was added dimethyl terephthalate, (110.69 grams), glycolic acid, (2.28 grams), 1,3-propanediol, (73.06 grams), poly(tetramethylene glycol), (average molecular weight of 1000, (13.27 grams), titanium (IV) isopropoxide, (0.1390 grams), and Gelwhite® MAS, (14.75 grams). The reaction mixture was heated to 180 C under a slight nitrogen purge. After achieving 180 C, the reaction mixture was stirred at 180 C under a slight nitrogen purge for 0.5 hours. The reaction mixture was then heated to 190 C with stirring under a slight nitrogen purge over 0.3 hours. After achieving 190 C, the reaction mixture was stirred at 190 C with stirring under a slight nitrogen purge for 0.5 hours. The reaction mixture was then heated with stirring to 200 C under a slight nitrogen purge over 0.4 hours. After achieving 200 C, the resulting reaction mixture was stirred at 200 C under a slight nitrogen purge for 0.6 hours. The reaction mixture was then stirred and heated to 255 C under a slow nitrogen purge over 0.8 hours. After achieving 255 C, the resulting reaction mixture was stirred at 255 C for 0.6 hours under a slow nitrogen purge. 35.9 grams of a colorless distillate was collected over this heating cycle. The reaction mixture was then staged to full vacuum with stirring at 255 C. The resulting reaction mixture was stirred for 3.1 hours under full vacuum, (pressure less than 100 mtorr). The vacuum was then released with nitrogen and the reaction mass allowed to cool to room temperature. An additional 23.0 grams of distillate was recovered and 128.7 grams of a solid product was recovered. The sample was measured for laboratory relative viscosity, (LRV), as described above and was found to have an LRV of 11.89. This sample was calculated to have an inherent viscosity of 0.46 dL/g. The sample underwent differential scanning calorimetry, (DSC), analysis. A crystalline melting temperature, (Tm), was observed at 212.5 C, (38.5 J/g).

Example 12

To a 250 milliliter glass flask was added dimethyl terephthalate, (104.86 grams), ethyl (S)-(–)-lactate, (7.09 grams), 1,3-propanediol, (73.06 grams), poly(ethylene glycol)-block-poly(propylene glycol)-block-polyethylene glycol), (average molecular weight of 1100, ca. 10 weight percent ethylene glycol, 38.93 grams), and titanium(IV) isopropoxide, (0.1350 grams). The reaction mixture was stirred and heated to 180 C under a slow nitrogen purge. After achieving 180 C, the reaction mixture was stirred at 180 C for 0.5 hours under a slow nitrogen purge. The reaction mixture was then heated to 190 C over 0.3 hours with stirring. After achieving 190 C, the reaction mixture was stirred at 190 C for 0.5 hours under a slow nitrogen purge. The reaction mixture was then heated to 200 C over 0.3 hours with stirring under a slight nitrogen purge. The reaction mixture was stirred at 200 C for 0.6 hours under a slight nitrogen purge. The reaction mixture was then heated to 255 C over 1.0 hour with stirring under a slight nitrogen purge. The reaction mixture was stirred at 255 C for 0.5 hours under a slight nitrogen purge. 32.9 grams of a colorless distillate was collected over this heating cycle. The reaction mixture was then staged to full vacuum with stirring at 255 C. The resulting reaction mixture was stirred for 4.1 hours under full vacuum, (pressure less than 100 mtorr). The vacuum was then released with nitrogen and the reaction mass allowed to cool to room temperature. An additional 33.4 grams of distillate was recovered and 123.6 grams of a solid product was recovered. The sample was measured for laboratory relative viscosity, (LRV), as described above and was found to have an LRV of 34.59. This sample was calculated to have an inherent viscosity of 0.87 dL/g. The sample underwent differential scanning calorimetry, (DSC), analysis. A glass transition temperature, (Tg), was not observed.

A broad crystalline melting temperature, (Tm), was observed at 218.0 C, (39.1 J/g).

Example 13

To a 250 milliliter glass flask was added dimethyl terephthalate, (87.39 grams), glycolic acid, (11.41 grams), 1,3-propanediol, (51.36 grams), poly(ethylene glycol), (average molecular weight of 3400, (10.57 grams), pentaerythritol, (0.0518 grams), titanium(IV) isopropoxide, (0.1110 grams), and Laponite® RDS, (26.42 grams). The reaction mixture was heated to 180 C under a slight nitrogen purge. After achieving 180 C, the reaction mixture was stirred at 180 C under a slight nitrogen purge for 0.6 hours. The reaction mixture was then heated to 190 C with stirring under a slight nitrogen purge over 0.4 hours. After achieving 190 C, the reaction mixture was stirred at 190 C with stirring under a slight nitrogen purge for 0.6 hours. The reaction mixture was then heated with stirring to 200 C under a slight nitrogen purge over 0.2 hours. After achieving 200 C, the resulting reaction mixture was stirred at 200 C under a slight nitrogen purge for 0.5 hours. The reaction mixture was then stirred and heated to 255 C under a slow nitrogen purge over 1.1 hours. After achieving 255 C, the resulting reaction mixture was stirred at 255 C for 0.6 hours under a slow nitrogen purge. 28.4 grams of a colorless distillate was collected over this heating cycle. The reaction mixture was then staged to full vacuum with stirring at 255 C. The resulting reaction mixture was stirred for 3.2 hours under full vacuum, (pressure less than 100 mtorr). The vacuum was then released with nitrogen and the reaction mass allowed to cool to room temperature. An additional 6.0 grams of distillate was recovered and 125.4 grams of a solid product was recovered. The sample was measured for laboratory relative viscosity, (LRV), as described above and was found to have an LRV of 19.04. This sample was calculated to have an inherent viscosity of 0.59 dL/g. The sample underwent differential scanning calorimetry, (DSC), analysis. A broad crystalline melting temperature, (Tm), was observed at 221.9 C, (30.0 J/g).

Example 14

To a 250 milliliter glass flask was added dimethyl terephthalate, (87.39 grams), lactic acid, (85 weight percent aqueous solution, 15.90 grams), 1,3-propanediol, (51.36 grams), poly(ethylene glycol)-block-poly(propylene glycol)-block-polyethylene glycol), (average molecular weight of 2000, ca. 10 weight percent ethylene glycol, 11.50 grams), pentaerythritol, (0.0546 grams), titanium(IV) isopropoxide, (0.0742 grams), and kaolin, (12.78 grams). The reaction mixture was stirred and heated to 180 C under a slow nitrogen purge. After achieving 180 C, the reaction mixture was stirred at 180 C for 0.6 hours under a slow nitrogen purge. The reaction mixture was then heated to 190 C over 0.2 hours with stirring. After achieving 190 C, the reaction mixture was stirred at 190 C for 0.5 hours under a slow nitrogen purge. The reaction mixture was then heated to 255 C over 0.8 hours with stirring under a slight nitrogen purge. The reaction mixture was stirred at 255 C for 1.2 hours under a slight nitrogen purge. 41.8 grams of a colorless distillate was collected over this heating cycle. The reaction mixture was then staged to full vacuum with stirring at 255 C. The resulting reaction mixture was stirred for 3.1 hours under full vacuum, (pressure less than 100 mtorr). The vacuum was then released with nitrogen and the reaction mass allowed to cool to room temperature. An additional 4.0 grams of distillate was recovered and 113.8 grams of a solid product was recovered. The sample was measured for laboratory relative viscosity, (LRV), as described above and was found to have an LRV of 8.09. This sample was calculated to have an inherent viscosity of 0.39 dL/g. The sample underwent differential scanning calorimetry, (DSC), analysis. A glass transition temperature, (Tg), was not observed. A broad crystalline melting temperature, (Tm), was observed at 164.8 C, (25.5 J/g).

Example 15

To a 250 milliliter glass flask was added dimethyl terephthalate, (87.39 grams), lactic acid, (85 weight percent aqueous solution, 15.90 grams), 1,3-propanediol, (51.36 grams), poly(ethylene glycol)-block-poly(propylene glycol)-block-polyethylene glycol), (average molecular weight of 2000, ca. 10 weight percent ethylene glycol, 19.90 grams), pentaerythritol, (0.0518 grams), titanium(IV) isopropoxide, (0.0655 grams), and kaolin, (12.78 grams). The reaction mixture was stirred and heated to 180 C under a slow nitrogen purge. After achieving 180 C, the reaction mixture was stirred at 180 C for 0.5 hours under a slow nitrogen purge. The reaction mixture was then heated to 190 C over 0.3 hours with stirring. After achieving 190 C, the reaction mixture was stirred at 190 C for 0.5 hours under a slow nitrogen purge. The reaction mixture was then heated to 200 C over 0.3 hours with stirring under a slight nitrogen purge. The reaction mixture was stirred at 200 C for 0.5 hours under a slight nitrogen purge. The reaction mixture was then heated to 255 C over 0.9 hours with stirring under a slight nitrogen purge. The reaction mixture was stirred at 255 C for 0.5 hours under a slight nitrogen purge. 33.9 grams of a colorless distillate was collected over this heating cycle. The reaction mixture was then staged to full vacuum with stirring at 255 C. The resulting reaction mixture was stirred for 3.0 hours under full vacuum, (pressure less than 100 mtorr). The vacuum was then released with nitrogen and the reaction mass allowed to cool to room temperature. An additional 17.3 grams of distillate was recovered and 110.8 grams of a solid product was recovered. The sample was measured for laboratory relative viscosity, (LRV), as described above and was found to have an LRV of 23.81. This sample was calculated to have an inherent viscosity of 0.68 dL/g. The sample underwent differential scanning calorimetry, (DSC), analysis. A glass transition temperature, (Tg), was not observed. A crystalline melting temperature, (Tm), was observed at 169.9 C, (28.9 J/g).

Example 16

To a 250 milliliter glass flask was added poly(trimethylene terephthalate), (59.74 grams), 1,3-propanediol, (3.81 grams), and poly(ethylene glycol)-block-poly(propylene glycol)-block-polyethylene glycol), (average molecular weight of 2000, ca. 10 weight percent ethylene glycol, 77.12 grams). The reaction mixture was heated to 255 C under a slow nitrogen purge. After achieving 255 C, the reaction mixture was stirred at 255 C for 0.4 hours under a slow nitrogen purge. Poly(lactic acid), (from Cargill Dow, 14.42 grams), was then added to the stirred reaction mixture. The reaction mixture was then stirred at 255 C for 1.2 hours under a slow nitrogen purge. 0.9 grams of a colorless distillate was collected over this heating cycle. The reaction mixture was then staged to full vacuum with stirring at 255 C. The resulting reaction mixture was stirred for 3.6 hours under full vacuum, (pressure less than 100 mtorr). The vacuum was then released with nitrogen and the reaction mass allowed to cool to room temperature. An additional 3.8 grams of distillate was recovered and 134.2 grams of a solid product was recovered. The sample was measured for laboratory relative viscosity, (LRV), as described above and was found to have an LRV of 6.64. This sample was calculated to have an inherent viscosity of 0.37 dL/g. The sample underwent differential scanning calorimetry, (DSC), analysis. A broad crystalline melting temperature, (Tm), was observed at 148.6 C, (13.0 J/g).

Example 17

To a 250 milliliter glass flask was added dimethyl terephthalate, (89.33 grams), isophthalic acid, (6.65 grams), lactic acid, (85 weight percent aqueous solution, 52.99 grams), 1,3-propanediol, (60.88 grams), poly(1,3-trimethylene glycol), (7.32 grams), titanium(IV) isopropoxide, (0.0963 grams), and silica, (1.48 grams). The reaction mixture was stirred and heated to 180 C under a slow nitrogen purge. After achieving 180 C, the reaction mixture was stirred at 180 C for 0.3 hours under a slow nitrogen purge. The reaction mixture was then heated to 190 C over 0.1 hours with stirring. After achieving 190 C, the reaction mixture was stirred at 190 C for 0.5 hours under a slow nitrogen purge. The reaction mixture was then heated to 200 C over 0.1 hours with stirring under a slight nitrogen purge. The reaction mixture was stirred at 200 C for 0.5 hours under a slight nitrogen purge. The reaction mixture was then heated to 255 C over 0.7 hour with stirring under a slight nitrogen purge. The reaction mixture was stirred at 255 C for 0.9 hours under a slight nitrogen purge. 54.8 grams of a colorless distillate was collected over this heating cycle. The reaction mixture was then staged to full vacuum with stirring at 255 C. The resulting reaction mixture was stirred for 1.5 hours under full vacuum, (pressure less than 100 mtorr). The vacuum was then released with nitrogen and the reaction mass allowed to cool to room temperature. An additional 30.4 grams of distillate was recovered and 109.6 grams of a solid product was recovered. The sample was measured for laboratory relative viscosity, (LRV), as described above and was found to have an LRV of 29.75. This sample was calculated to have an inherent viscosity of 0.78 dL/g. The sample underwent differential scanning calorimetry, (DSC), analysis. A glass transition temperature, (Tg), was not observed. A crystallization exotherm, (Tcryst), was observed at a temperature of 76.5 C. A broad crystalline melting temperature, (Tm), was observed at 189.7 C, (30.7 J/g).

Example 18

To a 250 milliliter glass flask was added poly(1,4-butylene terephthalate), (63.80 grams), 1,4-butanediol, (4.51 grams), and poly(tetramethylene glycol), (average molecular weight of 2000, (76.20 grams). The reaction mixture was stirred and heated to 255 C under a slow nitrogen purge. After achieving 255 C, poly(lactide), (from Cargill-Dow, 14.42 grams), was added to the homogeneous reaction mixture and the resulting mixture was stirred at 255 C for 0.8 hours under a slow nitrogen purge. 0.9 grams of a colorless distillate was collected over this heating cycle. The homogeneous reaction mixture was then staged to full vacuum with stirring at 255 C. The resulting reaction mixture was stirred for 4.3 hours under full vacuum, (pressure less than 100 mtorr). The vacuum was then released with nitrogen and the reaction mass allowed to cool to room temperature. An additional 0.9 grams of distillate was recovered and 123.5 grams of a solid product was recovered. The sample measured for laboratory relative viscosity, (LRV), as described above and was found to have an LRV of 77.27. This sample was calculated to have an inherent viscosity of 1.65 dL/g. The sample underwent differential scanning calorimetry, (DSC), analysis. A broad crystalline melting temperature, (Tm), was observed at 167.3 C, (13.4 J/g).

Example 19

To a 250 milliliter glass flask was added dimethyl terephthalate, (58.26 grams), methyl (S)-(–)-lactate, (31.23 grams), 1,4-butanediol, (86.52 grams), poly(tetramethylene glycol), (average molecular weight of 1000, (30.02 grams), pentaerythritol, (0.0450 grams), and titanium(IV) isopropoxide, (0.1070 grams). The reaction mixture was heated to 180 C under a slight nitrogen purge. After achieving 180 C, the reaction mixture was stirred at 180 C under a slight nitrogen purge for 0.6 hours. The reaction mixture was then heated to 190 C with stirring under a slight nitrogen purge over 0.2 hours. After achieving 190 C, the reaction mixture was stirred at 190 C with stirring under a slight nitrogen purge for 0.6 hours. The reaction mixture was then heated to 200 C with stirring under a slight nitrogen purge over 0.3 hours. The resulting reaction mixture was then stirred at 200 C under a slight nitrogen purge for 0.5 hours. The reaction mixture was then stirred and heated to 255 C under a slow nitrogen purge over 1.0 hour. After achieving 255 C, the resulting reaction mixture was stirred at 255 C for 0.6 hours under a slow nitrogen purge. 59.9 grams of a colorless distillate was collected over this heating cycle. The reaction mixture was then staged to full vacuum with stirring at 255 C. The resulting reaction mixture was stirred for 1.3 hours under full vacuum, (pressure less than 100 mtorr). The vacuum was then released with nitrogen and the reaction mass allowed to cool to room temperature. An additional 32.8 grams of distillate was recovered and 90.7 grams of a solid product was recovered. The sample was measured for laboratory relative viscosity, (LRV), as described above and was found to have an LRV of 41.78. This sample was calculated to have an inherent viscosity of 1.00 dL/g. The sample underwent differential scanning calorimetry, (DSC), analysis. A broad crystalline melting temperature, (Tm), was observed at 172.2 C, (21.2 J/g).

Example 20

To a 250 milliliter glass flask was added bis(2-hydroxyethyl)terephthalate, (137.29 grams), lactic acid, (85 weight percent aqueous solution, 3.18 grams), glycolic acid, (2.28 grams), poly(ethylene glycol), (average molecular weight=3400, 5.66 grams), manganese(II) acetate tetrahydrate, (0.0514 grams), antimony(III) trioxide, (0.0414 grams), and Claytone® 2000, (3.50 grams). The reaction mixture was stirred and heated to 180 C under a slow nitrogen purge. After achieving 180 C, the reaction mixture was stirred at 180 C for 0.6 hours under a slight nitrogen purge. The reaction mixture was then heated to 255 C over 1.4 hours with stirring. After achieving 255 C, the reaction mixture was stirred at 255 C for 0.6 hours under a slow nitrogen purge. 14.0 grams of a colorless distillate was collected over this heating cycle. The reaction mixture was then staged to full vacuum with stirring at 255 C. The resulting reaction mixture was stirred for 2.1 hours under full vacuum, (pressure less than 100 mtorr). The vacuum was then released with nitrogen and the reaction mass allowed to cool to room temperature. An additional 15.3 grams of distillate was recovered and 73.8 grams of a solid product was recovered. The sample was measured for laboratory relative viscosity, (LRV), as described above and was found to have an LRV of 18.35. This sample was calculated to have an inherent viscosity of 0.58 dL/g. The sample underwent differential scanning calorimetry, (DSC), analysis. A crystalline melting temperature, (Tm), was observed at a temperature of 234.0 C, (52.1 J/g).

Example 21

To a 250 milliliter glass flask was added dimethyl terephthalate, (93.21 grams), lactic acid, (85 weight percent aqueous solution, 6.36 grams), glycolic acid, (4.56 grams), 1,4-butanediol, (86.52 grams), poly(tetramethylene glycol), (average molecular weight of 2000, (20.2 grams)), and titanium(IV) isopropoxide, (0.1282 grams). The reaction mixture was heated to 180 C under a slight nitrogen purge. After achieving 180 C, the reaction mixture was stirred at 180 C under a slight nitrogen purge for 0.4 hours. The reaction mixture was then heated to 190 C with stirring under a slight nitrogen purge over 0.1 hours. After achieving 190 C, the reaction mixture was stirred at 190 C with stirring under a slight nitrogen purge for 0.9 hours. The reaction mixture was then heated to 200 C with stirring under a slight nitrogen purge over 0.2 hours. The resulting reaction mixture was then stirred at 200 C under a slight nitrogen purge for 0.4 hours. The reaction mixture was then stirred and heated to 255 C under a slow nitrogen purge over 0.5 hours. After achieving 255 C, the resulting reaction mixture was stirred at 255 C for 0.6 hours under a slow nitrogen purge. 43.8 grams of a colorless distillate was collected over this heating cycle. The reaction mixture was then staged to full vacuum with stirring at 255 C. The resulting reaction mixture was stirred for 2.6 hours under full vacuum, (pressure less than 100 mtorr). The vacuum was then released with nitrogen and the reaction mass allowed to cool to room temperature. An additional 20.6 grams of distillate was recovered and 123.2 grams of a solid product was recovered. The sample was measured for laboratory relative viscosity, (LRV), as described above and was found to have an LRV of 26.04. This sample was calculated to have an inherent viscosity of 0.72 dL/g. The sample underwent differential scanning calorimetry, (DSC), analysis. A crystalline melting temperature, (Tm), was observed at 212.2 C, (32.6 J/g).

Example 22

To a 250 milliliter glass flask was added bis(2-hydroxyethyl)terephthalate, (152.54 grams), glycolic acid, (14.69 grams), poly(ethylene glycol), (average molecular weight=1000, 18.95 grams), sodium acetate, (0.22 grams), manganese(II) acetate tetrahydrate, (0.0702 grams), antimony(III) trioxide, (0.0565 grams), and Irganox® 1010, (0.073 grams). The reaction mixture was stirred and heated to 180 C under a slow nitrogen purge. After achieving 180 C, the reaction mixture was stirred at 180 C for 0.6 hours under a slight nitrogen purge. The reaction mixture was then heated to 240 C over 1.0 hour with stirring. After achieving 240 C, the reaction mixture was stirred at 240 C for 0.6 hours under a slow nitrogen purge. The reaction mixture was then heated to 255 C over 0.3 hours with stirring. After achieving 255 C, the reaction mixture was stirred at 255 C for 0.5 hours under a slow nitrogen purge. 10.4 grams of a colorless distillate was collected over this heating cycle. The reaction mixture was then staged to full vacuum with stirring at 255 C. The resulting reaction mixture was stirred for 2.3 hours under full vacuum, (pressure less than 100 mtorr). The vacuum was then released with nitrogen and the reaction mass allowed to cool to room temperature. An additional 34.5 grams of distillate was recovered and 122.2 grams of a solid product was recovered. The sample was measured for laboratory relative viscosity, (LRV), as described above and was found to have an LRV of 22.24. This sample was calculated to have an inherent viscosity of 0.65 dL/g. The sample underwent differential scanning calorimetry, (DSC), analysis. A crystalline melting temperature, (Tm), was observed at a temperature of 220.9 C, (35.1 J/g).

Example 23

To a 250 milliliter glass flask was added bis(2-hydroxyethyl)terephthalate, (152.54 grams), glycolic acid, (18.46 grams), poly(ethylene glycol), (average molecular weight=3400, 12.73 grams), manganese(II) acetate tetrahydrate, (0.0605 grams), and antimony(III) trioxide, (0.0487 grams). The reaction mixture was stirred and heated to 180 C under a slow nitrogen purge. After achieving 180 C, the reaction mixture was stirred at 180 C for 0.5 hours under a slight nitrogen purge. The reaction mixture was then heated to 240 C over 0.8 hours with stirring. After achieving 240 C, the reaction mixture was stirred at 240 C for 0.6 hours under a slow nitrogen purge. The reaction mixture was then heated to 255 C over 0.3 hours with stirring. After achieving 255 C, the reaction mixture was stirred at 255 C for 0.8 hours under a slow nitrogen purge. 8.1 grams of a colorless distillate was collected over this heating cycle. The reaction mixture was then staged to full vacuum with stirring at 255 C. The resulting reaction mixture was stirred for 3.8 hours under full vacuum, (pressure less than 100 mtorr). The vacuum was then released with nitrogen and the reaction mass allowed to cool to room temperature. An additional 36.9 grams of distillate was recovered and 115.2 grams of a solid product was recovered. The sample was measured for laboratory relative viscosity, (LRV), as described above and was found to have an LRV of 21.07. This sample was calculated to have an inherent viscosity of 0.63 dL/g. The sample underwent differential scanning calorimetry, (DSC), analysis. A crystalline melting temperature, (Tm), was observed at a temperature of 223.2 C, (27.1 J/g).

Example 24

Material produced as described in Example 3, above, except at a larger scale, is dried in a hopper dryer for 8 hours at 70 C to a −40 C dew point. The material is then fed at a rate of 20 pounds per hour into the feed section of a 1½-inch diameter single screw Davis Standard extruder, (screw L/D of 24:1, model number DS-15H). The extruder conditions and temperature profile is noted below. The molten polymer is then fed into a Killion 3 roll stack sheet line with the conditions and temperature profile noted below.

Extruder Zone 1 temperature, (feed section): 410 F

Extruder Zone 2 temperature: 430 F

Extruder Zone 3 temperature: 460 F

Extruder Zone 4 (front) temperature: 460 F

Flange: 460 F

Pipe: 460 F

Flange: 460 F

Die temperature: 460 F

Die Lips: 460 F

Melt Temperature: 460 F

Extruder Amps: 5

Extruder RPM: 50
Chill Roll Top temperature: 70 F
Chill Roll Middle temperature: 70 F
Chill Roll Bottom temperature: 70 F
Film Take Off Speed: 235 inches/minute A film 8 inches wide with a thickness of 0.003 inches, (3 mils), is produced. The film is tested as a fast food sandwich wrap packaging.

Example 25

2 inch squares of the film produced above in Example 24 are preheated to 80 C for 4 minutes, (being careful not to allow the hot air to impinge directly onto the film so as to avoid hot spots), and biaxially oriented on a tenter frame T. M. Long Biaxial stretcher. The draw ratio of the stretcher is set at 3 times 3 and the stretching rate is 5 inches per second (12.7 cm/second). Tensile strength in the machine direction and in the transverse direction is measured. The biaxially stretched film is tested as a fast food sandwich wrap packaging.

Examples 26–47 and Comparative Example CE 4

Polymers prepared as described above in the Examples and Comparative Examples noted below in Table 1, except at a larger scale, are dried in a hopper dryer for 8 hours at 60 C to a −40 C dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with the heater profile noted within Table 1.

The extruded polymer films are electrostatically pinned on a 12 inch diameter smooth quench drum maintained at a temperature of 26 C with cold water and collected on release paper using a standard tension roll. The quench drum speed is adjusted from 5 to 15 feet per minute to obtain film samples with a thickness of about 8 mils to about 1.5 mils.

The films of Examples 26 to 47 are tested as fast food sandwich wraps, particularly with regard to deadfold performance, and are also tested for physical properties and found to have an excellent combination of toughness, as measured by Elmendorf Tear, Graves Tear, and percent elongation at break, and strength, as measured by tensile strength at break and tensile modulus.

10 Inch by 16 inch rectangles are cut out of the film of Examples 26 to 47, and Comparative Example CE 4 and the size accurately measured. The film rectangles are placed in a Fisher Scientific Isotemp Incubator, Model Number 625D, heated to 60 C for 1 hour. The film rectangles are then accurately remeasured to determine loss.

Pieces of the films of Examples 26 to 47 (8-inch by 8-inch squares) are placed in a rotary composter with about 0.5 cubic yards squared of mixed municipal solid waste, (from which glass, cans, and much of the light plastic and paper is removed), and sewage sludge in the ratio of about 2:1. The composter is rotated once a week and the temperature and moisture content are monitored.

Example 48

A polymer prepared as described in Example 21, except at a larger scale, is dried in a hopper dryer for 8 hours at 80 C to a −40 C dew point. The dried polymer is placed in the hopper of a single screw volumetric feeder (K-tron Model No. 7), from which it free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

TABLE 1

| | | Extruder Heater Profile | | | | | | |
|---|---|---|---|---|---|---|---|---|
| Example | Polymer Example | Zone 1 (C.) | Zone 2 (C.) | Zone 3 (C.) | Zone 4 (C.) | Zone 5 (C.) | Die (C.) | Melt (C.) |
| 26 | 1 | 210 | 230 | 240 | 240 | 240 | 245 | 240 |
| 27 | 2 | 210 | 225 | 240 | 240 | 240 | 245 | 240 |
| 28 | 3 | 205 | 215 | 235 | 235 | 235 | 240 | 235 |
| 29 | 5 | 210 | 225 | 240 | 240 | 240 | 245 | 240 |
| 30 | 6 | 220 | 235 | 250 | 250 | 250 | 255 | 250 |
| 31 | 7 | 220 | 240 | 250 | 250 | 250 | 255 | 250 |
| CE 4 | CE 3 | 110 | 125 | 140 | 140 | 140 | 145 | 140 |
| 32 | 8 | 195 | 210 | 225 | 225 | 225 | 230 | 225 |
| 33 | 9 | 230 | 250 | 265 | 265 | 265 | 270 | 265 |
| 34 | 10 | 225 | 240 | 255 | 255 | 255 | 260 | 255 |
| 35 | 11 | 200 | 220 | 220 | 220 | 220 | 225 | 220 |
| 36 | 12 | 215 | 225 | 235 | 235 | 235 | 240 | 240 |
| 37 | 13 | 210 | 225 | 235 | 235 | 235 | 240 | 240 |
| 38 | 14 | 155 | 170 | 185 | 185 | 185 | 190 | 185 |
| 39 | 15 | 160 | 180 | 190 | 190 | 190 | 195 | 190 |
| 40 | 16 | 140 | 155 | 170 | 170 | 170 | 175 | 170 |
| 41 | 17 | 180 | 195 | 205 | 205 | 205 | 210 | 205 |
| 42 | 18 | 165 | 180 | 190 | 190 | 190 | 195 | 190 |
| 43 | 19 | 165 | 180 | 190 | 190 | 190 | 195 | 195 |
| 44 | 20 | 225 | 240 | 250 | 250 | 250 | 255 | 250 |
| 45 | 21 | 200 | 215 | 235 | 235 | 235 | 240 | 240 |
| 46 | 22 | 210 | 230 | 240 | 240 | 240 | 245 | 240 |
| 47 | 23 | 220 | 235 | 245 | 245 | 245 | 250 | 245 |

| Zone 1 (C.) | Zone 2 (C.) | Zone 3 (C.) | Zone 4 (C.) | Zone 5 (C.) | Die (C.) | Melt (C.) |
|---|---|---|---|---|---|---|
| 205 | 220 | 235 | 235 | 235 | 240 | 235 |

The extruded polymer film is electrostatically pinned on a 12 inch diameter smooth quench drum maintained at a temperature of 26 C with cold water and collected on release paper using a standard tension roll. The quench drum speed is adjusted from 5 to 15 feet per minute to obtain film samples with a thickness of about 8 mils to about 1.5 mils. The film is tested as fast food sandwich wraps, including for deadfold performance.

Examples 49–67 and Comparative Example CE 5

The films produced in the Examples listed below in Table 2, with a thickness of between about 1.5 mils to 8 mils, are sent through a Machine Direction Orienter (MDO) Model Number 7200 from the Marshall and Williams Company of Providence, R.I. The MDO unit is preheated to the temperature listed in Table 2, below, and the film is stretched as noted below in Table 2 while at that temperature. For example, "Stretched 3×" means that an meter long film would be stretched to a resultant length of 3 meters.

TABLE 2

| Example | Cast Film Example | MDO Temperature (C.) | MDO Stretch |
|---|---|---|---|
| 49 | 26 | 50 | 3X |
| 50 | 28 | 45 | 3X |
| 51 | 29 | 50 | 3X |
| 52 | 30 | 60 | 3X |
| 53 | 31 | 60 | 4X |
| CE 5 | CE 4 | 40 | 3X |
| 54 | 32 | 40 | 3X |
| 55 | 33 | 70 | 3.5X |
| 56 | 34 | 60 | 3X |
| 57 | 35 | 50 | 3X |
| 58 | 36 | 55 | 4X |
| 59 | 37 | 50 | 3.5X |
| 60 | 39 | 65 | 4.5X |
| 61 | 41 | 55 | 4X |
| 62 | 42 | 60 | 4X |
| 63 | 43 | 55 | 4X |
| 64 | 44 | 50 | 3.5X |
| 65 | 45 | 65 | 4X |
| 66 | 46 | 50 | 3.5X |
| 67 | 47 | 55 | 3.5X |

The uniaxially stretched films of Examples 49 to 67 are tested for tensile strength in the machine direction and as fast food sandwich wrap packaging.

10 Inch by 16 inch rectangles are cut out of the film of Examples 49–67 and Comparative Examples CE 5 and the size accurately measured. The film rectangles are placed in a Fisher Scientific Isotemp Incubator, Model Number 625D, heated to 60 C for 1 hour. The film rectangles are then accurately remeasured to determine shrinkage.

Examples 68–75

2 inch squares of the films produced above and detailed in Table 3 below are preheated to the temperature noted below in Table 3 for 4 minutes, (being careful not to allow the hot air to impinge directly onto the film so as to avoid hot spots), and biaxially oriented on a tenter frame T. M. Long Biaxial stretcher. The draw ratio of the stretcher is set at 3 times 3 and the stretching rate is 5 inches per second (12.7 cm/second).

TABLE 3

| Example | Cast Film Example | Biaxial Stretch Temperature (C.) |
|---|---|---|
| 68 | 26 | 60 |
| 69 | 29 | 65 |
| 70 | 32 | 55 |
| 71 | 33 | 70 |
| 72 | 35 | 60 |
| 73 | 41 | 50 |
| 74 | 42 | 50 |
| 75 | 45 | 55 |

The tensile strength in both the machine direction and in the transverse direction are measured. The biaxially stretched films of Examples 68–75 are tested as a fast food sandwich wrap packaging, including deadfold performance.

Examples 76–80

A polymer prepared as described in Example 2, except at a larger scale, is dried in a hopper dryer for 8 hours at 80 C to a −40 C dew point. The dried polymer is powder blended with 0.10 weight percent (based on polymer weight) Irganox-1010, a hindered phenolic antioxidant from the Ciba Company. The material is placed in the hopper of a single screw volumetric feeder, (K-tron Model No. 7), from which it free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (C.) | Zone 2 (C.) | Zone 3 (C.) | Zone 4 (C.) | Zone 5 (C.) | Die (C.) |
|---|---|---|---|---|---|
| 200 | 230 | 240 | 240 | 240 | 245 |

A plasticizer, acetyl tri-n-butyl citrate, from Morflex, Inc., is injected into zone 2 at a rate to provide the compositions listed below in Table 4 with an Accurate feeder. The plasticizer amount shown in Table 4 is based on the weight of the total composition.

TABLE 4

| Example | Plasticizer Amount (wt. %) |
|---|---|
| 76 | 0 |
| 77 | 5 |
| 78 | 10 |
| 79 | 15 |
| 80 | 20 |

The extruded polymer film is electrostatically pinned on a 12 inch diameter smooth quench drum maintained at a temperature of 26 C with cold water and collected on release paper using a standard tension roll. The quench drum speed is adjusted from 5 to 15 feet per minute to obtain film samples with a thickness of about 8 mils to about 1.5 mils. The films of Examples 76–80 are tested as fast food sandwich wrap packaging, including deadfold performance.

Examples 81–86

A polymer prepared as in Example 18, above, except at a larger scale, is dried overnight in a large tray dryer at 60 C with hot dry air recirculation to a moisture content of less than 0.04 percent. Corn starch (Corn Products 3005 from CPC International, Inc.) and rice starch (Sigma Chemicals catalog number S7260) are dried in a large tray vacuum oven at 90 C and less than 1 mm Hg vacuum to a moisture content of less than 1 percent and stored in sealed containers until used. Polyethylene adipate (Rucoflex® S-101-55, nominal molecular weight of 2000, from the Ruco Polymer Corporation) is used directly as received without pretreatment.

Blends of the polymer and starch are made by manually tumbling the materials in plastic bags. The dry starch is added to the warm polymer from the dryer, and the still warm mixture fed to the extruder. When polyethylene adipate (Rucoflex®) is used, the polyethylene adipate is melted and liquid injected into the second heater zone of the extruder through a metering pump. The compositions listed in Table 5, below, are prepared.

TABLE 5

| Example | Polymer (wt. %) | Cornstarch (wt. %) | rice starch (wt. %) | polyethylene adipate (wt. %) |
|---|---|---|---|---|
| 81 | 80 | 20 | | |
| 82 | 60 | 40 | | |
| 83 | 55 | 40 | | 5 |
| 84 | 45 | 35 | | 20 |
| 85 | 60 | | 40 | |
| 86 | 45 | | 35 | 20 |

The blends are placed in the feed hopper (with a nitrogen purge) of a Ktron twin screw feeder (Model Number T-35 with 190 6300 controller), and metered to a Werner and Pfleider ZSK 30 mm twin screw extruder. The extruder has an L/D of 30/1 with a vacuum port and a mild mixing screw. The temperature of the extruder barrel is heated from 170 C at the feed end of the extruder to 200 C at the discharge. The extruder is operated at 150 RPM, and the vacuum port is connected to house vacuum and permitted to fluctuate with process conditions. A single hole die (⅛-inch diameter) is used for discharge. The resulting strand is quenched in a 6 foot long water trough, dewatered with an air knife and cut into pellets with a Conair cutter (Model number 304). Operating conditions are listed below in Table 6.

TABLE 6

| Example | Feed Rate (pph) | Screw Torque (% max.) | Die Pressure (psig) | Melt Temperature (C.) | Vacuum (Inches Hg) |
|---|---|---|---|---|---|
| 81 | 34 | 58 | 800 | 190 | 13 |
| 82 | 32 | 60 | 800 | 210 | 13 |
| 83 | 31 | 50 | 750 | 205 | 12 |
| 84 | 32 | 35 | 600 | 185 | 12 |
| 85 | 33 | 60 | 800 | 210 | 13 |
| 86 | 32 | 35 | 600 | 185 | 13 |

Examples 87–92

The polymer-starch blends prepared above in Examples 81–86 are dried in a hopper dryer for 8 hours at 60 C to a −40 C dew point. The dried blends are placed in the hopper of a single screw volumetric feeder (K-tron Model No. 7) from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (C.) | Zone 2 (C.) | Zone 3 (C.) | Zone 4 (C.) | Zone 5 (C.) | Die (C.) | Melt (C.) |
|---|---|---|---|---|---|---|
| 165 | 175 | 195 | 195 | 195 | 200 | 200 |

The extruded polymer films are electrostatically pinned on a 12 inch diameter smooth quench drum maintained at a temperature of 26 C with cold water and collected on release paper using a standard tension roll. The quench drum speed is adjusted from 5 to 15 feet per minute to obtain film samples with a thickness of about 8 mils to about 1.5 mils.

TABLE 7

| Example | Blend Example |
|---|---|
| 87 | 81 |
| 88 | 82 |
| 89 | 83 |
| 90 | 84 |
| 91 | 85 |
| 92 | 86 |

The films of Examples 87–92 are tested as fast food sandwich packaging, including deadfold performance.

Examples 93–99

A polymer prepared as described in Example 7, above, except at a larger scale, is dried overnight in a large tray dryer at 60 C with hot dry air recirculation to a moisture content of less than 0.04 percent. Talc (from Luzenac, located in Englewood, Colo.) having a particle size of 3.8 microns, titanium dioxide (Kerr-McGee Chemical, LLC, Oklahoma City, Okla., grade Tronox® 470, having a particle size of 0.17 micron), and calcium carbonate (ECCA Calcium Products, Inc., of Sylacauga, AL, ECC Supercoat(T) grade with a 1 micron average particle size are dried in a large tray vacuum oven at 90 C and less than 1 mm Hg vacuum to a moisture content of less than 1 percent and stored in sealed containers until used.

Blends of the polymer and the inorganic fillers are made by manually tumbling the materials in plastic bags. The dry inorganic fillers are added to the warm polymer from the dryer, and the still warm mixture fed to the extruder. The compositions listed in Table 8, below, are prepared.

TABLE 8

| Example | Polymer (wt. %) | Talc (wt. %) | Titanium dioxide (wt. %) | Calcium carbonate (wt. %) |
|---|---|---|---|---|
| 93 | 85 | 2.5 | 5 | 7.5 |
| 94 | 70 | 5 | 5 | 20 |
| 95 | 70 | 5 | 10 | 15 |
| 96 | 30 | 10 | 15 | 45 |
| 97 | 95 | 5 | | |
| 98 | 95 | | 5 | |
| 99 | 70 | | | 30 |

The blends are placed in the feed hopper, (with a nitrogen purge), of a Ktron twin screw feeder, (Model Number T-35 with 190 6300 controller), and metered to a Werner and Pfleider ZSK 30 mm twin screw extruder. This extruder has an L/D of 30/1 with a vacuum port and a hard mixing screw. The temperature of the extruder barrel is heated from 220 C at the feed end of the extruder to 250 C at the discharge. The extruder is operated at 150 RPM, and the vacuum port is connected to house vacuum and permitted to fluctuate with process conditions. A single hole die, (1/8-inch diameter), is used for discharge. The resulting strand is quenched in a 6 foot long water trough, dewatered with an air knife and cut into pellets with a Conair cutter (Model number 304). Operating conditions are listed below in Table 9.

TABLE 9

| Example Number | Feed Rate (pph) | Screw Torque (% max.) | Die Pressure (psig) | Melt Temperature (C.) | Vacuum (Inches Hg) |
|---|---|---|---|---|---|
| 93 | 34 | 58 | 800 | 235 | 13 |
| 94 | 30 | 70 | 800 | 245 | 13 |
| 95 | 31 | 70 | 800 | 245 | 12 |
| 96 | 32 | 80 | 800 | 255 | 12 |
| 97 | 33 | 50 | 600 | 235 | 13 |
| 98 | 32 | 50 | 600 | 235 | 13 |
| 99 | 30 | 70 | 800 | 245 | 12 |

Examples 100–106

The polymer-inorganic filler blends prepared above in Examples 93–99 and a polymer prepared as described in example 7, above, except at a larger scale, are dried in a hopper dryer for 8 hours at 60 C to a −40 C dew point. The dried polymer and blends are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. The material of example 103 is a tumbled blend of 50 weight percent of the polymer prepared in Example 7 and 50 weight percent of the polymer prepared in Example 96. A dry nitrogen purge is maintained in the feed hopper and the feed throat of the extruder. The extruder is operated at a 150 RPM screw speed with a heater profile of

| Zone 1 (C.) | Zone 2 (C.) | Zone 3 (C.) | Zone 4 (C.) | Zone 5 (C.) | Die (C.) | Melt (C.) |
|---|---|---|---|---|---|---|
| 220 | 235 | 250 | 250 | 250 | 255 | 250 |

The extruded polymer films are electrostatically pinned on a 12 inch diameter smooth quench drum maintained at a temperature of 26 C with cold water and collected on release paper using a standard tension roll. The quench drum speed is adjusted from 5 to 15 feet per minute to obtain film samples with a thickness of about 8 mils to about 1.5 mils.

TABLE 10

| Example | Blend Example |
|---|---|
| 100 | 93 |
| 101 | 94 |
| 102 | 95 |
| 103 | 50 wt. % Ex. 96, 50 wt. % Ex. 7 |
| 104 | 97 |
| 105 | 98 |
| 106 | 99 |

The films of Examples 100 to 106 are tested as fast food sandwich packaging, including deadfold performance. The films are expected to resemble paper in feel and appearance.

Examples 107–112

The polymers prepared as described for the Examples noted below in Table 11, except at a larger scale, are dried overnight at 60 C in a dehumidified air dryer. The dried polymers are fed to a laboratory scale blown film line which consisted of a Killion 1.25 inch diameter extruder with a 15:1 gear reducer. The extruder heater zones are set around the temperature noted below in Table 11. The screw is a Maddock mixing type with an L/D of 24 to 1. The compression ratio for the mixing screw is 3.5:1. The screw speed is 25 to 30 RPM. A 1.21 inch diameter die with a 25 mil die gap is used. The air ring is a Killion single-lip, No. 2 type. Blowing conditions can be characterized by the blow up ratio (BUR), which is the ratio of the bubble diameter the die diameter and gives an indication of hoop (transverse direction stretch), or the draw-down ratio, (DDR), which is an indication of the axial (machine direction) stretch. The greater the amount of stretch, the greater the amount of orientation in the film.

TABLE 11

| Example Number | Polymer Example Number | Extruder Heater Zones (C.) | Film Thickness (mils) | BUR | DDR |
|---|---|---|---|---|---|
| 107 | 8 | 225 | 2.5 | 3.2 | 3.9 |
| 108 | 9 | 265 | 2.0 | 2.6 | 4.6 |
| 109 | 13 | 240 | 1.2 | 3.1 | 8.0 |
| 110 | 17 | 210 | 2.0 | 2.5 | 5.0 |
| 111 | 19 | 190 | 1.5 | 3.0 | 7.0 |
| 112 | 21 | 210 | 2.3 | 2.0 | 2.0 |

The tubular films are slit and tested as fast food sandwich packaging, including deadfold performance.

Examples 113–115

Bilayer films are produced on a 10 inch, two layer, Streamlined Coextrusion Die (SCD) blown film die manufactured by Brampton Engineering. Layer configuration of the die is as follows from outside to inside layers of the die, A/B. Two 3½ inch David Standard extruders feed the A and B layers. The process line further utilizes a Brampton Engineering rotating air ring for polymer cooling. Layer A contains a polymer prepared as described in example 3, except at a larger scale. Layer B contains a polymer prepared as described in example 15, except at a larger scale. Both polymers are dried in a dehumidified dryer at 60 C. The operation is tailored to provide the layer ratios for the films noted below in Table 12 as of the total film structure. The thickness of the film is about 2.25 mil (0.00225 inch). The processing conditions for the film are provided in Table 13, below.

TABLE 12

| Example | Layer A (wt. %) | Layer B (wt. %) |
|---|---|---|
| 113 | 25 | 75 |
| 114 | 50 | 50 |
| 115 | 75 | 25 |

TABLE 13

|  | Extruder A | Extruder B |
|---|---|---|
| Zone 1 | 195 C. | 160 C. |
| Zone 2 | 220 C. | 170 C. |
| Zone 3 | 230 C. | 185 C. |
| Zone 4 | 230 C. | 185 C. |
| Zone 5 | 235 C. | 190 C. |
| Screen Changer | 230 C. | 185 C. |
| Adapter 1 | 230 C. | 185 C. |
| Adapter 2 | 230 C. | 185 C. |
| Adapter 4 | 230 C. | 185 C. |
| Die 1 | 230 C. | 230 C. |
| Die 2 | 230 C. | 230 C. |
| Die 3 | 230 C. | 230 C. |
| Line Speed | 122 feet per minute | |
| Notes | 3 | 15 |

The multilayer films prepared above are converted into bags using an inline bag machine manufactured by Battenfeld Gloucester Engineering Co., Inc. downstream of the extrusion line nips. The films are slit and tested as fast food sandwich wraps.

Examples 116–118

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains the plasticized, starch filled polymer prepared as described in example 84. Layer B contains a polymer prepared as described in example 12, except at a larger scale. Both polymers are dried in a dehumidified dryer at 60 C. The operation is tailored to provide the layer ratios for the films noted below in Table 14 as of the total film structure. The thickness of the film is about 2.25 mil (0.00225 inch). The processing conditions for the film are provided in Table 15, below.

TABLE 14

| Example | Layer A (wt. %) | Layer B (wt. %) |
|---|---|---|
| 116 | 25 | 75 |
| 117 | 50 | 50 |
| 118 | 75 | 25 |

TABLE 15

|  | Extruder A | Extruder B |
|---|---|---|
| Zone 1 | 170 C. | 220 C. |
| Zone 2 | 190 C. | 230 C. |
| Zone 3 | 200 C. | 240 C. |
| Zone 4 | 200 C. | 240 C. |
| Zone 5 | 205 C. | 245 C. |
| Screen Changer | 200 C. | 240 C. |
| Adapter 1 | 200 C. | 240 C. |
| Adapter 2 | 200 C. | 240 C. |
| Adapter 4 | 200 C. | 240 C. |
| Die 1 | 240 C. | 240 C. |
| Die 2 | 240 C. | 240 C. |
| Die 3 | 240 C. | 240 C. |
| Line Speed | 122 feet per minute | |
| Notes | 84 | 12 |

The multilayer films prepared above are converted into bags using an inline bag machine manufactured by Battenfeld Gloucester Engineering Co., Inc. downstream of the extrusion line nips. The films are slit and tested as fast food sandwich wraps.

Examples 119–121

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a polymer blend prepared as described in example 94, except at a larger scale. Layer B contains Eastar® Bio, from the Eastman Chemical Company and as described above. Both polymers are dried in a dehumidified dryer at 60 C. The operation is tailored to provide the layer ratios for the films noted below in Table 16 as of the total film structure. The thickness of the film is about 2.25 mil (0.00225 inch). The processing conditions for the film are provided in Table 17, below.

TABLE 16

| Example | Layer A (wt. %) | Layer B (wt. %) |
|---|---|---|
| 119 | 25 | 75 |
| 120 | 50 | 50 |
| 121 | 75 | 25 |

TABLE 17

|  | Extruder A | Extruder B |
|---|---|---|
| Zone 1 | 230 C. | 100 C. |
| Zone 2 | 250 C. | 115 C. |
| Zone 3 | 260 C. | 130 C. |
| Zone 4 | 260 C. | 130 C. |
| Zone 5 | 265 C. | 135 C. |

TABLE 17-continued

|  | Extruder A | Extruder B |
| --- | --- | --- |
| Screen Changer | 260 C. | 130 C. |
| Adapter 1 | 260 C. | 130 C. |
| Adapter 2 | 260 C. | 130 C. |
| Adapter 4 | 260 C. | 130 C. |
| Die 1 | 260 C. | 260 C. |
| Die 2 | 260 C. | 260 C. |
| Die 3 | 260 C. | 260 C. |
| Line Speed | 122 feet per minute | |
| Notes | 94 | Eastar ® Bio |

The multilayer films prepared above are converted into bags using an inline bag machine manufactured by Battenfeld Gloucester Engineering Co., Inc. downstream of the extrusion line nips. The films are slit and tested as fast food sandwich wraps.

Examples 122–146 and Comparative Examples CE 6–CE 8

Polyester resins prepared as described in the Examples and Comparative Example listed below in Table 18, except at a larger scale, are dried in a desiccant air dryer with a dew point of −40 C overnight at a temperature of 60 C. The polyester resins are extrusion coated onto paperboard stock by feeding the dried pellets into a 2.5 inch commercial extruder having a barrel length to diameter ratio of 28:1. The five zones of the extruder are maintained at a temperature in the range noted below within Table 18. A single flight screw having eight compression flights, four metering flights, a two flight mixing section and six metering flights is used in the extruder. The screw speed is maintained at 180 revolutions per minute, (RPM). The molten polyester resins are passed through three 24×24 mesh screens. The polymers are passed through a center fed die with 0.75 inch lands having a die opening of 36 inches by 0.02 inches. The extrusion feed rate is held constant at 460 pounds per hour. The resulting extrudates are passed through a 5 inch air gap into the nip formed by a rubber-covered pressure roll and a chill roll. At the same time the paperboard stock noted below in Table 18, that is 32 inches wide, is fed into the nip with the roll in contact with the film. A nip pressure of 100 pounds per linear inch is applied. A 24 inch diameter mirror finished chill roll is maintained at a temperature of 19 C during the extrusion trials. The coated paperboard is taken off the chill roll at a point 180 degrees from the nip formed by the pressure roll and the chill roll. The chill roll is operated at linear speeds of 300 feet per minute. A polyester resin thickness of 1.25 mils is obtained. The polyester resin thickness can be varied using operational modifications.

TABLE 18

| Example | Polymer Example | Extruder Temperature (C.) | Paper/Paperboard Stock |
| --- | --- | --- | --- |
| 122 | 1 | 240 | 35 pound basis weight natural kraft paper |
| 123 | 6 | 250 | Parchment |
| CE 6 | CE 3 | 140 | Parchment |
| 124 | 8 | 225 | Parchment |
| 125 | 10 | 255 | 25 pound basis weight bleached kraft paper |
| 126 | 13 | 240 | 15 pound basis weight kraft paper |
| 127 | 17 | 210 | 15 pound basis weight kraft paper |
| 128 | 23 | 240 | 18 pound basis weight natural paper |
| 129 | 83 | 200 | 18 pound basis weight bleached paper |
| 130 | 93 | 250 | 25 pound basis weight bleached kraft paper |
| 131 | 3 | 235 | Trilayered cup paperboard (210 g/m2 weight) |
| 132 | 7 | 255 | Trilayered cup paperboard (210 g/m2 weight) |
| CE 7 | CE 3 | 140 | Trilayered cup paperboard (210 g/m2 weight) |
| 133 | 8 | 225 | Trilayered cup paperboard (210 g/m2 weight) |
| 134 | 11 | 230 | Trilayered cup paperboard (210 g/m2 weight) |
| 135 | 15 | 190 | Trilayered cup paperboard (210 g/m2 weight) |
| 136 | 19 | 190 | Trilayered cup paperboard (210 g/m2 weight) |
| 137 | 84 | 200 | Trilayered cup paperboard (210 g/m2 weight) |
| 138 | 94 | 250 | Trilayered cup paperboard (210 g/m2 weight) |
| 139 | 5 | 240 | 18 point paperboard |
| CE 8 | CE 3 | 140 | 18 point paperboard |
| 140 | 8 | 225 | 18 point paperboard |
| 141 | 9 | 260 | 12 point paperboard |
| 142 | 12 | 240 | 12 point paperboard |
| 143 | 16 | 170 | 12 point paperboard |
| 144 | 21 | 235 | 12 point paperboard |
| 145 | 86 | 200 | 18 point paperboard |
| 146 | 95 | 250 | 12 point paperboard |

Product yields are measured and compared: Comparative Example CE against Example 124; comparative Example CE 7 against Example 133; comparative Example CE 8 against Example 140. The polymers are tested as fast food sandwich wrap packaging, and are formed and heat sealed by conventional processes into the shape of envelopes and bags.

The materials formed in Examples 131–138 are processed into the shape of cups, glasses, bowls, trays, liquid containers and cartons. The materials formed in examples 139–146 are formed by conventional processes into the shape of trays, boxes and lidded containers.

Example 147

A polymer prepared as described in Example 3, except at a larger scale, and poly(lactide) (Cargill Dow Company) are dried in a hopper dryer overnight at 60 C to a −40 C dew point. On a trilayered paperboard that weighed 210 grams/meter2 with a forward speed of 150 meters/minute is coextruded the Example 3 polymer and poly(lactide) in a weight ratio of 1:3. The melt temperature of the Example 3 polymer is 240 C and the melt temperature of the poly(lactide) is 240 C. A coated paperboard is formed, wherein the total weight of the polymeric coating is 19.4 grams/meter$^2$ in a weight ratio of 75 weight percent of the poly(lactide) which forms the outer layer, and 25 weight percent of the polymer from Example 3, which forms the inner layer adhered to the paperboard.

The paperboard prepared above is formed by conventional processes into the shape of cups, glasses, bowls, trays, liquid containers and cartons.

Examples 148–153

Calendered paper laminates are prepared by making an assembly of a film produced as described above in Examples noted below in Table 19, coated onto release paper, in contact with a similar sized sheet of paper to be coated, forming an assembly, and then pressing the assembly through the nip between a heated polished metal top roll and an unheated resilient (silk) roll at a surface speed of 5 yards/minute, at a temperature of 200 F and under a pressure of 10 tons.

Details of the various paper substrates laminated with the polymers are shown in Table 19, below.

TABLE 19

| Example | Film Example | Paper Substrate | Paper Basis Wt./Thickness (oz/yd.sup.2/mils) |
| --- | --- | --- | --- |
| 148 | 26 | Towel, (Scott, Viva) | 1.2/6 |
| 149 | 36 | Towel, (G. P., Sparkle) | 1.3/10 |
| 150 | 42 | Toilet Tissue, (Charmin) | 0.9/6 |
| 151 | 59 | Wrapping Tissue, (white) | 0.5/2 |
| 152 | 90 | Newsprint | 1.5/4 |
| 153 | 102 | Kraft, (recycled) | 2.8/6 |

Pieces of the above laminates (8-inch by 8-inch squares) are placed in a rotary composter with about 0.5 cubic yards squared of mixed municipal solid waste, from which glass, cans, and much of the light plastic and paper is removed, and sewage sludge, in the ratio of about 2:1. The composter is rotated once a week and the temperature and moisture content is monitored.

Example 154

A laminated stock is produced from a combination of a paperboard and a corona-treated polyester film using a combination of two water-based acrylic adhesive formulations. The paperboard base stock is a bleached white paperboard of the type typically referred to as a solid bleached sulfate (SBS) paperboard, which is well known as a base stock for food packaging materials. The paperboard used is uncoated milk carton stock with a thickness of 0.0235 inch and weighing 282 pounds per 3,000 square feet. A film is produced as described in Example 33, above, and is corona discharge treated by conventional processes on one side to enhance adhesive bonding. The lamination process is run on a conventional wet-bond laminating machine with adhesive stations for applying adhesive to both the paperboard and to the film. Adhesive is applied to the paperboard with a 110 line gravure roll applicator delivering about 3 pounds of wet adhesive per 1,000 square feet of paperboard. The adhesive applied to the paperboard consists of 200 pounds of Rhoplex® N-1031 acrylic latex from the Rohm & Haas Company and 1.5 ounces of Foamaster NXZ defoamer (predispersed in an equal volume of water) from the Diamond Shamrock Chemical Company. Adhesive is applied to the corona-treated side of the polyester film, the adhesive consisting of 375 pounds of Rhoplex® N-1031 acrylic latex from the Rohm & Haas Company, 11.5 pounds of Cymel® 325 melamine-formaldehyde crosslinking agent, 11.5 pounds of isopropyl alcohol, 23 pounds of water, and 3 ounces of Foamaster NXZ defoamer (predispersed in an equal volume of water) from the Diamond Shamrock Chemicals Company.

The laminating process is run with the paperboard and the film running simultaneously through the respective adhesive application stations, and then the paperboard and the film are both directed into a laminating nip where the two adhesive-coated surfaces are joined with the adhesive still moist on both surfaces. The laminating machine is run at a rate of 300 to 350 feet per minute. The laminated stock is run the laminating nip into a hot air oven with an air temperature of 400 degrees F. Residence time for the laminated stock in the oven is about 5 seconds. The laminated stock is then run over a chill roll and rewound into a finished roll.

The laminated stock prepared above is formed by conventional processes into the shape of cups, glasses, bowls, trays, liquid containers and cartons.

Examples 155–175

These examples demonstrate the lamination of films containing the copolyetheresters onto preformed substrates. The operation is conducted in a Lab Form Inc. forming machine with a 10 by 10-inch platen. The preformed substrate is shuttled onto the platen. The film is unrolled, preheated for the time noted below in Table 20 by "Black Box Heating" with infrared type heaters. The preheated film is then positioned over the preformed substrate and pulled down onto the preformed substrate. Examples 155–161 utilize vacuum lamination by drawing a vacuum through the preformed substrate, which, in turn, draws the film onto the contours of the preformed substrate. Examples 162–168 utilize plug assisted vacuum lamination whereby, in addition to the above described vacuum, a plug helps to push the preheated film from the side opposite the preformed substrate to help reduce film thinning into deep draw preformed substrates. Examples 169–175 utilize pressure lamination by applying an air pressure to the preheated film side opposite to the preformed substrate, which forces the film onto the contours of the preformed substrate. Such a lamination process typically takes from 5 to 100 seconds, after which excess film is trimmed off the laminated substrate and the laminated substrate is ejected and cooled.

The preformed substrates used include: a 9-inch molded "pulp plate", prepared by conventional processes; a formed frozen dinner paperboard "tray", prepared by conventional processes; a formed paperboard coffee "cup", 3.5 inches tall, prepared by conventional processes; a formed paperboard "bowl", 3 inches tall and 4 inches in diameter, prepared by conventional processes; a 9 inch "foam plate", obtained by carefully stripping off the barrier film from commercially available plates obtained from the EarthShell Company, (Stock Number PL9V00001); a 12 ounce "foam bowl", obtained by carefully stripping off the barrier film from commercially available bowls obtained from the EarthShell Company, (Stock Number BL12V00001); and hinged-lid salad and sandwich "foam containers" with a double-tab closure mechanism, obtained by carefully stripping off the barrier film from commercially available containers obtained from the EarthShell Company, (Stock Number CLS00001).

TABLE 20

| Example | Film Example | Film Preheat Time (seconds) | Preformed Substrate |
|---|---|---|---|
| 155 | 26 | 50 | pulp plate |
| 156 | 30 | 55 | tray |
| 157 | 33 | 60 | cup |
| 158 | 37 | 50 | bowl |
| 159 | 45 | 40 | foam plate |
| 160 | 89 | 35 | foam bowl |
| 161 | 100 | 60 | foam containers |
| 162 | 28 | 40 | cup |
| 163 | 31 | 55 | bowl |
| 164 | 34 | 55 | foam bowl |
| 165 | 41 | 30 | foam containers |
| 166 | 64 | 60 | cup |
| 167 | 90 | 30 | bowl |
| 168 | 101 | 60 | pulp plate |
| 169 | 29 | 45 | pulp plate |
| 170 | 32 | 30 | tray |
| 171 | 36 | 50 | cup |
| 172 | 43 | 20 | bowl |
| 173 | 67 | 60 | foam plate |
| 174 | 92 | 40 | foam bowl |
| 175 | 101 | 60 | foam containers |

What is claimed is:

1. An aromatic copolyetherester comprising an acid component, a glycol component, from 0 to about 5.0 mole percent of a polyfunctional branching agent selected from polyfunctional acid, alcohol and mixtures thereof, and optionally an effective amount of a color reducing agent wherein the acid component consists essentially of
   a. 99.0 to 1.0 mole percent of an aromatic dicarboxylic acid component based on 100 mole percent total acid component, and
   b. 1.0 to 70 mole percent of a hydroxyalkanoic acid component selected from lactic acid, glycolic acid, the lower alkyl esters thereof having 2 to 10 carbon atoms, glycolate esters of lactic acid and glycolic acid, cyclic dimers of lactic acid and glycolic acid, and oligomers and polymers of lactic acid and glycolic acid, and mixtures thereof, based on 100 mole percent total acid component;

and wherein the glycol component comprises:
   a. about 98.9 to about 1.0 mole percent of a single first glycol selected from ethylene glycol, 1,3-propanediol and 1,4-butanediol, based on 100 mole percent total glycol component,
   b. 0.1 to 30.0 mole percent of a poly(alkylene ether) glycol, based on 100 mole percent total glycol component,
   c. 0 to about 5.0 mole percent of one or more of an other glycol based on 100 mole percent total glycol component, and
   d. 0 to about 5.0 mole percent of a polyfunctional branching agent.

2. The aromatic copolyetherester of claim 1, having an inherent viscosity of at least 0.15, as measured on a 0.5 percent solution of the copolyester in a 50:50 solution of trifluoroacetic acid:dichloromethane solvent system at room temperature.

3. The aromatic copolyetherester of claim 2, wherein the inherent viscosity is at least 0.35 dL/g.

4. The aromatic copolyetherester of claim 1, comprising from 99 to 30 mole percent of the aromatic dicarboxylic acid component.

5. The aromatic copolyetherester of claim 1, comprising from 99 to 50 mole percent of the aromatic dicarboxylic acid component.

6. The aromatic copolyetherester of claim 1, wherein the poly(alkylene ether) glycol has a molecular weight in the range of about 500 to about 4000.

7. The aromatic copolyetherester of claim 1, comprising from 1 to 70 mole percent of the hydroxyalkanoic acid component.

8. The aromatic copolyetherester of claim 1, comprising from 1 to 50 mole percent of the hydroxyalkanoic acid component.

9. The aromatic copolyetherester of claim 1, wherein the poly(alkylene ether) glycol component is selected from: (ethylene glycol), poly(1,3-propylene glycol), poly(1,4-butylene glycol), (polytetrahydrofuran), poly(pentmethylene glycol), poly(hexamethylene glycol), poly(hepthamethylene glycol), poly(ethylene glycol)-block-poly(propylene glycol)-block-poly(ethylene glycol), 4,4'-isopropylidenediphenol ethoxylate (Bisphenol A ethoxylate), 4,4'-(1-phenylethylidene)bisphenol ethoxylate (Bisphenol AP ethoxylate), 4,4'-ethylidenebisphenol ethoxylate (Bisphenol E ethoxylate), bis(4-hydroxyphenyl)methane ethoxylate (Bisphenol F ethoxylate), 4,4'-(1,3-phenylenediisopropylidene)bisphenol ethoxylate (Bisphenol M ethoxylate), 4,4'-(1,4-phenylenediisopropylidene)bisphenol ethoxylate (Bisphenol P ethoxylate), 4,4'sulfonyldiphenol ethoxylate (Bisphenol S ethoxylate), 4,4'-clclohexylidenebisphenol ethoxylate (Bisphenol Z ethoxylate), and mixtures thereof.

10. The aromatic copolyetherester of claim 1, comprising from 0.1 to 20 mole percent of the poly(alkylene ether) glycol.

11. The aromatic copolyetherester of claim 1, comprising from 0.1 to 15 mole percent of the poly(alkylene ether) glycol.

12. The aromatic copolyetherester of claim 1, wherein the glycol component comprises from 0 to 1.0 mole percent of the polyfunctional branching agent.

13. The aromatic copolyetherester of claim 1, wherein the hydroxyalkanoic acid component is selected from: lactic acid, DL-lactic acid, L-lactic acid, glycolic acid, methyl lactate, methyl (R)-(+)-lactate, methyl (S)-(−)-lactate, methyl glycolate, ethyl lactate, ethyl (R)-(+)-lactate, ethyl (S)-(−)-lactate, ethyl glycolate, (2-hydroxyethyl)lactate, (2-hydroxyethyl) (R)-(+)-lactate, (2-hydroxyethyl) (S)-(−)-lactate, (3-hydroxypropyl)lactate, (3-hydroxypropyl) (R)-(+)-lactate, (3-hydroxypropyl) (S)-(−)-lactate, (4-hydroxybutyl) lactate, (2-hydroxyethyl)glycolate, (3-hydroxypropyl)glycolate, (4-hydroxybutyl)glycolate, lactide, 3,6-dimethyl-1,4-dioxane-2,5-dione, L-lactide, (3 S-cis)-3,6-dimethyl-1,4-dioxane-2,5-dione, glycolide, poly(lactide), poly(DL-lactide), poly(glycolide) and mixtures derived therefrom.

14. The aromatic copolyetherester of claim 1, wherein the other glycol is selected from ethylene glycol, 1,3-propanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, isosorbide, di(ethylene glycol), tri(ethylene glycol), poly(alkylene ether)glycols in the molecular weight range of about 500 to about 4000, and mixtures derived therefrom.

15. The aromatic copolyetherester of claim 1 wherein the aromatic dicarboxylic acid component is selected from: terephthalic acid, dimethyl terephthalate, bis(2-hydroxyethyl)terephthalate, bis(3-hydroxypropyl)terephthalate, bis(4-hydroxybutyl)terephthalate, isophthalic acid, dimethyl isophthalate, bis(2-hydroxyethyl)isophthalate, bis(3-hydroxypropyl)isophthalate, bis(4-hydroxybutyl)isophthalate; 2,6-naphthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3, 4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis (benzoate), and mixtures derived therefrom.

16. The aromatic copolyetherester of claim 1, wherein the branching agent is selected from: 1,2,4-benzenetricarboxylic acid; trimethyl-1,2,4-benzenetricarboxylate; tris(2-hydroxyethyl)-1,2,4-benzenetricarboxylate; tris(3-hydroxypropyl)-1,2,4-benzenetricarboxylate tris(4-hydroxybutyl)-1 ,2,4-benzenetricarboxylate; 1,2,4-benzenetricarboxylic anhydride; 1,3,5-benzenetricarboxylic acid, 1,2,4,5-benzenetetracarboxylic acid; 1,2,4,5-benzenetetracarboxylic dianhydride; 3,3',4,4'-benzophenonetetratarboxylic dianhydride; 1,4,5,8-Naphthalenetetracarboxylic dianhydride; citric acid; tetrahydrofuran-2,3,4,5-tetracarboxylic acid; 1,3,5-cyclohexanetricarboxylic acid; pentaerythritol; glycerol; 2-(hydroxymethyl)-1,3-propanediol; 2,2-bis(hydroxymethyl)propionic acid; and mixtures derived therefrom.

17. The aromatic copolyetherester of claim 1, having an inherent viscosity of at least about 0.35 dL/g.

18. The aromatic copolyetherester of claim 1, having an inherent viscosity of at least about 0.65 dL/g.

19. The aromatic copolyetherester of claim 1, further comprising a filler.

20. The aromatic copolyetherester of claim 19, wherein the filler comprises a first set of particles having a first average particle size, and a second set of particles having a second average particle size, and wherein second average particle size is at least about 2 times that of the first avenge particle size.

21. The aromatic copolyetherester of claim 19, wherein the filler consists essentially of particles having an average diameter less than about 40 microns.

22. The aromatic copolyetherester of claim 19, wherein the filler consists essentially of particles having an average diameter less than about 20 microns.

23. A blend comprising an aromatic copolyetherester of claim 1 and at least one other polymer.

24. The blend of claim 23 wherein the other polymer is biodegradable.

25. The blend of claim 24 wherein the biodegradable polymer is selected from poly(hydroxy alkanoates), polycarbonates, poly(caprolactone), aliphatic polyesters, aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, and mixtures derived therefrom.

26. The blend of claim 24 wherein the other polymer is nonbiodegradable.

27. The blend of claim 24 wherein the other polymer is a natural polymer.

28. The blend of claim 27 wherein the natural polymer is a starch.

29. A shaped article formed from an aromatic copolyetherester of claim 1.

30. A shaped article of claim 29 selected from films, sheets, fibers, melt blown containers, molded parts, and foamed parts.

31. A film comprising the aromatic copolyetherester of claim 1.

32. The film of claim 31, having a thickness from about 0.025 mm to about 0.15 mm.

33. An oriented film according to claim 31.

34. The film of claim 33 wherein the film is biaxially oriented.

35. The film of claim 33 wherein the film is uniaxially oriented.

36. A multilayer film comprising a layer comprising an aromatic copolyetherester of claim 1.

37. An article comprising a substrate and a coating on the substrate, the coating comprising an aromatic copolyetherester of claim 1.

38. The article of claim 37 wherein the coating has a thickness from about 0.2 to about 15 mils.

39. The article of claim 37 wherein the coating has a thickness from about 0.5 to about 2 mils.

40. The article of claim 37 wherein the substrate is selected from textiles, nonwovens, foil, paper, paperboard, and metals.

41. An article comprising a substrate having laminated thereon an aromatic copolyetherester of claim 1.

42. The article of claim 41 wherein the substrate is selected from paper, paperboard, cardboard, fiberboard, cellulose, starch, plastic, polystyrene foam, glass, metals, polymeric foams, organic foams, inorganic foams, organic-inorganic foams, and polymeric films.

43. A package comprising an article of claim 41.

44. A wrap comprising an aromatic copolyetherester of claim 1.

45. A sheet comprising an aromatic copolyetherester of claim 1.

46. The sheet of claim 45, having a thickness of at least about 0.50 mm.

47. A fiber comprising an aromatic copolyetherester of claim 1.

48. The fiber of claim 47 having a denier from about 0.1 to about 100.

49. The fiber of claim 47 having a denier from about 0.5 to 20.

50. A fiber comprising an aromatic copolyetherester of claim 1 and at least one other polymer.

51. The fiber of claim 47 wherein the fiber comprises a blend of the aromatic copolyetherester and one or more natural fibers.

52. The fiber of claim 47 wherein the fiber is a heterogeneous fiber.

53. A toned article comprising an aromatic copolyetherester of claim 12.

54. A shaped article formed from an aromatic copolyetherester of claim 12.

55. A shaped article of claim 54 selected from films, sheets, fiber, melt blown containers, molded parts, and foamed parts.

56. A film comprising an aromatic copolyetherester of claim 19.

57. The film of claim 56, having a thickness from about 0.025 mm to about 0.15 mm.

58. An oriented film according to claim 56.

59. A multilayer film comprising a layer comprising an aromatic copolyetherester of claim 19.

60. An article comprising a substrate and a coating on the substrate, the coating comprising an aromatic copolyetherester of claim 19.

61. An article comprising a substrate having laminated thereon an aromatic copolyetherester of claim 19.

62. A wrap comprising an aromatic copolyetherester of claim 19.

63. A sheet comprising an aromatic copolyetherester of claim 19.

64. A foamed article comprising a blend of claim 23.

65. A shaped article formed from a blend of claim 23.

66. A shaped article of claim 65 selected from films, sheets, fiber, melt blown containers, molded parts, and foamed parts.

67. A film comprising a blend of claim 23.

68. The film of claim 67, having a thickness from about 0.025 mm to about 0.15 mm.

69. An oriented film according to claim 67.

70. A multilayer film comprising a layer comprising a blend of claim 23.

71. An article comprising a substrate and a coating on the substrate, the coating comprising a blend of claim 16.

72. An article comprising a substrate having laminated thereon a blend of claim 23.

73. A wrap comprising a blend of claim 23.

74. A sheet comprising a blend of claim 23.

75. A process for producing a package, comprising forming a substrate into a desired package form; and laminating or coating the substrate with an aromatic copolyetherester to fain the package;
wherein the aromatic copolyetherester consists essentially of an acid component, a glycol component, from 0 to about 5.0 mole percent of a polyfunctional branching agent selected from polyfunctional acid, alcohol and mixtures thereof, and optionally an effective amount of a color reducing agent, and wherein the acid component consists essentially of
  a. 99.0 to 1.0 mole percent of an aromatic dicarboxylic acid component based on 100 mole percent total acid component, and
  b. 1.0 to 99.0 mole percent of a hydroxyalkanoic acid component selected from lactic acid, glycolic acid, the lower alkyl esters thereof having 2 to 10 carbon atoms, glycolate esters of lactic add and glycolic acid, cyclic dimers of lactic acid and glycolic acid, and oligomers and polymers of lactic acid and glycolic acid, and mixtures thereof, based on 100 mole percent total add component,
and wherein the glycol component comprises:
  a. about 98.9 to about 1.0 mole percent of a single first glycol selected from ethylene glycol, 1,3-propanediol and 1,4-butanediol,
  b. 0.1 to 30.0 mole percent of a poly(alkylene ether) glycol,
  c. 0 to about 5.0 mole percent of one or more of an other glycol based on 100 mole percent total glycol component, and
  e. 0 to about 5.0 mole percent of a polyfunctional branching agent, and
  f. 0 to about 5.0 mole percent of one or more of an other glycol based on 100 mole percent total glycol component.

76. The process of claim 75 wherein the substrate comprises a material selected from paper, paperboard, inorganic foams, organic foams, and inorganic-organic foams.

77. The process of claim 75 wherein the package form is selected from wrappers, stretch wrap films, bags, cups, trays, cartons, boxes, bottles, crates, packaging films, blister pack wrappers, skin packaging, and hinged containers.

78. The process of claim 75 wherein the aromatic copolyetherester comprises from 99 to 30 mole percent of the aromatic dicarboxylic acid component.

79. The process of claim 75 wherein the aromatic copolyetherester comprises 99 to 50 mole percent of the aromatic dicarboxylic acid component.

80. The process of claim 75 wherein the poly(alkylene ether) glycol has a molecular weight in the range of about 500 to about 4000.

81. The process of claim 75 wherein the aromatic copolyetherester comprises from 1 to 70 mole percent of the hydroxyalkanoic acid component.

82. The process of claim 75 wherein the aromatic copolyetherester comprises from 1 to 50 mole percent of the hydroxyalkanoic acid component.

83. The process of claim 75 wherein the poly(alkylene ether) glycol component is selected from: (ethylene glycol), poly(1,3-propylene glycol), poly(1,4-butylene glycol), (polytetrahydrofuran), poly(pentmethylene glycol), poly(hexamethylene glycol), poly(hepthamethylene glycol), poly(ethylene glycol)-block-poly(propylene glycol)-block-poly(ethylene glycol), 4,4'-isopropylidenediphenol ethoxylate (Bisphenol A ethoxylate) 4,4'-(1-phenylethylidene) bisphenol ethoxylate (Bisphenol AP ethoxylate) 4,4'-ethylidenebisphenol ethoxylate (Bisphenol E ethoxylate), bis(4-hydroxyphenyl)methane ethoxylate (Bisphenol F ethoxylate), 4,4'-(1,3-phenylenediisopropylidene)bisphenol ethoxylate (Bisphenol M ethoxylate), 4,4'-(1,4 -phenylenediisopropylidene)bisphenol ethoxylate (Bisphenol P ethoxylate), 4,4'sulfonyldiphenol ethoxylate (Bisphenol S ethoxylate), 4,4'-cyclohexylidenebisphenol ethoxylate (Bisphenol Z ethoxylate), and mixtures thereof.

84. The process of claim 75 wherein the aromatic copolyetherester comprises from 0.1 to 20 mole percent of the poly(alkylene ether) glycol.

85. The process of claim 75 wherein the aromatic copolyetherester comprises from 0.1 to 15 mole percent of the poly(alkylene ether) glycol.

86. The process of claim 75 wherein the glycol component comprises from 0 to 1.0 mole percent of the polyfunctional branching agent.

87. The process of claim 75 wherein the hydroxyalkanoic acid component is selected from: lactic acid, DL-lactic acid, L-lactic acid, glycolic acid, methyl lactate, methyl (R)-(+)-lactate, methyl (S)-(−)-lactate, methyl glycolate, ethyl lactate, ethyl (R)-(+)-lactate, ethyl (S)-(−)-lactate, ethyl glycolate, (2-hydroxyethyl)lactate, (2-hydroxyethyl) (R)-(+)-lactate, (2-hydroxyethyl) (S)-(−)-lactate, (3-hydroxypropyl) lactate, (3-hydroxypropyl) (R)-(+)-lactate, (3-hydroxypropyl) (S)-(−)-lactate, (4-hydroxybutyl)lactate, (2-hydroxyethyl)glycolate, (3-hydroxypropyl)glycolate, (4-hydroxybutyl)glycolate, lactide, 3,6-dimethyl-1,4-dioxane-2,5-dione, L-lactide, (3 S-cis)-3,6-dimethyl-1,4-dioxane-2,5-dione, glycolide, poly(lactide), poly(DL-lactide), poly(glycolide) and mixtures derived therefrom.

88. The process of claim 75 wherein wherein the other glycol is selected from ethylene glycol, 1,3-propanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, isosorbide, di(ethylene glycol), tri(ethylene glycol), poly(alkylene ether)glycols in the molecular weight range of about 500 to about 4000, and mixtures derived therefrom.

89. The process of claim 75 wherein the aromatic dicarboxylic acid component is selected from: terephthalic acid, dimethyl terephthalate, bis(2-hydroxyethyl)terephthalate, bis(3-hydroxypropyl)terephthalate, bis(4-hydroxybutyl) terephthalate, isophthalic acid, dimethyl isophthalate, bis(2-hydroxyethyl)isophthalate, bis(3-hydroxypropyl)isophthalate, bis(4'-hydroxybutyl)isophthalate; 2,6-naphthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and mixtures derived therefrom.

90. The process of claim 75, wherein the branching agent is selected from: 1,2,4-benzenetricarboxylic acid; trimethyl-1,2,4-benzenetricarboxylate; tris(2-hydroxyethyl)- 1,2,4-benzenetricarboxylate; tris(3-hydroxypropyl)-1,2,4-benzenetricarboxylate; tris(4-hydroxybutyl)-1,2,4-benzenetricarboxylate; 1,2,4-benzenetricarboxylic anhydride; 1,3,5-benzenetricarboxylic acid; 1,2,4,5-benzenetetracarboxylic acid; 1,2,4,5-benzenetetracarboxylic dianhydride; 3,3',4,4'-benzophenonetetracarboxylic dianhydride; 1,4,5,8-Naphthalenetetracarboxylic dianhydride; citric acid; tetrahydrofuran-2,3,4,5-tetracarboxylic acid; 1,3,5-cyclohexanetricarboxylic acid; pentaerythritol; glycerol; 2-(hydroxymethyl)-1,3-propanediol; 2,2-bis(hydroxymethyl)propionic acid; and mixtures derived therefrom.

91. A process for producing an aromatic copolyetherester, comprising allowing a reaction mixture comprising an aromatic dicarboxylic acid component, a hydroxyalkanoic acid component, a single first glycol, a poly(alkylene ether) glycol, optionally an other glycol, optionally an effective amount of a color reducing agent, and optionally a polyfunctional branching agent to polymerize to form an aromatic copolyetherester comprising an acid component and a glycol component, wherein the acid component consists essentially of
 a. 99.0 to 1.0 mole percent of an aromatic dicarboxylic acid component based on 100 mole percent total acid component, and
 b. 1.0 to 70 mole percent of a hydroxyalkanoic acid component selected from lactic acid, glycolic acid, the lower alkyl esters thereof having 2 to 10 carbon atoms, glycolate esters of lactic acid and glycolic acid, cyclic dimers of lactic acid and glycolic acid, and oligomers and polymers of lactic acid and glycolic acid, and mixtures thereof, based on 100 mole percent total acid component,
and wherein the glycol component comprises:
 a. about 98.9 to about 1.0 mole percent of a single first glycol selected from ethylene glycol, 1,3-propanediol and 1,4-butanediol,
 b. 0.1 to 30.0 mole percent of a poly(alkylene ether) glycol,
 c. 0 to about 5.0 mole percent of one or more of an other glycol based on 100 mole percent total glycol component, and
 d. 0 to about 5.0 mole percent of a polyfunctional branching agent.

92. The process of claim 91 wherein the aromatic copolyetherester comprises from 99 to 30 mole percent of the aromatic dicarboxylic acid component.

93. The process of claim 91 wherein the aromatic copolyetherester comprises 99 to 50 mole percent of the aromatic dicarboxylic acid component.

94. The process of claim 91 wherein the poly(alkylene ether) glycol has a molecular weight in the range of about 500 to about 4000.

95. The process of claim 91 wherein the aromatic copolyetherester comprises from 1 to 70 mole percent of the hydroxyalkanoic acid component.

96. The process of claim 91 wherein the aromatic copolyetherester comprises from 1 to 50 mole percent of the hydroxyalkanoic acid component.

97. The process of claim 91 wherein the poly(alkylene ether) glycol component is selected from: (ethylene glycol), poly(1,3-propylene glycol), poly(1,4-butylene glycol), (polytetrahydrofuran), poly(pentmethylene glycol), poly (hexamethylene glycol), poly(hepthamethylene glycol), poly(ethylene glycol)-block-poly(propylene glycol)-block-poly(ethylene glycol), 4,4'-isopropylidenediphenol ethoxylate (Bisphenol A ethoxylate), 4,4'-(1-phenylethylidene) bisphenol ethoxylate (Bisphenol AP ethoxylate), 4,4'-ethylidenebisphenol ethoxylate (Bisphenol E ethoxylate), bis(4-hydroxyphenyl)methane ethoxylate (Bisphenol F ethoxylate), 4,4'-(1,3-phenylenediisopropylidene)bisphenol ethoxylate (Bisphenol M ethoxylate), 4,4'-(1,4-phenylenediisopropylidene)bisphenol ethoxylate (Bisphenol P ethoxylate), 4,4'sulfonyldiphenol ethoxylate (Bisphenol S ethoxylate), 4,4'-cyclohexylidenebisphenol ethoxylate (Bisphenol Z ethoxylate), and mixtures thereof.

98. The process of claim 91 wherein the glycol component comprises from 0 to 1.0 mole percent of the polyfunctional branching agent.

99. The process of claim 91 wherein the hydroxyalkanoic acid component is selected from: lactic acid, DL-lactic acid, L-lactic acid, glycolic acid, methyl lactate, methyl (R)-(+)-lactate, methyl (S)-(–)-lactate, methyl glycolate, ethyl lactate, ethyl (R)-(+)-lactate, ethyl (S)(–)-lactate, ethyl glycolate, (2-hydroxyethyl)lactate, (2-hydroxyethyl) (R)-(+)-lactate, (2-hydroxyethyl) (S)-(–)-lactate, (3 -hydroxypropyl) lactate, (3-hydroxypropyl) (R)-(+)-lactate, (3-hydroxypropyl) (S)-(–)-lactate, (4-hydroxybutyl)lactate, (2-hydroxyethyl)glycolate, (3-hydroxypropyl)glycolate, (4-hydroxybutyl)glycolate, lactide, 3,6-dimethyl-1,4-dioxane-2,5-dione, L-lactide, (3 S-cis)-3,6-dimethyl-1,4-dioxane-2,5-dione, glycolide, poly(lactide), poly(DL-lactide), poly(glycolide) and mixtures derived therefrom.

100. The process of claim 91 wherein the aromatic dicarboxylic acid component is selected from: terephthalic acid, dimethyl terephthalate, bis(2-hydroxyethyl)terephthalate, bis(3-hydroxypropyl)terephthalate, bis(4-hydroxybutyl)terephthalate, isophthalic acid, dimethyl isophthalate, bis(2-hydroxyethyl)isophthalate, bis(3-hydroxypropyl) isophthalate, bis(4-hydroxybutyl)isophthalate; 2,6naphthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and mixtures derived therefrom.

101. The process of claim 91, wherein the branching agent is selected from: 1,2,4-benzenetricarboxylic acid; trimethyl-1,2,4-benzenetricarboxylate; tris(2-hydroxyethyl)-1,2,4-benzenetricarboxylate; tris(3-hydroxypropyl)-1,2,4-benzenetricarboxylate; tris(4-hydroxybutyl)1,2,4-benzenetricarboxylate; 1,2,4-benzenetricarboxylic anhydride; 1,3,5-benzenetricarboxylic acid; 1,2,4,5-benzenetetracarboxylic acid; 1,2,4,5-benzenetetracarboxylic dianhydride; 3,3',4,4'-benzophenonetetracarboxylic dianhydride; 1,4,5,8-Naphthalenetetracarboxylic dianhydride; citric acid; tetrahydrofuran-2,3,4,5-tetracarboxylic acid; 1,3,5-cyclohexanetricarboxylic acid; pentaerythritol; glycerol; 2-(hydroxymethyl)-1,3-propanediol; 2,2-bis(hydroxymethyl)propionic acid; and mixtures derived therefrom.

* * * * *